US008626618B2

(12) United States Patent
Psota et al.

(10) Patent No.: US 8,626,618 B2
(45) Date of Patent: Jan. 7, 2014

(54) USING NON-PUBLIC SHIPPER RECORDS TO FACILITATE RATING AN ENTITY BASED ON PUBLIC RECORDS OF SUPPLY TRANSACTIONS

(75) Inventors: James Ryan Psota, Cambridge, MA (US); Joshua Green, New York, NY (US)

(73) Assignee: Panjiva, Inc., New York, NY (US)

( * ) Notice: Subject to any disclaimer, the term of this patent is extended or adjusted under 35 U.S.C. 154(b) by 0 days.

(21) Appl. No.: 13/343,354

(22) Filed: Jan. 4, 2012

(65) Prior Publication Data

US 2012/0203708 A1     Aug. 9, 2012

Related U.S. Application Data

(63) Continuation-in-part of application No. 12/271,593, filed on Nov. 14, 2008, now Pat. No. 8,473,354, and a continuation-in-part of application No. 13/343,354, filed on Jan. 4, 2012.

(60) Provisional application No. 60/987,989, filed on Nov. 14, 2007, provisional application No. 61/293,931, filed on Jan. 11, 2010, provisional application No. 61/430,077, filed on Jan. 5, 2011.

(51) Int. Cl.
*G06Q 30/00* (2012.01)

(52) U.S. Cl.
USPC ........ 705/30; 705/1; 705/7; 705/26; 705/347; 707/104; 715/104

(58) Field of Classification Search
USPC ...................... 705/30, 1, 7, 26; 707/104, 1, 3; 715/226, 205
See application file for complete search history.

(56) References Cited

U.S. PATENT DOCUMENTS

| | | | |
|---|---|---|---|
| 5,570,291 | A | 10/1996 | Dudle |
| 5,970,475 | A | 10/1999 | Barnes et al. |
| 5,987,429 | A | 11/1999 | Maritzen |
| 7,610,233 | B1 | 10/2009 | Leong |
| 7,912,865 | B2 | 3/2011 | Akerman et al. |
| 2001/0056379 | A1 | 12/2001 | Fujinaga et al. |

(Continued)

FOREIGN PATENT DOCUMENTS

| WO | WO-2009/065029 A1 | 5/2009 |
|---|---|---|
| WO | WO-2011085360 A1 | 7/2011 |

OTHER PUBLICATIONS

"U.S. Appl. No. 13/004,386, Notice of Allowance mailed Jan. 8, 2013", 15 pages.

(Continued)

*Primary Examiner* — Vanel Frenel
(74) *Attorney, Agent, or Firm* — Strategic Patents, P.C.

(57) ABSTRACT

A platform facilitates buyers, sellers, and third parties in obtaining information related to each other's transaction histories, such as a supplier's shipment history, the types of materials typically shipped, a supplier's customers, a supplier's expertise, what materials and how much a buyer purchases, buyer and shipper reliability, similarity between buyers, similarity between suppliers, and the like. The platform aggregates data from a variety of sources, including, without limitation, customs data associated with actual import/export transactions, non-public shipper records, and facilitates the generation of reports as to the quality of buyers and suppliers, the reports relating to a variety of parameters that are associated with buyer and supplier quality.

9 Claims, 32 Drawing Sheets

(56) References Cited

U.S. PATENT DOCUMENTS

| | | |
|---|---|---|
| 2002/0194050 A1 | 12/2002 | Nabe et al. |
| 2003/0046220 A1 | 3/2003 | Kamiya |
| 2003/0187716 A1 | 10/2003 | Lee |
| 2003/0212609 A1 | 11/2003 | Blair et al. |
| 2004/0039598 A1 | 2/2004 | Kim |
| 2004/0122942 A1 | 6/2004 | Green et al. |
| 2004/0236666 A1 | 11/2004 | Clark et al. |
| 2004/0243503 A1 | 12/2004 | Eng et al. |
| 2005/0021527 A1 | 1/2005 | Zhang et al. |
| 2005/0144052 A1* | 6/2005 | Harding et al. ............ 705/7 |
| 2007/0260521 A1 | 11/2007 | Van Der |
| 2008/0162297 A1* | 7/2008 | Hershkovitz et al. ........ 705/26 |
| 2009/0144070 A1 | 6/2009 | Psota, Jr. et al. |
| 2009/0326995 A1* | 12/2009 | Sorisi et al. ............ 705/7 |
| 2011/0173093 A1 | 7/2011 | Psota et al. |

OTHER PUBLICATIONS

"U.S. Appl. No. 12/271,593, Notice of Allowance mailed May 11, 2012", SN:12271593 NPL-5 May 11, 2012, 8 pages.

"U.S. Appl. No. 13/004,368, Non-Final Office Action mailed Apr. 27, 2012", SN:13004368 NPL-6 Apr. 27, 2012, 12 pages.

"U.S. Appl. No. 12/271,593, Notice of Allowance mailed May 1, 2013", 20 pages.

ISA, "International Search Report", for US Patent Application No. PCT/US2008/083623, mailed on Apr. 16, 2009.

"U.S. Appl. No. 12/271,593, Final Office Action mailed May 16, 2011", , 11.

"U.S. Appl. No. 12/271,593, Non-Final Office Action mailed Oct. 14, 2010", , 7.

"International Application Serial No. PCT/US11/20807, Search Report and Written Opinion mailed Apr. 20, 2011", , 10.

* cited by examiner

| SHIPPER | CONSIGNEE | NOTIFY_PARTY | ALSO_NOTIFY | WEIGHT | QUANTITY | BL NUMBER | COUNTRY | DATA | COMMODITY | HS CODE |
|---|---|---|---|---|---|---|---|---|---|---|
| *1004A* | *1004B* | *1004C* | *1004D* | *1004E* | *1004F* | *1004G* | *1004H* | *1004I* | *1004J* | *1004K* |
| | | | | | | | | | | |

CRITICAL FIELDS FROM CUSTOMS RECORDS *1002*

*FIG. 10*

| SHIPPER 1004A | CONSIGNEE 1004B | NOTIFY_PARTY | ALSO_NOTIFY 1004D | WEIGHT | QUANTITY | BL NUMBER | COUNTRY | DATE 1004I | COMMODITY | HS CODE 1004K | 1102 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 1/2/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1104 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 2/4/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1108 |
|---|---|---|---|---|---|---|---|---|---|---|---|
| SHANGHAI BADA TEXTILE CO. | ORDER | | NO FEAR | 840 g | 93 | CITVC2437 9671C | CHINA | 3/8/2005 | LADLES POLY WEST | 621149 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1110 |
|---|---|---|---|---|---|---|---|---|---|---|---|
| GUANGZHOU TEXTILE CO. | NO FEAR | | NO FEAR | 1203 g | 93 | CITVC2437 9671C | CHINA | 5/8/2005 | LADLES POLY WEST | 621149 | |

*FIG. 11*

| SHIPPER 1004A | CONSIGNEE 1004B | NOTIFY_PARTY | ALSO_NOTIFY 1004D | WEIGHT | QUANTITY | BL NUMBER | COUNTRY | DATE 1004I | COMMODITY | HS CODE 1004K | 1502 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 1/2/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1504 |
|---|---|---|---|---|---|---|---|---|---|---|---|
| SHANGHAI BADA TEXTILE | NO FEAR INC. | NO FEAR INC. | | 12584 g | 118 | CITVC2050 3037C | CHINA | 2/4/2005 | MEM PLOY JERSEY WEST | 621143 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1508 |
|---|---|---|---|---|---|---|---|---|---|---|---|
| SHANGHAI BADA TEXTILE CO. | ORDER | | NO FEAR | 840 g | 93 | CITVC2437 9671C | CHINA | 3/8/2005 | LADLES POLY WEST | 621149 | |

| SHIPPER | CONSIGNEE | NOTIFY_PARTY | ALSO_NOTIFY | WEIGHT | QUANTITY | BL NUMBER | COUNTRY | DATE | COMMODITY | HS CODE | 1510 |
|---|---|---|---|---|---|---|---|---|---|---|---|
| GUANGZHOU TEXTILE CO. | NO FEAR | | NO FEAR | 1203 g | 93 | CITVC2437 9671C | CHINA | 5/8/2005 | LADLES POLY WEST | 621149 | |

FIG. 15

| COMMODITY | HS CODE *1004K* |
|---|---|
| MEM PLOY JERSEY WEST | 621143 |

| COMMODITY | HS CODE |
|---|---|
| MEM PLOY JERSEY WEST | 621143 |

| COMMODITY | HS CODE |
|---|---|
| MEM PLOY JERSEY WEST | 621147 |

CUSTOMS DATA—*1602*

*FIG. 16*

| WEIGHT | QUANTITY | BL NUMBER | COUNTRY | DATE |
|---|---|---|---|---|
| 1250KG | 118 | CITVC2050 3037C | CHINA | 1/2/2005 |

| WEIGHT | QUANTITY | BL NUMBER | COUNTRY | DATE |
|---|---|---|---|---|
| 1250KG | 118 | CITVC2050 3037C | CHINA | 2/5/2005 |

| WEIGHT | QUANTITY | BL NUMBER | COUNTRY | DATE |
|---|---|---|---|---|
| 840KG | 93 | CITVC2050 3037C | CHINA | 3/8/2005 |

CUSTOMS DATA ~ 1702

*FIG. 17*

| SHIPPER | CONSIGNEE<br>*1004B* | NOTIFY_PARTY | ALSO_NOTIFY<br>*1004D* |
|---|---|---|---|
| SHANGHAI BADA TEXTILE | (NO FEAR INC.) | NO FEAR INC. | |

| SHIPPER | CONSIGNEE<br>*1004B* | NOTIFY_PARTY | ALSO_NOTIFY<br>*1004D* |
|---|---|---|---|
| SHANGHAI BADA TEXTILE | (NO FEAR INC.) | NO FEAR INC. | |

| SHIPPER | CONSIGNEE<br>*1004B* | NOTIFY_PARTY | ALSO_NOTIFY<br>*1004D* |
|---|---|---|---|
| SHANGHAI BADA TEXTILE CO. | ORDER | NO FEAR INC. | (NO FEAR INC.) |

CUSTOMS DATA —*1802*

| RATING<br>*110* | SUPPLIER NAME<br>*1908* | LOCATION<br>*1910* | DETAILS<br>*1912* |
|---|---|---|---|
| 87 | SUPPLIER AAA | CHINA | PAGE 8 |
| 83 | SUPPLIER BBB | CHINA | PAGE 11 |
| 81 | SUPPLIER CCC | CHINA | PAGE 14 |
| 80 | SUPPLIER 4DD | CHINA | PAGE 17 |
| 78 | SUPPLIER EEE | HONG KONG | PAGE 20 |
| 78 | SUPPLIER FFF | CHINA | PAGE 23 |
| 77 | SUPPLIER GGG | CHINA | PAGE 22 |

*FIG. 19*

STAND-OUT SUPPLIERS — 2000

HIGHEST CUSTOMER LOYAL — 2002A

| LOYALTY RATING 2004A | SUPPLIER NAME 2008 | LOCATION 2010 | DETAILS 2012 |
|---|---|---|---|
| 99 | SUPPLIER AAA | CHINA | PAGE 23 |
| 98 | SUPPLIER BBB | CHINA | PAGE 153 |
| 98 | SUPPLIER CCC | HONG KONG | PAGE 152 |
| 97 | SUPPLIER 4DD | CHINA | PAGE 122 |
| 83 | SUPPLIER EEE | HONG KONG | PAGE 41 |

MOST U.S. SHIPPING EXPERIENCE — 2002B

| EXPERIENCE RATING 2004B | SUPPLIER NAME 2008 | LOCATION 2010 | DETAILS 2012 |
|---|---|---|---|
| 87 | SUPPLIER 31VV | CHINA | PAGE 8 |
| 83 | SUPPLIER WWW | CHINA | PAGE 26 |
| 81 | SUPPLIER XXX | CHINA | PAGE 38 |
| 80 | SUPPLIER YYY | CHINA | PAGE 65 |
| 79 | SUPPLIER ZZZ | HONG KONG | PAGE 53 |

FIG. 20

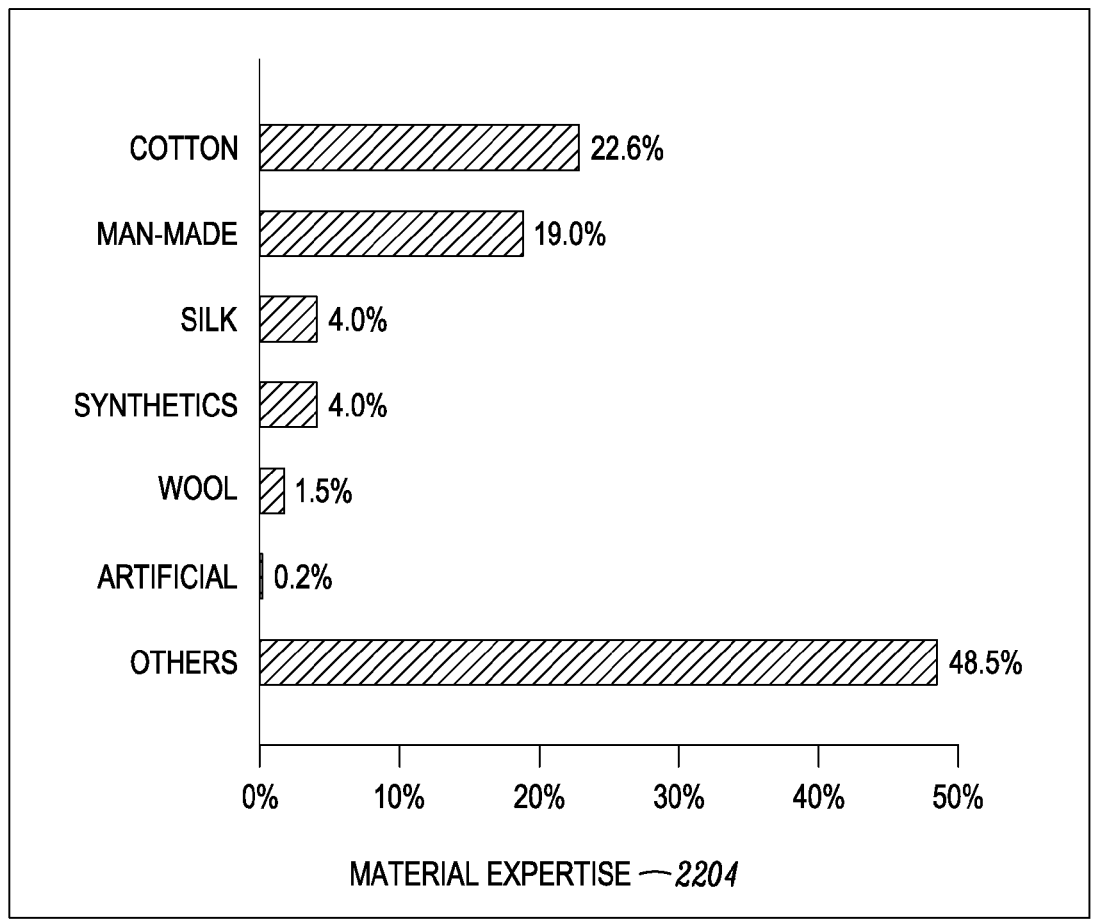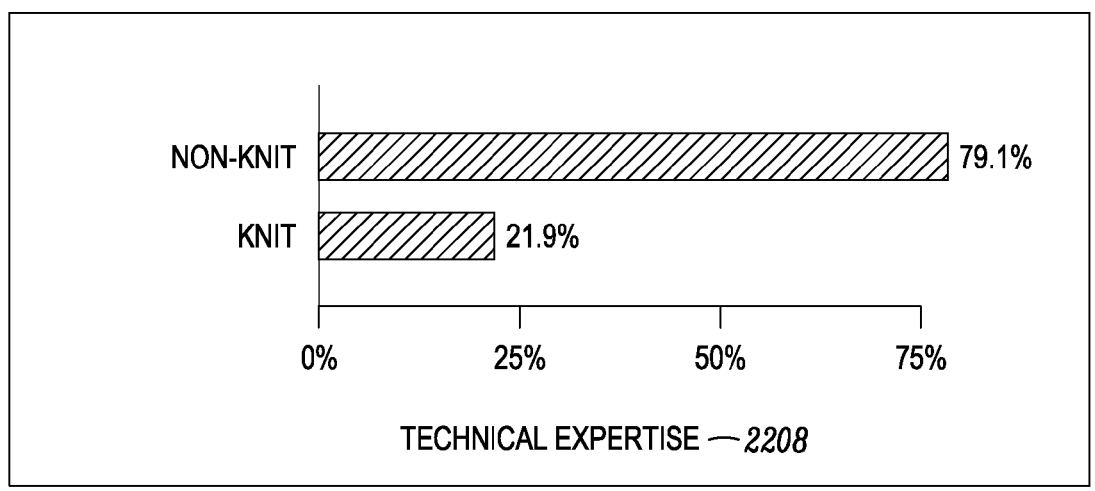
FIG. 22B

USING NON-PUBLIC SHIPPER RECORDS TO FACILITATE RATING AN ENTITY BASED ON PUBLIC RECORDS OF SUPPLY TRANSACTIONS

CROSS-REFERENCE TO RELATED APPLICATIONS

This application is a continuation-in-part of U.S. non-provisional patent application Ser. No. 12/271,593 filed Nov. 14, 2008 which claims the benefit of U.S. provisional application Ser. No. 60/987,989 filed Nov. 14, 2007, each of which is hereby incorporated by reference in its entirety.

This application is a continuation-in-part of U.S. non-provisional patent application Ser. No. 13/004,368 filed Jan. 11, 2011 which claims the benefit of U.S. provisional application Ser. No. 61/293,931 filed Jan. 22, 2010, each of which is hereby incorporated by reference in its entirety.

This application claims the benefit of U.S. provisional application Ser. No. 61/430,077 filed Jan. 5, 2011, which is hereby incorporated by reference in its entirety.

This application claims the benefit of foreign application Ser. No. PCT/US11/20807 filed Jan. 11, 2011, which is hereby incorporated by reference in its entirety.

BACKGROUND

1. Field

The present invention is related to electronic commerce, and more particularly to rating systems.

2. Description of the Related Art

Buyers who are interested in working with suppliers, particularly overseas suppliers, may have many suppliers from which they can choose. For instance, in the apparel industry there are an estimated 40,000 apparel factories in China alone, with some 80,000 worldwide. In order to select a supplier, a buyer traditionally has had to rely on direct experience with the supplier or work through a middleman that facilitates contracting with suppliers. However, working with a middle-man may incur commissions for their services, and working directly with the supplier may present the buyer with a large degree of uncertainty, such as relating to the quality and reliability of the supplier, who the supplier typically works with, what type of products the supplier typically supplies, materials used, customers served, and the like. Some information about suppliers can be obtained from other sources, such as trade fairs, online directories, referrals, and the like. These disparate sources of information are, however, difficult to sort through, and at present there is a distinct lack of reliable and objective information that buyers can use to assess suppliers around the world. As a result, buyers must proceed largely on their own, and at considerable risk and expense.

A need exists for ways for buyers to more easily select suppliers.

SUMMARY

Methods and systems are disclosed herein for a platform by which buyers, sellers, and third parties can obtain information related to each other's transaction histories, such as a supplier's shipment history, the types of materials typically shipped, a supplier's customers, a supplier's expertise, what materials and how much a buyer purchases, buyer and shipper reliability, similarity between suppliers, similarity between buyers, and the like. The platform may aggregate data from a variety of sources, including, without limitation, customs data associated with actual import/export transactions, and facilitates the generation of reports as to the quality of buyers and suppliers, the reports relating to a variety of parameters that are associated with quality buyers and suppliers, and the like.

In an aspect of the invention, methods and systems may include: using a computer implemented facility to collect and store a plurality of records of transactions among a plurality of buyers and a plurality of suppliers; aggregating the transactions; associating the transactions with entities; and rating an entity based on analysis of the aggregated transactions. In the aspect a rating is tailored based on criteria defined by an end user.

In the aspect a rating is for one or more of: suppliers using aggregated transactional customs data, a supplier based on customs data related to transactions by the supplier with a third party, a buyer using aggregated transactional customs data, a buyer based on customs data related to transactions of the buyer with a third party, a supplier based on loyalty as indicated by analysis of customs transactions, a supplier based on amount of experience as indicated by customs transactions, a supplier based on evaluating the number of shipments, a supplier based on duration of experience as indicated by shipments, a supplier based on size of transactions as indicated by past shipments, a supplier based on extent of international experience as indicated by past shipments, a supplier based on extent of country-relevant experience as indicated by past shipments, a buyer based on loyalty as indicated by analysis of customs transactions, a buyer based on amount of experience as indicated by customs transactions, a buyer based on evaluating the number of shipments, a buyer based on duration of experience as indicated by shipments, a buyer based on size of transactions as indicated by past shipments, a buyer based on extent of international experience as indicated by past shipments, a buyer based on extent of country-relevant experience as indicated by past shipments, a supplier based on customer loyalty and supplier experience as indicated by past shipments reflected in customs records.

In the aspect, the rating is further based on at least two factors selected from the group consisting of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards.

In the aspect, the rating is based on one of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards In the aspect, weights are given in the rating process. The weights are based on timeliness of data. The weights are given based on size of transaction. The weights for transactions are given based on the quality of the transacting parties; the quality of a transacting party is based on a prior rating for that party. The weights are based on relevance of data.

In the aspect the rating is for a plurality of factories of an entity.

In the aspect the rating includes providing a human-aided assessment of supplier skills as a factor in a rating. Alternatively the rating includes using an indicator of an entity's financial health as a factor in a rating.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and providing an entity score for an entity based on analysis of the aggregated transactions. In the aspect the entity score is based at least in part on transactional data about shipments by the entity. In the aspect the entity score includes factors selected from the group consisting of country context, business legitimacy information, public recognition, amount of experience, caliber of customers of the supplier, customer loyalty for the supplier, degree of specialization of the supplier, and feedback from previous customers. In the aspect the entity score for the suppliers is based on aggregated transactional customs data. In the aspect the entity score is based on a criteria defined by an end user. In the aspect the entity score for a supplier is based on customs data related to transactions by the supplier with a third party. In the aspect the entity score is based on at least two factors selected from the group consisting of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards. In the aspect the entity score is based upon one of: a country context of a party, a business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards.

In the aspect, the entity score for a supplier is based on one or more of: loyalty as indicated by analysis of customs transactions, an amount of experience as indicated by customs transactions, evaluating the number of shipments, a duration of experience as indicated by shipments, size of transactions as indicated by past shipments, extent of international experience as indicated by past shipments, on extent of country-relevant experience as indicated by past shipments, and customer loyalty and supplier experience as indicated by past shipments reflected in customs records. In the aspect the entity score for a buyer is based on one or more of: loyalty as indicated by analysis of customs transactions, an amount of experience as indicated by customs transactions, evaluating the number of shipments, a duration of experience as indicated by shipments, a size of transactions as indicated by past shipments, an extent of international experience as indicated by past shipments, aggregated transactional customs data, customs data related to transactions of the buyer with a third party, and an extent of country-relevant experience as indicated by past shipments. In the aspect the entity score is for a plurality of factories of an entity. In the aspect, methods and systems further include providing a human-aided assessment of supplier skills as a factor in a entity score or include using an indicator of an entity's financial health as a factor in a entity score.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and determining a risk profile based on analysis of the aggregated transactions. In the aspect the risk profile is provided with respect to a supplier based on transactional customs data for the supplier. In the aspect, the risk is related to at least one of: counterfeiting, capacity, subcontracting, a political factor, a geographic factor, a weather factor, a geology factor, a financial risk, a probability of non-performance of a contract, a probability of termination of a contract, intellectual property, achieving a targeted delivery date. In the aspect the risk profile is provided with respect to a supplier based on transactional customs data for a party other than the supplier. In this aspect, the risk is related to at least one of: counterfeiting, capacity, subcontracting, a political factor, a geographic factor, a weather factor, a geology factor, a financial risk, a probability of non-performance of a contract, a probability of termination of a contract, intellectual property, achieving a targeted delivery date.

In the aspect, the risk profile is provided with respect to a buyer based on transactional customs data for the buyer. The risk is related to non-payment or the likelihood that a buyer will move to an alternative supplier.

In the aspect, the risk profile is provided with respect to a buyer based on transactional customs data for a party other than the buyer. The risk is related to non-payment or the likelihood that a buyer will move to an alternative supplier.

In the aspect, the risk profile is provided for a party using customs data and using the risk profile as a basis for determining terms and conditions of insurance.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and providing an indicator of economic leverage with respect to an entity based on analysis of the aggregated transactions. In the aspect, the indicator of economic leverage is with respect to at least one of: a supplier based on transactional customs data for the supplier, a supplier based on transactional customs data for a party other than the supplier, a buyer based on transactional customs data for the buyer, a buyer based on transactional customs data for a party other than the buyer. In the aspect, the transactional customs data corresponds to a price. Alternatively in the aspect, the transactional customs data corresponds to a delivery date or an order quantity.

In another aspect of the invention, methods and systems, such as computer implemented methods and systems, include using a computer implemented facility to collect and store a plurality of records of customs transactions among a plurality of buyers and a plurality of suppliers; aggregating the transactions; associating the transactions with entities; and predicting an action of an entity based on analysis of the aggregated transactions. In the aspect the prediction is of an action of a buyer based on analysis of customs data for transactions by the buyer. In the aspect the prediction is related to at least one of: price, a change in price, a change in supplier, and a quantity ordered by the buyer. In the aspect the prediction is of an action of a buyer based on analysis of customs data for transactions by a party other than the buyer. The prediction is related to a price, a change in price, a change in supplier, or a quantity ordered by a buyer. In the aspect, the prediction is of an action of a supplier based on analysis of customs data for transactions by the buyer. The prediction is related to a price, a change in price, a change in availability of an item, whether a supplier will work with a buyer of a given size, or whether a supplier will work with orders of a given size. In the aspect the prediction is of an action of a supplier based on analysis of customs data for transactions by a party other than the buyer. The prediction is related to a price, a change in price, a change in availability of an item, a potential closure of a subsidiary, a potential closure of a factory, or a potential closure of a company.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and making a recommendation based on analysis of the aggregated transactions. In the aspect the recommendation is based on analysis of customs data for transactions by the buyer, analysis of customs data for transactions by a party other than the buyer, analysis of customs data for transactions by the buyer, analysis of customs data for transactions by a party other than the buyer, prioritization of factors by a user, or a user-specified rating factor.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and associating an entity type with at least one of the entities. In the aspect, a data merging facility automatically merges records based on similarity of data elements with a customs record. The data elements correspond to a name of the entity or an address of the entity. Alternatively in the aspect, a data merging facility suggests an association between records and a single entity. The entity type is derived from one or more commodity fields in the transactions, and at least one of the commodity fields includes a harmonic tariff system code, a commodity type, or both. In the aspect, associating an entity type is based on an analysis of free text data in a plurality of data fields of the transactions. Associating an entity may alternatively be based on machine learning of entity types from customs transactional data records. The transactions may be customs transactions.

In another aspect of the invention, methods and systems, such as computer implemented methods and systems, include: using a computer implemented facility to collect and store a plurality of records of customs transactions among a plurality of buyers and a plurality of suppliers; aggregating the transactions; and processing the data to associate a plurality of transactions associated with a plurality of different entity names to a single entity based on analysis of customs record data for the transactions associated with the plurality of different entity names. In the aspect, the processing is based on, a name of the supplier, a name of the buyer, an order quantity, a billing amount, a location of the buyer, a location of the supplier, a delivery date, order data, at least one string associated with a supplier name, or at least one string associated with a buyer name. In the aspect the processing involves removing blank spaces from a supplier name field or removing blank spaces from a buyer name field. In the aspect, the transaction is associated with a region of interest, an industry, past shipment data, a country-relevant experience, a number of shipments, a material, a product category, a technique, a name of the entity, an order quantity, a billing address, a targeted delivery date, or a capacity of the supplier.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and evaluating legitimacy of feedback about an entity based on analysis of whether the feedback is associated with a transaction reflected in public records. The evaluation of legitimacy of feedback associated with the supplier is based on validation by a third party. The evaluation of legitimacy of feedback associated with the buyer is based on validation by a third party.

In the aspect the transaction is associated with a name of the entity, an order quantity, a billing address, a targeted delivery date, a capacity of the supplier, transaction customs data, a region of interest, an industry, a past shipment, a country-relevant experience, a number of shipments, a material, a product category, or a technique.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and providing a computer-implemented tool for suggesting a marketing strategy for a supplier based on analysis of transactional data from the public records. In the aspect the transactional data is associated with a supplier, a buyer, region of interest, customs data, past shipment, country relevant experience, a number of shipments, a product category, a material, or a technique. The analysis of transactional data includes analysis of pricing, buyer behavior, or transactional data associated with a competitor of the supplier.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and providing a computer-implemented tool for suggesting a marketing strategy for a buyer based on analysis of the transactional data from the records. In the aspect, the transactional data is associated with a supplier, a buyer, a region of interest, customs data, a past shipment, a country relevant experience, a number of shipments, a product category, a material, or a technique. The analysis of transactional data includes analysis of pricing, buyer behavior, or analysis of transactional data associated with a competitor of the buyer.

In another aspect of the invention, methods and systems, such as computer implemented methods and systems, include: using a computer implemented facility to collect and store a plurality of public records of transactions among a plurality of buyers and a plurality of suppliers; aggregating the transactions; associating the transactions with entities; and providing a user interface whereby a user may search for at least one of a supplier and a buyer and retrieve relevant information based on the aggregated transactions data. In the aspect, the interface allows a tuple-based search. The tuple-based search relates to a capability with respect to at least one of a product, a material and a technique. In the aspect, search results are ranked based on a supplier rating.

In the aspect, the rating is based upon a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In the aspect, the search results are based on a risk profile.

In the aspect, the risk is related to counterfeiting, capacity, subcontracting, a political factor, a geographic factor, a weather factor, a geology factor, a financial risk, a probability of non-performance of a contract, a probability of termination of a contract, intellectual property, achieving a targeted delivery date.

In the aspect, the risk profile is provided with respect to a supplier based on transactional customs data for a party other than the supplier. The risk is related to counterfeiting, capacity, subcontracting, a political factor, a geographic factor, a weather factor, a geology factor, a financial risk, a probability of non-performance of a contract, a probability of termination of a contract, intellectual property, achieving a targeted delivery date, a buyer based on transactional customs data for the buyer, non-payment, or the likelihood that a buyer will move to an alternative supplier. In the aspect, the risk profile is provided with respect to a buyer based on transactional customs data for a party other than the buyer. The risk is related to non-payment or the likelihood that a buyer will move to an alternative supplier.

In the aspect, the risk profile is provided for a party using customs data and using the risk profile as a basis for determining terms and conditions of insurance. The results are based on an opportunity profile. The opportunity relates to the availability of pricing leverage for a buyer with respect to a supplier, consolidation of orders with a supplier. The opportunity relates to the availability of pricing leverage for a supplier with respect to a buyer or to increasing a share of a buyer's total spending for a supplier.

In another aspect of the invention, the methods and systems, such as computer implemented methods and systems, include: using a computer implemented facility to collect and store a plurality of public records of transactions among a plurality of buyers and a plurality of suppliers; aggregating the transactions; associating the transactions with entities; integrating the aggregated and associated transactions with data from at least one other data source to provide an integrated data facility; and adapting the integrated data facility for evaluating at least one of a supplier and a buyer. In the aspect, the public records include customs records. In the aspect, evaluations are ranked based on a supplier rating. In the aspect, the evaluation is based upon a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In the aspect, evaluations are ranked based on a buyer rating, a country context of a party, business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, or certifications with respect to specific vendor standards.

In another aspect of the invention, methods and systems, such as computer implemented methods and systems, include: using a computer implemented facility to collect and store a plurality of records of customs transactions among a plurality of buyers and a plurality of suppliers; aggregating the transactions; associating the transactions with entities; and suggesting an opportunity based on analysis of the transactions. In the aspect, the opportunity relates to the availability of pricing leverage for a buyer with respect to a supplier, an opportunity for consolidation of orders with a supplier, the availability of pricing leverage for a supplier with respect to a buyer, the opportunity to increase a share of a buyer's total spending for a supplier, the availability of a discount for the buyer with respect to the supplier for a specified period, the availability of a committed time for delivery by the buyer to the supplier, the availability of bulk discount for the buyer with respect to the supplier, the availability of credit sales for the buyer with respect to the supplier, the availability of free delivery for the buyer with respect to the supplier, or the availability of liquidated damages for the buyer with respect to the supplier.

In another aspect of the invention, methods and systems, such as computer implemented methods and systems, include: using a computer implemented facility to collect and store a plurality of aggregated customs transactions; associating the transactions with a supplier; and using the aggregated transactions to inform a rating of the supplier based at least in part on analysis of the aggregated transactions. In the aspect, the aggregated customs transactions include a summary of transactions for a product type. The transactions are summarized over a period of time. The analysis of the aggregated transactions includes comparing the aggregated transactions for a supplier with a plurality of records of transactions for a buyer. The aggregated customs transactions include transactions for a plurality of suppliers. In the aspect, associating the transactions with a supplier includes predicting one or more suppliers to which the transactions can be associated.

In another aspect of the invention, methods and systems, such as computer implemented methods and systems, include: taking a plurality of input data records from at least one data source of transactions; matching the data records to an entity that is a party to a plurality of transactions; and automatically merging the data records associated with the same entity to form a merged data store of transactions. In the aspect, matching includes filtering the data records. Filtering suggests data records for merging. Filtering is based on search engine techniques, such as a lucene search engine technique. Filtering is based on kgram filtering that may include a kgram filtering group that consists of four consecutive characters. In the aspect, a kgram filtering threshold for suggesting data records to be merged is ten matching kgram filter groups. In the aspect, a plurality of data fields within a data record are combined for matching.

In the aspect, matching includes classification. Classification is performed on data records suggested for merging and optionally, filtering is used to suggest data records for merging. Classification includes at least one of canonical adaptation, text cleanup, multi-field classification, edit distance assessment, vector generation, machine learning, and decision tree processing. Canonical adaptation includes normalizing text strings among the plurality of transactions or changing equivalent text strings to a known text string. Text cleanup is based on at least one of geographic factors, regional factors, market verticals, industry norms, known variations, learned variations, and user preferences.

In the aspect, the text cleanups are associated with at least one type of data field in the data records. The type of data field includes at least one of a shipper, a consignee, a notify party, an also notify party, a weight, a quantity, a country, a date, a commodity, and a harmonic tariff system code. Classification is applied to a plurality of data fields in the data records or to combined data fields in the data records.

In the aspect, classification provides a vector that represents dimensions of similarity. The vector includes dimensions of similarity for at least two of canonical adaptation, text cleanup, multi-field classification, edit distance assessment, vector generation, machine learning, and decision tree processing.

In the aspect, matching includes clustering. Optionally, clustering includes p-percent clustering. In the aspect, a data record is merged when a p-percent value associated with the data record exceeds a p-percent threshold associated with the entity. Optionally the p-percent threshold is thirty percent. Alternatively p-percent clustering is based on a dynamic p-percent threshold. The dynamic p-percent threshold is based on a quantity of data records in a cluster associated with an entity.

In the aspect, the plurality of transactions contains party identifying data in a field of the data records. The party identifying data is stored in different fields of at least two of the plurality of data records. Optionally, party identifying data in a first record is a parent entity and a party identifying data in a second record is a child entity of the parent entity.

In the aspect, matching data records includes identifying data that is a variation of an entity name or an entity address. In the aspect, the party is one of a supplier and a buyer. Alternatively, matching includes two or more types of text association selected from a list consisting of: filtering, character group matching, thesaurus lookup, machine learning, natural language processing, search-based comparison, classification, known entity matching, clustering, and human-identified entities.

In another aspect of the invention, methods and systems, such as computer implemented methods and systems, include: taking a plurality of input data records from at least one data source of transactions; filtering the input data records to identify a set of filtered data records that are favorable candidates for automatic merging; classifying the filtered data records to produce a set of classified data records, each classified data record associated with a likelihood that the data record should be associated with a particular entity; and automatically merging the data records associated with the same entity to form a merged data store of transactions. In the aspect, the filtering is performed using a search engine, kgram filtering, or dynamic programming. I the aspect, classifying the data records is performed using at least one of canonical adaptation, specific cleanups, multi-field comparison, an edit distance algorithm, vector generation, machine learning, and a decision tree. In the aspect, filtering suggests data records for merging. Alternatively filtering is based on search engine techniques, that optionally include a lucene search engine technique. In the aspect filtering is based on kgram filtering. Optionally a kgram filtering group consists of four consecutive characters. Optionally a kgram filtering threshold for suggesting data records to be merged is ten matching kgram filter groups. In the aspect, a plurality of data fields within a data record is combined for matching.

In the aspect, classification is performed on data records suggested for merging. Optionally filtering is used to suggest data records for merging. In the aspect classification includes at least one of canonical adaptation, text cleanup, multi-field classification, edit distance assessment, vector generation, machine learning, and decision tree processing. Canonical adaptation includes normalizing text strings among the transactions or changing equivalent text strings to a known text string.

In the aspect, text cleanup may be based on at least one of geographic factors, regional factors, market verticals, industry norms, known variations, learned variations, and user preferences. Optionally, text cleanups are associated with at least one type of data field in the data records. The type of data field includes a shipper, a consignee, a notify party, an also notify party, a weight, a quantity, a country, a date, a commodity, and a harmonic tariff system code.

In the aspect, classification is applied to a plurality of data fields in the data records or to combined data fields in the data records.

In the aspect, classification provides a vector that represents dimensions of similarity. Optionally, the vector includes dimensions of similarity for at least two of canonical adaptation, text cleanup, multi-field classification, edit distance assessment, vector generation, machine learning, and decision tree processing.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and classifying an entity as a buyer based on analysis of the aggregated transactions. In the aspect the aggregated transaction is associated with an industry, customs data, a past shipment, a likelihood of interest, or a number of shipments.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and using the transactions as a training set to predict association of a particular transaction with an attribute. In the aspect, the attribute is a type of industry, a type of supplier, a type of product, a product attribute, or related to a type of material. In the aspect, the particular transaction represents a shipment from a supplier to a buyer. The transactions are customs transactions. Alternatively, the entities are one or more of a supplier and a buyer. Optionally, the particular transaction is a rolled-up transaction.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and using the transactions as a training set to predict association of a particular transaction with an entity. In the aspect, the particular transaction represents a shipment from a supplier to a buyer. Alternatively, the transactions are customs transactions. In the aspect, an entity is one of a supplier and a buyer. Optionally, the particular transaction is a rolled-up transaction.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and predicting a minimum order requirement for an entity based on analysis of the transactions. In the aspect the entity is a factory, supplier, or a subsidiary of a supplier.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and providing a search facility for enabling a search for an entity, wherein the search facility allows searching based on geographic region, industry specialization, entities participating in the transactions, and likelihood of interest in a transaction with the searcher. In the aspect, the search facility is adapted to be used by a buyer searching for a supplier or adapted to be used by a supplier searching for a buyer.

In another aspect of the invention, methods and systems, such as computer implemented methods and systems, include: using a computer implemented facility to collect and store a plurality of records of transactions among a plurality of buyers and a plurality of suppliers; aggregating the transactions; associating the transactions with entities; and rating a sub-entity of a supplier based on analysis of the aggregated transactions. In the aspect, the sub-entity is a factory, a collection of factories, or a subsidiary. In the aspect, determining the sub-entity is based on analysis of the public records. Optionally, the public records are records of customs transactions.

In another aspect of the invention, methods and systems, such as computer implemented methods and systems, include: using a computer implemented facility to collect and store a plurality of aggregated public records of shipment transactions; associating the transactions with a supplier; and using the aggregated transactions to inform a rating of the supplier based at least in part on analysis of the aggregated transactions.

In another aspect of the invention, methods and systems, such as computer implemented methods and systems, include: using a computer implemented facility to collect and store a plurality of public records of transactions; associating the transactions with entities; and using the aggregated transactions to classify at least one of a supplier and a buyer according to type. In the aspect a buyer may identify like buyers, suppliers like those of the buyer, suppliers of a specified type, or suppliers like to prefer the buyer. In the aspect, a supplier may identify like suppliers, buyers like those of the supplier, or buyers of a specific type.

In another aspect of the invention, methods and systems, such as computer implemented methods and systems, include: using a computer implemented facility to collect and store a plurality of public records of transactions; associating the transactions with entities; and assessing whether a buyer has ceased doing business with a supplier based on the transactional data. In the aspect, the assessment is based on cycle time between shipments, departure of cycle time from a historical average, or based in part on a prediction as to inventory held by a buyer.

In another aspect of the invention, methods and systems, such as computer implemented methods and systems, include: using a computer implemented facility to collect and store a plurality of public records of transactions; associating the transactions with entities; and using the aggregated transactions identify at least one of a supplier of a specific item sold by a party other than the supplier. In the aspect, the specific item is a commodity.

In the aspect, the identification of supplier is based on region of interest, customs data, product category, past shipments, or a number of shipments. The specific item is a service.

Methods and systems described herein may include a method that uses a computer implemented facility to collect and store a plurality of public transactional records for a plurality of buyers and a plurality of suppliers; a computer implemented facility to aggregate and store non-public shipping records from at least one shipper, wherein at least one of the shipping records references an entity identifier for at least one of the plurality of buyers and suppliers; selects a portion of the plurality of public transactional records associated with an entity identifier based on similarity of data in the public transactional records with the at least one shipping record entity identifier; merges the records of the selected portion of the plurality of public transactional records into a common entity record set; aggregates the transactional records for the common entity record sets; and rates the common entity based on analysis of the aggregated transactional records. In the method, using a computer implemented facility to aggregate and store non-public shipping records includes processing the non-public shipping records with natural language processing to detect the entity identifier. In the method, selecting a portion of the plurality of public transactional records comprises natural language processing of data in the public transactional records to identify candidate records for associating with the entity identifier.

Methods and systems described herein may include a method that uses a computer implemented facility to collect and store a plurality of public transactional records for a plurality of buyers in a plurality of suppliers: a computer implemented facility to aggregate and store non-public shipping records from at least one shipper, wherein at least one of the shipping records references an entity for at least one of the plurality of buyers and suppliers; selects a portion of the plurality of public transactional records associated with an entity identifier based on similarity of data in the public transactional records with the at least one shipping record entity identifier; merges the records of the selected portion of the plurality of public transactional records into a common entity record set; aggregates the transactional records for the common entity record sets; and rates a sub-entity of the common entity based on analysis of the aggregated transactional records. In the method, the sub-entity is a factory. Alternatively, in the method, the sub-entity is a collection of factories. Yet alternatively, in the method, the sub-entity is a subsidiary. Further in the method, the sub-entity is determined based on analysis of the public transactional records. Alternatively in the method, the public transactional records are records of customs transactions.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 10 depicts fields that are derived from customs data associated with supply transactions.

FIG. 11 depicts a plurality of customs records with details that are relevant to buyer and supplier identification.

FIG. 15 depicts how multiple customs transaction records can be used to assess buyer loyalty.

FIG. 16 depicts using transaction data that may be indicative of a supplier's degree of specialization.

FIG. 17 depicts customs data indicative of a supplier's degree of experience.

FIG. 18 depicts customs data record fields that may affect a supplier's rating based on the quality of the buyers served by the supplier.

FIG. 19 depicts a summary report showing top suppliers and an overall rating for a category of supplier of a particular product.

FIG. 20 depicts reports showing standout suppliers for a particular product, including suppliers with highest customer loyalty and customers with deepest experience shipping to the buyer's jurisdiction.

FIGS. 22A and 22B show a breakdown of supplier transaction experience for a selected time period.

DETAILED DESCRIPTION

Figure 1:
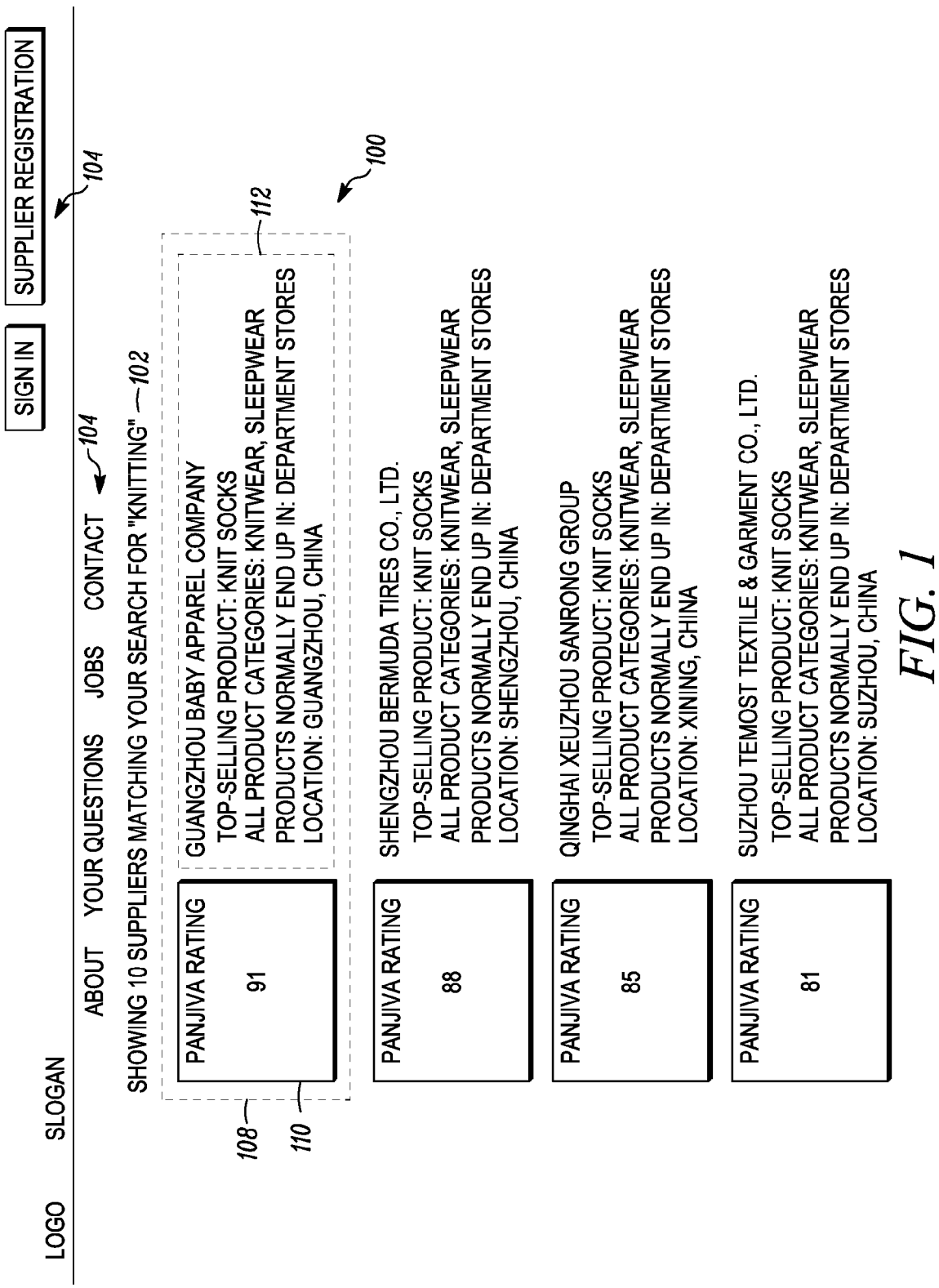
FIG. 1 depicts a report showing an overall rating derived for a set of suppliers in a category of products.

Methods and systems are provided herein for facilitating engagement of suppliers; thus, a supplier rating facility may make it easier for companies of all sizes to do business across borders by helping companies identify which suppliers they can trust. The suppler rating facility approach is to leverage a wide variety of quality data sources to rate suppliers around the globe. Behind each rating may be a detailed scorecard that evaluates suppliers along key dimensions. By comparing supplier scorecards, subscribers may determine which suppliers are right for them. In one preferred embodiment the rating system is used to rate apparel suppliers, but it should be understood that suppliers in other industries may be rated by the same or similar methods and systems, such as suppliers of consumer electronics, computer equipment, toys and games, consumer products, textiles, home goods, food, accessories, computer games, automotive parts, electronic parts and equipment, and a wide range of other goods and services, such as BPO, software development, call centers, and the like.

Presently, buyers can access a plurality of supplier directories for information about suppliers. However, those directories may only contain information provided by the suppliers themselves, and on occasion, third-party information on limited subjects, such as relating to creditworthiness. That information may not be particularly useful in helping customers to distinguish between good and bad suppliers. In certain preferred embodiments, the supplier rating facility disclosed herein may facilitate the generation of a plurality of reports that supplement or substitute for supplier-provided information, the reports generated by methods and systems disclosed herein and based on a wide range of data sources. In embodiments each supplier may receive a rating between 1 and 100. Behind this rating may be a detailed scorecard, each component of which being generated by an algorithm that operates on one or more relevant data sources, and that evaluates suppliers along dimensions that are important to customers.

A supplier rating facility as contemplated herein may provide buyers with concrete information about which suppliers are good and which suppliers are bad, which are trustworthy and which are not, which are experienced in a particular area, and the like. The ratings may feature a range of information about suppliers, including analysis generated by algorithms operating on relevant data sources and, in certain optional embodiments, ratings from previous customers. Analysis may include, among other things, using publicly available but currently fragmented information. In various embodiments, the supplier rating facility may rate suppliers along several dimensions, including without limitation amount of international experience, degree of specialization, and standards compliance.

In certain optional embodiments, ratings from previous customers may enable suppliers to gather and showcase feedback from their previous customers. Buyers may pay a subscription fee for access to ratings detail. Existing business-to-business sites may be able to embed the supplier rating facility in their directories and benefit from new revenue streams. Although apparel is being used as an embodiment of the invention, it should be understood that the invention may be applied to any industry, such as furniture, electronics, textiles, chemicals, toys, food, and the like. In addition, services in addition to a ratings service may be facilitated through the invention, such as for billing, transactional settlement, insurance, social networking for buyers, and the like. In embodiments, the invention may be applied to a broad spectrum of industries where buyers and sellers are located across diverse environments, and supplier-product information and ratings are fragmented.

The supplier rating facility may provide a ratings platform where buyers/suppliers may compare and contrast potential suppliers/buyers. The ratings platform may generate and maintain ratings of suppliers, buyers, countries, geographic regions, marketplaces, commodities and the like. The ratings may be presented in various forms including a listing of supplier ratings as shown in FIG. 1. The supplier rating list 100 in FIG. 1 includes a keyword 102 around which the list is based. Although one keyword is shown in FIG. 1, a keyword phrase, group of keywords, logical combination of keywords, and the like may be used as a basis for the list 100. In an interactive embodiment of the list of FIG. 1 selecting the keyword 102 (e.g. knitting) may allow a user to make changes to the keyword 102 to present a revised list 100. Also in an interactive embodiment of the list of FIG. 1, a menu 104 may be provided to facilitate access to other aspect of the platform and to one or more webpages associated with the platform. The list 100 may include any number of suppliers that satisfy the keyword 102 criteria; in the example of FIG. 1 the list includes 10 suppliers. The number of suppliers presented may be limited to fewer than the total number that match the keyword 102 criteria. Aspect of the list 100, such as a limit on the number of supplies in the list 100 may be controlled by preferences (e.g. user, platform, supplier, and the like).

The list 100 may include entries 108 for each supplier that satisfies the keyword 102 criteria. An entry 108 may include an overall rating 110 also known as the "Panjiva Rating", the supplier name 112, selected bibliographic data 114, and the like. Preferences as indicated above may impact what information is presented in an entry 108 and the embodiment of FIG. 1 is only an example of one set of information to be presented. Each supplier may be given an overall rating 110 that may be based on a 100 point scale so that an overall rating 110 may be between one and one-hundred as shown in FIG. 1.

Figure 2:
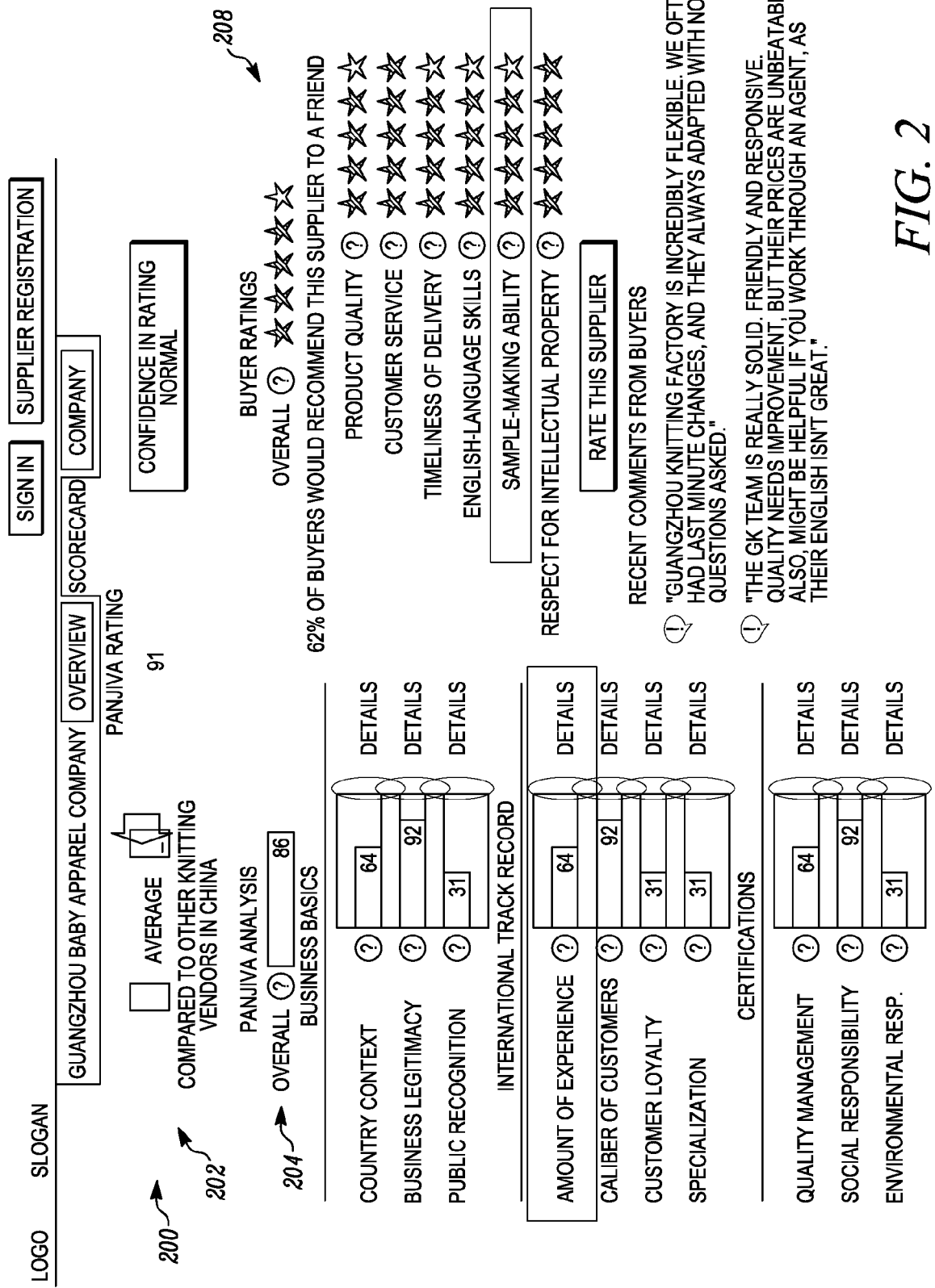
FIG. 2 depicts a more detailed report on a supplier with ratings along a number of dimensions of quality and ratings generated by past buyers who have worked with the supplier.

An alternate view of supplier rating is exemplified in FIG. 2 which depicts a supplier scorecard 200, which may be a detailed view of a supplier aspects related to the overall rating 110. The scorecard 200 enhance the overall rating 110 by providing details about the overall rating 110. A comparative rating 202 may show the supplier overall rating 110 in light of an average of other suppliers and may include an indication of a confidence in the overall rating 110. This scorecard 200 may assess the supplier's relative strength along a variety of dimensions. Leveraging a wide variety of data sources, the supplier rating facility may rate suppliers along key dimensions 204 also known as "Panjiva Analysis" ratings, in a plurality of categories such as business basics, international track record, certifications, and the like. The rating platform may also allow buyers to rate suppliers along several dimensions. The scorecard 200 may include the buyer ratings 208. In embodiments, the ratings platform may become a place where buyers go to hold suppliers accountable. In embodiments, reports such as the scorecard 200 may be made available to users in online and print forms.

In embodiments, a backend infrastructure may automatically generate customized documents by programmatically generating a representation of the document in a typesetting language such as Tex, LaTeX, and the like, which may then be processed and turned into a PDF document.

The "Business Basics" section of the Supplier Scorecard 200 may help a buyer assess whether a company is legitimate and worthy of consideration as a potential partner. Included in "Business Basics" may be information on whether a company has registered with authorities, as well as an assessment of a trading environment in the supplier's country, combining macro contextual information with data that is specific to an individual supplier and the like. A facility for determining a track record in a particular jurisdiction may use government and third-party data, and may assess the amount of experience a supplier has serving that jurisdiction, and the loyalty that a supplier's customers have demonstrated, and the like. The "Standards Compliance" section of the Supplier Scorecard 200 may document whether a supplier has been certified as meeting international standards for quality management, respect for the environment, social responsibility, product safety, and the like.

The ratings scorecard 200 may include a plurality of analysis dimensions, such as county context, business legitimacy, public recognition, amount of experience, caliber of customers, customer loyalty, specialization, quality management, social responsibility, environmental responsibility, and the like. Buyer feedback dimensions may include product quality, customer service, timeliness of delivery, language skills, sample-making ability, respect for intellectual property, and the like. Supplier information may include contact information, areas of expertise, caliber of customers, ratings, and the like. A confidence in buyer feedback may be established by determining that the feedback is being provided by a supplier who is or recently was receiving shipments from the supplier. This can be done by ensuring that transaction records validate that at least some supplier shipments were supplied to the buyer providing the feedback. In embodiments, information utilized in the formation of the ratings scorecard 200 may be from shipment history, such as frequency, quantity, and the like; shipment capacity estimation, which may be based on shipment data as opposed to information provided by the supplier.

Contact information may include making all contact information available to subscribers, so that they may directly contact suppliers. Areas of expertise may tell a buyer which products a supplier has shipped, which materials it has used, which techniques it has employed, and whether it has produced men's apparel, women's apparel, or both. Caliber of customers may tell a buyer which types of customers a supplier has served, such as premium, mass, discount, and/or niche customers. In embodiments buyers may rate suppliers with whom they have done business. After a buyer rates a supplier, the supplier rating facility may verify that that the two have actually done business together, such as by identifying a corresponding customs records that shows an actual import transaction in which the buyer imported goods from the supplier, from a bill of lading, from a bank-issued receipt, and the like. Thus, methods and systems disclosed herein include methods and systems for deterring fraudulent ratings by verifying the existence of the transaction purportedly rated by the buyer. This may prevent false ratings that are either too positive (such as by an affiliate or cohort of the supplier) or too negative (such as by a competing supplier posing as a buyer). After verification, the buyer's rating may become part of the supplier's scorecard. As part of the verification process, the buyer's identity may be revealed to the supplier. However, in embodiments the buyer's identity may be obscured so that it does not appear on the supplier rating facility's website and is not shared with anyone else. In embodiments, only buyers who have provided feedback on their suppliers may view buyer feedback. In embodiments, a computer facility for recording transactions associated with one or more buyers with one or more sellers may include a user interface that may facilitate determination of entity score based on transactional data. The transactional data may be related to the shipping details of the goods and services associated with different entities. In an example, entities such as buyers may order goods and services from the sellers resulting in transactions. An aggregation facility may collect, combine or aggregate transactions associated with different entities. Subsequently, an association facility may facilitate association of transactions with different entities. The transactions may be analyzed by the analysis facility to generate an entity score corresponding to each entity.

In embodiments, rating a supplier, buyer, or other entity may result in a score that is at least partially based on predefined criteria, such as a user provided criteria. Alternatively, the system and methods herein may facilitate rating of a supplier, buyer, or other entity based one or more algorithms. The rating algorithms may be manually selected, or may be selected automatically based on a set of algorithm selection rules. In an example, a supplier may be known in the industry as highly credible. One or more rating algorithms may be applied to transaction data and may use predefined criteria for the algorithms to mathematically determine the credibility of the supplier. This determined credibility rating may be provided to the buyer through a user interface of the platform.

In embodiments, the entity score may be based in part on transactional data related to the shipments by the entity such as delivery data, amount shipped, location of shipment and the like. In an example, a supplier providing goods and services within the stipulated delivery date may garner higher ratings compared to the suppliers who failed to deliver on time.

In embodiments, the entity score may be based on one more factors including country context, business legitimacy information, public recognition, amount of experience, caliber of customers of the supplier, customer loyalty for the supplier, degree of specialization of the supplier, and feedback from previous customers or some other factors. Further, each factor or group of factors may include a list of parameters. A user interface may be configured to allow a user to select some or all the parameters from this group to generate an entity rating. In an example, the group country content may include variables such as GNI per capita, currency volatility, cost to export, political stability, and the like. The user interface may allow a user to select GNI per capita and cost to export to generate a country context value that would be applied to calculate an entity rating. Furthermore, determination of the entity score may depend partially or completely on some or all the parameters selected from some or all the groups, as described herein and elsewhere. In an example, a buyer who may be interested in knowing the quality of a product or service provided by a supplier may select feedback from previous customer groups on which to base an entity score for the supplier. This group may further include parameters such as timely delivery of goods, quality of goods, number of transactions and the like. Rather than choosing just the group rating to determine an entity rating, the buyer may choose some or all the parameters from this group to determine the entity score associated with the supplier. In another example, the score associated with the supplier may be determined based on two or more groups comprising multiple parameters, such as the group pertaining to the degree of specialization of the supplier and the group pertaining to feedback from previous customers. The buyer may select the group degree of specialization and one or more parameters from the group. Similarly, the buyer may select one or more parameters from the feedback from the previous customers group. The entity score may be determined based on parameters selected in each of the groups.

A user interface, such as the user interface of FIG. 2 may be used to present the various ratings, scores, and rating factors to be applied to the entity rating score.

In embodiments, a supplier rating facility or buyer rating facility may take ratings along each of key dimensions, weight the ratings to account for the fact that some dimensions are more important than others, calculate an overall rating 110, and the like. In embodiments, ratings may provide a measure of caliber, such as the caliber of a buyer or the caliber of a supplier.

The supplier rating facility may rate suppliers across a plurality of different dimensions, some of which may derive from actual transactional data, such as customs data, with others based on sources such as Dun & Bradstreet, the World Bank, auditing firms for various certifications, government sources, and the like. In embodiments, more weight may be given to recent data, data for larger transactions, data for higher quality buyers, or other types of data with respect to which there is an indicator that the data may have higher relevance than other types of data. The supplier rating facility may also provide a more intuitive understanding to ratings, by considering caliber of customers, customer loyalty, specialization, and the like. Caliber of customers may involve manually grouping buyers into distinct bands or tiers, such as premium, mass-market, discount, niche, and the like and then computing a sum based on the newness of each buyer-supplier relationship and the tier of each buyer.

In embodiments, rating for a supplier may be based on the aggregated transactional customs data, a user defined criteria, customs data related to transactions by the supplier with a third party or on some other parameters. In an example, a supplier may be rated based on the number of transactions done with a particular buyer. In another example, a user may define adherence to delivery data as a criteria for rating the supplier. In addition, the rating of the supplier may be based at least in part on loyalty as indicated by an analysis of customs transactions. Furthermore, the determination of rating for the supplier may based on an amount of supplier experience as indicated by customs transactions related to the number of shipments, duration of supplier experience as indicated by shipments, size of transactions as indicated by past shipments, extent of international experience as indicated by past shipments, extent of country-relevant experience as indicated by past shipments and the like.

In embodiments, a rating for a buyer may be based on aggregated transactional customs data, customs data related to transactions of the buyer with a third party or some other parameter. In an example, ratings for the buyer may be based on the feedback about the buyer provided by one or more suppliers. In addition, ratings for the buyer may also be based on two or more factors selected from a group including the country context of a party, the business legitimacy of a party, whether a party is registered with government authorities, an assessment of a trading environment in a country, macroeconomic information, public recognition of a party, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, and certifications with respect to specific vendor standards and the like.

In embodiments, the rating of the buyer may be based on loyalty as indicated by an analysis of customs transactions. In an example, a buyer may be rated based on the number of transactions with a particular supplier in a specific time frame. In addition, the buyer may be rated based on an amount of experience as indicated by customs transactions related to the number of shipments, duration of experience as indicated by shipments, size of transactions as indicated by past shipments, extent of international experience as indicated by past shipments, extent of country-relevant experience as indicated by past shipments and the like.

In embodiments, a rating may be made of customer loyalty for a supplier. A customer loyalty rating method may include analyzing the set of buyers who have done business with each supplier over the course of several years, and identifying 'loyalty periods,' intervals in which a buyer consistently sources from a given supplier, and 'switches,' where a buyer ceases obtaining a given set of products from one supplier and begins sourcing from another supplier. Suppliers for whom there have been many switches may be given lower ratings, while suppliers with long loyalty periods and few switches may be given higher ratings.

In embodiments, a rating may relate to the degree of specialization of a supplier. A specialization rating method may decompose supplier shipments into dimensions, such as product category, technique, material, gender, and the like. These dimensions may be independent of the rating dimensions or may be used as a factor in rating.

In embodiments, methods and systems may include methods for generating raw scores. Generation of raw scores may use a variety of techniques to transform raw customs data and other third-party data into meaningful ratings. Consideration may be given to customer loyalty, caliber of customers, amount of experience, specialization, country context, business legitimacy, environmental responsibility, social responsibility, quality management, public recognition, and the like. Customer loyalty rating may include identifying shipping patterns, buyer patterns, loyalty periods, and the like. Caliber of customer ratings may include assigning a buyer tier, length of time in that tier, age of buyer, and the like. Experience ratings may include evaluating number of shipments, duration of experience, size of transactions handled, and the like. Specialization ratings may include or reference a measure of the extent to which a supplier focuses on a narrow range of products, materials, and/or techniques. A supplier having government registration records, a Dun & Bradstreet DUNS number, or other evidence of business legitimacy may provide business legitimacy ratings. Environmental, social, product safety, and quality management ratings may be derived from a supplier having appropriate certifications, and the like. Public recognition ratings may include reference to government and industry awards, and the like. In embodiments, high risk suppliers and high risk buyers may be identified, such as in association with individuals and organizations that work with high risk suppliers and high risk buyers. Country context ratings may be related to the country in which a supplier is located, as well as data supplied by the World Bank, International Monetary Fund, and other sources, about that country. Other sources may include GNI per capita, currency volatility, cost to export, political stability, credit_rank, export_cost, gci_efficiency_enhancers, and the like. A country context computation may include calculating a weighted sum of log(gni_per_capita), credit_rank, log(export_cost) and gci_efficiency_enhancers that may be then thresholded into final score buckets. The weights and thresholds used in the country context computation may have been determined using machine learning techniques (e.g. decision trees and principal component analysis) to determine the relevant features to weight, appropriate weights, and effective thresholds.

Generating ratings from raw scores may include a weighting, standardization or normalization factor applied to raw data to produce a standard score that may be centered on zero, and then normalized to a rating between 0 and 100. These values may then be applied to a scorecard 200 that presents the normalized data for a supplier. In embodiments, the ratings may be scaled linearly to provide a mean of approximately 50, as in a Gaussian distribution.

In addition, ratings may be customized to individual buyer preferences, such as by having buyer's rate suppliers with whom they have done business. Ratings may then be tuned to best match this empirical view of a buyer's preferences. Such an approach may use a machine learning technique such as a support vector machine. Over time, trends in ratings may then be captured and displayed to the buyer. Such trends may enable a graph-theory analysis (e.g., minimum cut, maximum flow, cliques, and the like) on buyer-supplier networks to determine the relationships between groups of buyers and suppliers, which may lead to additional value-added services such as improving production allocation for buyers.

Figure 3:
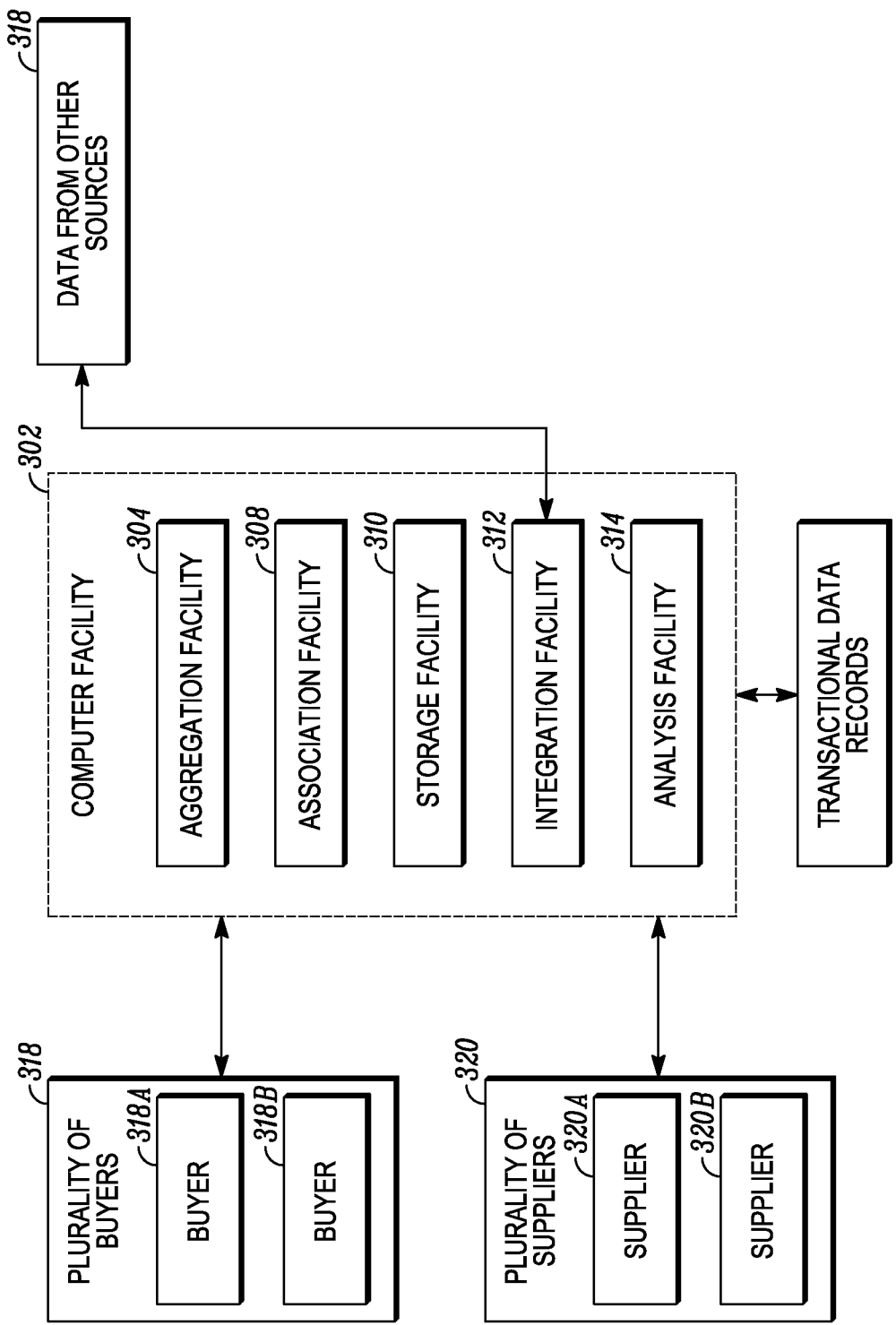
FIG. 3 depicts combining non-transaction data with transaction data in the platform.

Referring to FIG. 3, integration of transactional data with data from non-transactional data sources is shown. A computer facility 302 may receive transaction records associated with a plurality of buyers 318 such as 318A and 318B and/or a plurality of sellers 320 such as 320A and 320B. Furthermore, the computer facility 302 may include an aggregation facility 304, an association facility 308, a storage facility 310, an integration facility 312, an analysis facility 314, and the like. The aggregation facility 304 may collect and combine the transaction records associated with buyers 318 and suppliers 320 for processing at the association facility 308. The association facility 308 may enable association of transactions with different entities such as buyer 318A and supplier 320B. The association facility 308 may be coupled to any of the other facilities within the computer facility 302, such as the integration facility 312 which may receive non-transaction data from non-transaction sources 318. The analysis facility 314 may facilitate evaluation of suppliers 320 and buyers 318 based on the data integrated from other sources 318 and the data received from the association facility 308.

In embodiments, public records may include customs records apart from other records. The customs record may include information associated with an entity as captured by a customs organization. The information may be useful in identifying the different transactions associated with the entity's billing based on the entity's custom identification number.

Data sources may leverage data from several hundred data sources, such as, International Oeko-Tex Association, Social Accountability International, Worldwide Responsible Apparel Production (WRAP), Fifty-five ISO 9001 auditing firms, Forty-six ISO 14001 auditing firms, Forty-seven OHSAS 18001 auditing firms, Two GB/T 18885 auditing firms, United States Department of Homeland Security, Ministry of Commerce of the People's Republic of China, General Administration of Customs of the People's Republic of China, and the like. In embodiments, custom data may be from countries all over the world, covering exports and imports, where an import record may be matched up with an export record.

Tools used in the analysis of supplier and buyer data may include a merger tool, a suggestive merger tool, a buyer caliber tool, a buyer marketing tool, a name chooser tool, a country manager, an API, a product keyword manager tool, a statistics tool, a report generation tool, a supplier marketing tool, a name updater, and the like. Any of these tools may be embodied in the facilities of computer facility 302.

In embodiments, aggregated customs data may be processed to identify transactions associated with different types of entities such as buyers and/or suppliers. In addition, based on the transactions associated with different entities, an entity type may be determined from one or more entity types present in the transactions. In an example, an entity may supply woolen clothes and the transactions associated with the shipments of the woolen clothes may be recorded as being provided by 'ABC co'. In another transaction, the same entity may be recorded as 'ABC Company'. This variation may be due to a difference in recording of transactions of customs data due to variations in filling data in the customs form rather than the entities being different entities. A data merging facility may allow automatic merging of transaction records described above under a single entity based on the inference made on grounds of similarity of data. In this example, the variations 'ABC co' and 'ABC Company' may form a valid case of merging of data based on the minor variation in entity name. Alternatively to automatic merging, or in addition to it, suggestions for merging similar data based on similarity in data elements may be provided to a user. In the above example, records relating to transactions 'ABC co' and 'ABC Company' may be presented to the user with a suggestion to merge them under a single entity based on similarity of data elements. The similarity of data element in the records may be determined by the data merging facility. Based on the user's response, automatic merging of the two entity names may be learned by the platform.

A variety of tools/techniques for identifying companies that may be similar in some respect may be provided. A user interface may provide similarity features so that a user may identify companies that are similar. Such a user interface may facilitate identifying companies that are similar to a company (e.g. a buyer or seller) being presented to the user. The user may have selected a set of criteria for identifying a particular company and may be presented with a utility that enables the user to select these or other parameters associated with the particular company for finding similar companies. Identifying similar companies may be based on weighted similarity criteria which may be selected by a user in the user interface, extracted from a user profile, automatically selected by a similarity engine, recommended to the user, and the like. Weighted similarity criteria may include a product mix, a minimum quantity, location of a supplier, or any other factor. For example, a user might select similarity criteria including: (i) supplying "Leather", (2) sourcing from "China", and (3) a minimum order of "10 square yards" with the minimum order criteria weighted at 1.5× the other two criteria.

To facilitate accessing information (e.g. profiles, ratings, etc) of similar companies, a similarity engine may generate suggestions of similar companies based on search criteria. A user may enter the search criteria through a programming interface (e.g. an API), and the like. The similar company suggestions may include a ranking that is based on the level of similarity between the search criteria and the searched results. For example, a user may search for suppliers that supply a specific product and operate in a specific location. The similarity engine may generate one or more suggestions for companies that are similar and may rank the suggestions based on similarity to a search criteria. Similarity suggestions may be based on user behaviors and interactions with the system. The criteria used for making the suggestions may be weighted based on the user history of searches, rating reviews, and the like.

The similarity engine may alternatively be used to identify potential alternatives for a given company and those alternatives (e.g. competitors) may be offered an opportunity to provide a message, such as an advertisement, to the user while the user is viewing the similar company. For example, a user searching for supplier of "leather goods" in China might be sent offers related to a supplier of "leather goods" in India. The similarity engine may be useful to help vendors who offer products or services that may compliment other products or services to gain visibility with users seeking information about products to which they offer similar services. In an example, a user might be sent offers related to "leather dye" or "leather dying services provider" when the user searched for suppliers of "leather products". Alternatively, the similarity engine may notify a similar company of searches that were performed for which that company was suggested as a similar company. This information may be useful to a company to adjust the information by which it may be identified by the similarity engine.

An entity may be associated with one or more names for performing transactions that may be captured in customs records. As described above, the difference may be due to a variation in recording of the customs data. The systems and methods described herein may facilitate merging of any number of transactions that should be associated with a particular entity even though the records show a plurality of similar but varied entity names.

In addition to facilitating processing aggregated customs data so as to associate a set of transactions with an entity, a plurality of transactions that are properly associated with a plurality of entities may be merged under an entity type for purposes of evaluating the transactions and entities associated therewith. The merged records may be useful in evaluating a market segment, consortium of companies, industry segment, regional results, class of entities, and the like. In an example, transactions associated with several entities may be merged based on the basis of the transactions being associated with a single buyer. Even though the transactions call out different suppliers in different industries, the single buyer is a basis for processing the transactions as if they were merged.

An entity type may be defined based on any aspect of an entity that may be used to process customs transaction records. The methods and systems of filtering, classification, and clustering of transactions as described herein may be applied to identify transactions that are mergeable under an entity type. In an example, a buyer may initiate purchase transactions with four suppliers of components to produce an item. The transactions between any of the four suppliers and the common buyer can be merged (or tagged as mergeable) as having a common entity type such as "supplier to common buyer". Other suppliers who ship items to the common buyer may have their transactions with the common buyer merged under the same entity type.

Figure 4:
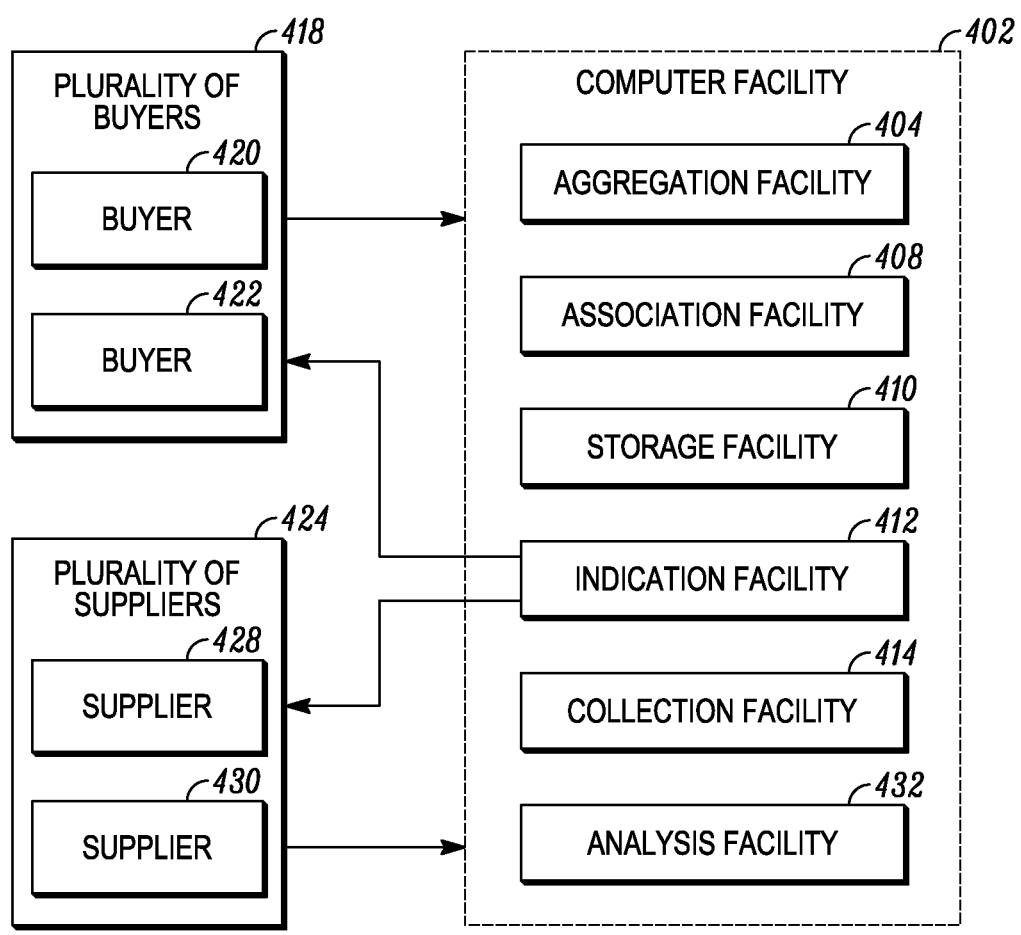
FIG. 4 depicts providing an indicator of economic leverage.

In many cases multiple data records exist for a single supplier, but the relationship of those records to that single supplier is ambiguous. In an example, the name of the supplier might appear in one field in one record, but in a completely different field in another record. This is often the case in customs data, where forms are filled out with information in various fields, notwithstanding the purported standardization of the forms. In embodiments, a merger tool may be used to merge data records of two apparent suppliers that should really be one supplier. The merger tool may evaluate an address, and if the same in two records, select a parent record and identify child records, upon which records are merged into a single record. In embodiments, a merger tool may merge records that are on the same page or more generally merge records across a database. In embodiments, a merger tool may use a pattern matching technique to identify potential candidates for merging of records As shown in FIG. 4, an indicator of economic leverage may be provided. The economic leverage may be based on an analysis of customs transactions data. The indication of the economic leverage may be provided by an indication facility 412 of the computer facility 402. The computer facility 402 may also include a collection facility 414, a storage facility 410, an aggregation facility 404, an association facility 408, and an indication facility 412. The collection facility 414 may collect a plurality of records of customs transactions of a plurality of buyers 418. In addition, the collection facility 414 may collect a plurality of records of customs transactions of a plurality of suppliers 424. In an example, the collection facility 414 may collect the record of customs transactions of buyer 420 and buyer 422. In addition, the collection facility 424 may collect the record of customs transactions of supplier 428 and supplier 430. The storage facility 410 may store the plurality of records of customs transactions of the plurality of suppliers 424 and the plurality of buyers 418. The aggregation facility 404 may aggregate the transactions. The association facility 408 may associate the transactions of the plurality of suppliers 424 and plurality of buyers 418. The association facility 408 may associate the transactions with entities. The entities may include, but may not be limited to, companies, buyers, sellers, suppliers, distributors, factories, subsidiaries of a supplier and the like. An analysis facility 432 may analyze the aggregated transactions. The indication facility 412 may provide an indication of economic leverage with respect to an entity based on an analysis of the aggregated transactions. In an example, the indication facility 412 may indicate to the buyer 420 that it would be economical to buy 40 tons of silk fabric from the supplier 428. Similarly, other economic indicators may be provided to the plurality of buyers 418 or the plurality of suppliers 424.

In embodiments, the indicator of economic leverage may be with respect to the supplier 428 based on transactional customs data for the supplier 428. In embodiments, the indicator of economic leverage may be with respect to a supplier 428 based on transactional customs data for a party other than the supplier 428. In embodiments, the indicator of economic leverage may be with respect to a buyer 420 based on transactional customs data for the buyer 420. In embodiments, the indicator 420 of economic leverage may be with respect to a buyer 420 based on transactional customs data for a party other than the buyer 420.

Figure 5:
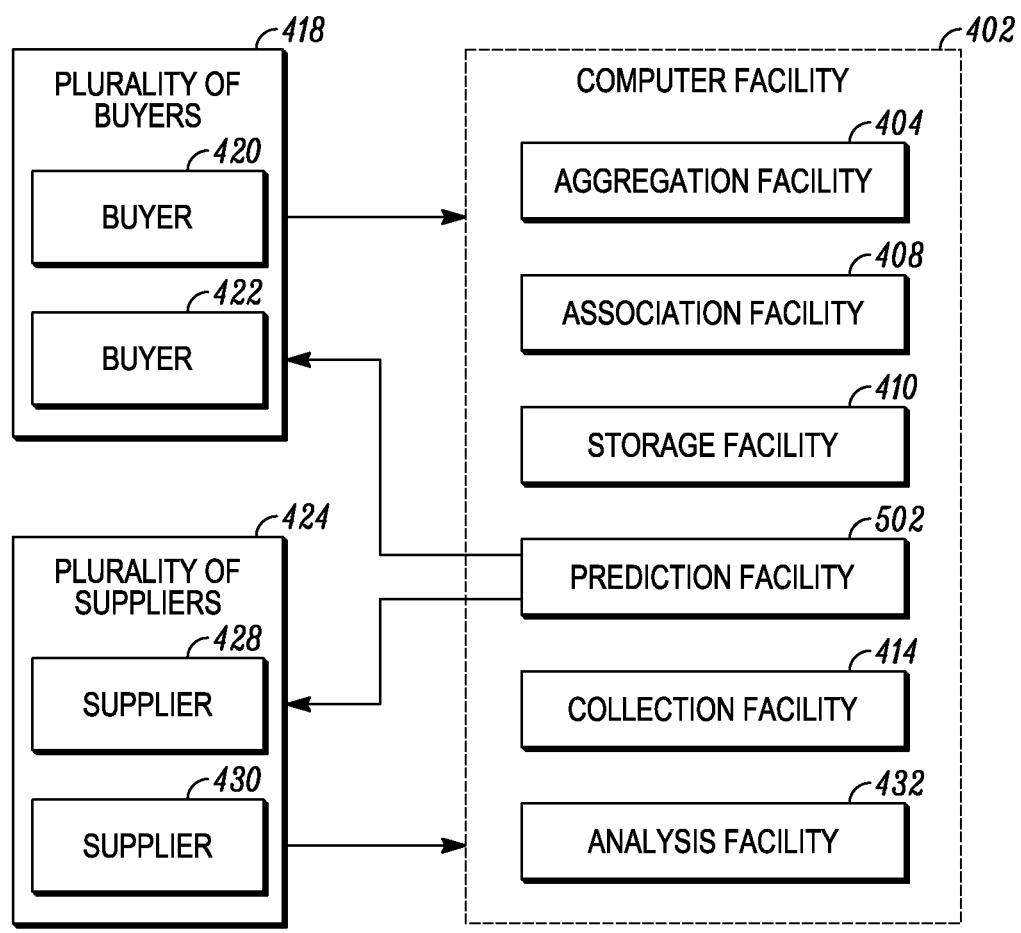
FIG. 5 depicts predicting an action based on customs transactions.

In embodiments, as shown in FIG. 5, a prediction facility 502 may predict an action of an entity. The action may be based on the analysis of the aggregated transactions. The prediction may relate to whether the supplier 428 will work with the buyer 420 of a given size. The prediction may also relate to whether the supplier 428 will work with orders of a given size.

In embodiments, the prediction may be of an action of the buyer 420 based on an analysis of customs data for the buyer 420 transactions. The prediction may be related to a price, a change in price, a change in supplier, a quantity ordered by the buyer 420 and the like. In embodiments, the prediction may be of a buyer action of based on an analysis of customs data for transactions by a party other than the buyer 420. In embodiments, the prediction may be of a supplier action based on an analysis of customs data for transactions by the buyer 420. In embodiments, the prediction may be of a supplier action based on an analysis of customs data for transactions by a party other than the buyer 420. In embodiments, the prediction may be related to a potential closure. The closure may be of a subsidiary, a factory, a company and the like. Those skilled in the art would appreciate that the prediction facility 502 may provide the predictions to the plurality of buyers 418, plurality of suppliers 424 or some other entities.

Figure 6:
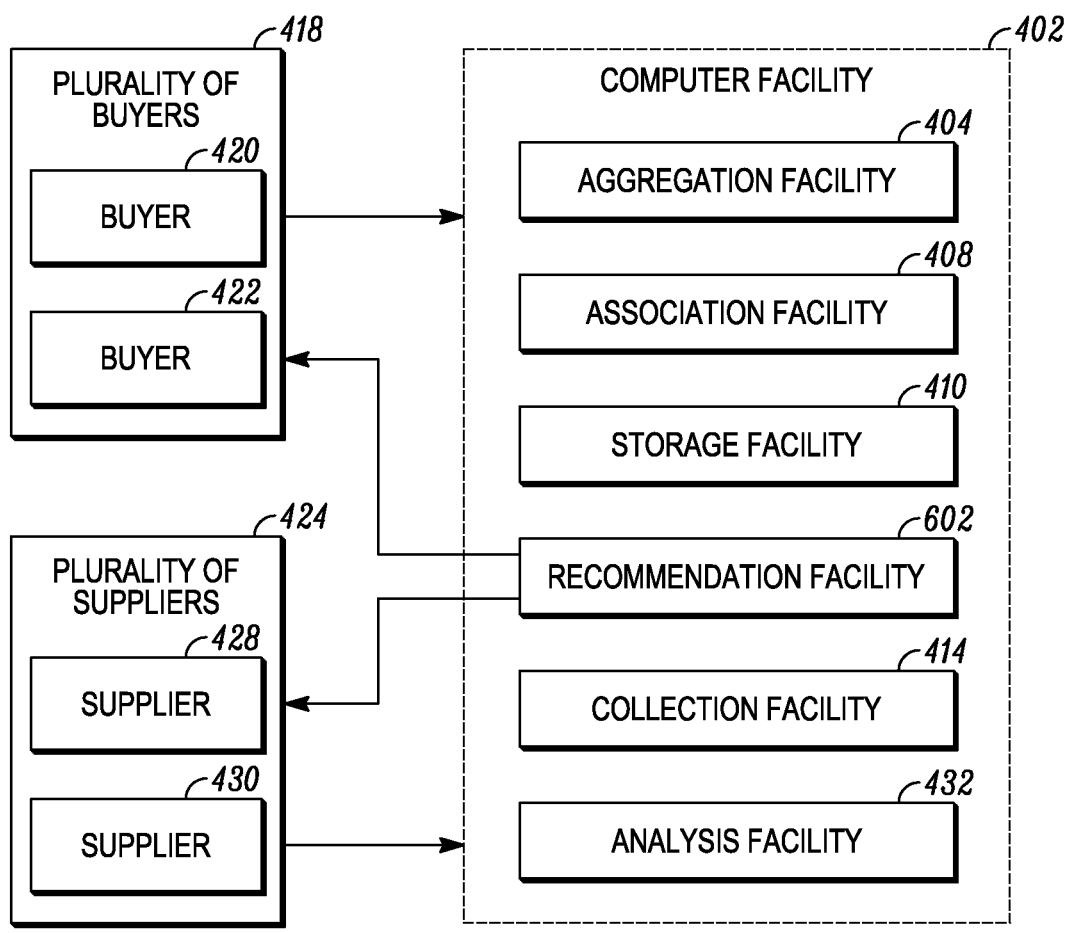
FIG. 6 depicts making a recommendation based on customs transaction analysis.

In embodiments, as shown in FIG. 6, a recommendation facility 602 may provide recommendations based on analysis of customs transactions. In an example, the recommendation facility 602 may recommend to the buyer 420 to buy 40 tons of silk fabric at a discounted price from the supplier 428 based on transaction records indicating that the supplier has received returns of the silk from buyers. Similar recommendations may be provided to the plurality of buyers 418 and to the plurality of suppliers 424.

In embodiments, the recommendation may be based on analysis of customs data for the buyer 420 transactions. In embodiments, the recommendation may be based on analysis of customs data for transactions by a party other than the buyer 420. In embodiments, the recommendation may be based on analysis of customs data for transactions by the buyer 420. In embodiments, the recommendation may be based on analysis of customs data for transactions by a party other than the buyer 420.

In embodiments, the recommendation may be based on prioritization of factors by a user. In an example, the buyer 420 may require 40 tons of silk within 4 days. The recommendation facility 602 may recommend buying 40 tons of silk from supplier 430 based on its manufacturing capacity of 50 tons per day and ability to provide the required silk within the stipulated time. In embodiments, the recommendation may be based on a user-specified rating factor.

In embodiments, a suggestive merger tool may use more sophisticated techniques to suggest which buyers or suppliers should be merged together, such as the supplier in question listed, then producing potential matches. Such techniques may use text similarity metrics on the name and the address and performing algorithmic steps such as sorting the tokens by alphabetical order, so word transpositions do not change lexical distance of names in pattern matching. Such techniques may determine how each word in a given buyer or supplier's name or buyer's name contributes to the uniqueness of the name, and uses this information to make relevant suggestions for merging. In embodiments, a suggestive merger tool may use a machine learning approach to perform pattern matching or otherwise suggest merger of records, such as a technique with boosted trees or other machine learning techniques.

A buyer caliber rating may be assigned manually by checking a box based on a facilitator's or host's assessment of the caliber of the buyer, or by automated techniques. In embodiments, a search link may be provided for each buyer, such as one that retrieves search results from a search engine, directory, rating system or other source of information about the buyer. In embodiments, an interface, such as an overall buyer manager, may assist suppliers in searching for different buyers.

In embodiments, a buyer marketing tool may break down data for a particular supplier, such as addresses (from customs data), raw customs records, records that show customer loyalty periods and switches to other suppliers, specific breakdowns of what the supplier has shipped (e.g. in terms of product category, material, technique, gender of the shipped garments, and the like), breakdowns of the size of the shipments the supplier has made, breakdowns of the number of shipments that the supplier has made each month over some time period, as to determine the estimated capacity of a supplier, and the estimated minimum shipment that a supplier is willing to produce. In an example, a tool may show a breakdown of suppliers (e.g. showing a number of suppliers, such as 35 suppliers in ratings for each), where it is possible to see a history of which suppliers buyers have used. This may allow marketers to evaluate their performance relative to other suppliers with whom they compete.

A country manager tool may be used to add data on countries (such as for the country context dimension of an overall rating 110 or analysis).

In embodiments, an application programming interface may be provided for the platform described herein, whereby other computer programs may access the reports generated by the platform, such as accessing overall ratings 110, specific components of ratings, results of particular algorithms, or data sources used in the platform. Thus, other parties that engage in global trade, such as clients of the facilitator and partners, may obtain access to the platform, allowing the ratings managed by the platform to become a standard measure by which suppliers are rated.

A product keyword manager tool may provide an ontology or hierarchy for a search interface, such as using graphs, charts, and the like. The manager may allow a facilitator to add or delete sub-categories to a category. Keywords associated with each of the categories may be useful for: (1) getting the data (allowing a user to scan through raw text of customs data, looking for these keywords, which is one way for the facilitator to know that a supplier has shipped something within a category; In an example, a search for infant clothing might search for all sub-categories, using words such as baby, infant, kiddy, kid, layette, maternity, newborn, toddler, and the like); and (2) using keywords for text entry into the search field (such as synonyms to get better search results). In an example, in a hierarchy of materials, there are sub-materials of materials, and each has keywords associated with it. In embodiments, a facilitator may engage in a process (manual or automatic) to generate key words, such as using glossaries that list all of the products and materials, with specific definitions. In embodiments, algorithms may be used to determine the market vertical (e.g., apparel supplier or electronics supplier, etc.) of a supplier based on the aggregate contents of all of its shipments. In embodiments, customs records may be utilized to identify what industry or vertical the material is in.

A statistics tool may assist in providing distributions of data. Thus, a facilitator may support statistical distributions for all dimensions of data analyzed by the methods and systems of the platform.

A bucket boundary check tool may assist in testing that suppliers that fall within specific rating "buckets" or bins (e.g., Excellent, Unproven, etc.) by showing suppliers that are at the high and low boundary of each bucket.

A report generation tool may automatically build PDF reports or reports in other output formats, such as PowerPoint, Excel, Word, and the like. The report generation tool can be used as an administrative tool, or as a tool to allow users or clients to build custom reports, such as ones that incorporate some or all of the data generated by the platform. In an example, a user may specify which supplier or suppliers the report should include. A report could be made vertical-specific, covering a number of suppliers in a vertical, such as a theme or characteristic grouping, or it could relate to standout suppliers (such as ones with high customer loyalty ratings, top amounts of experience, or the like). In embodiments, a user may turn on or off various sections. In embodiments, the end product of a report may be a link that allows the user to download the report (in PDF format or some other format) or which sends the report via email (in PDF format or some other format).

In embodiments, a buyer marketing tool may provide information about what product materials, product techniques, and the like particular buyers require from their suppliers. Such a tool may also provide information relating to how many shipments particular buyers imported over time, as well as the breakdown of shipment sizes.

Figure 7:
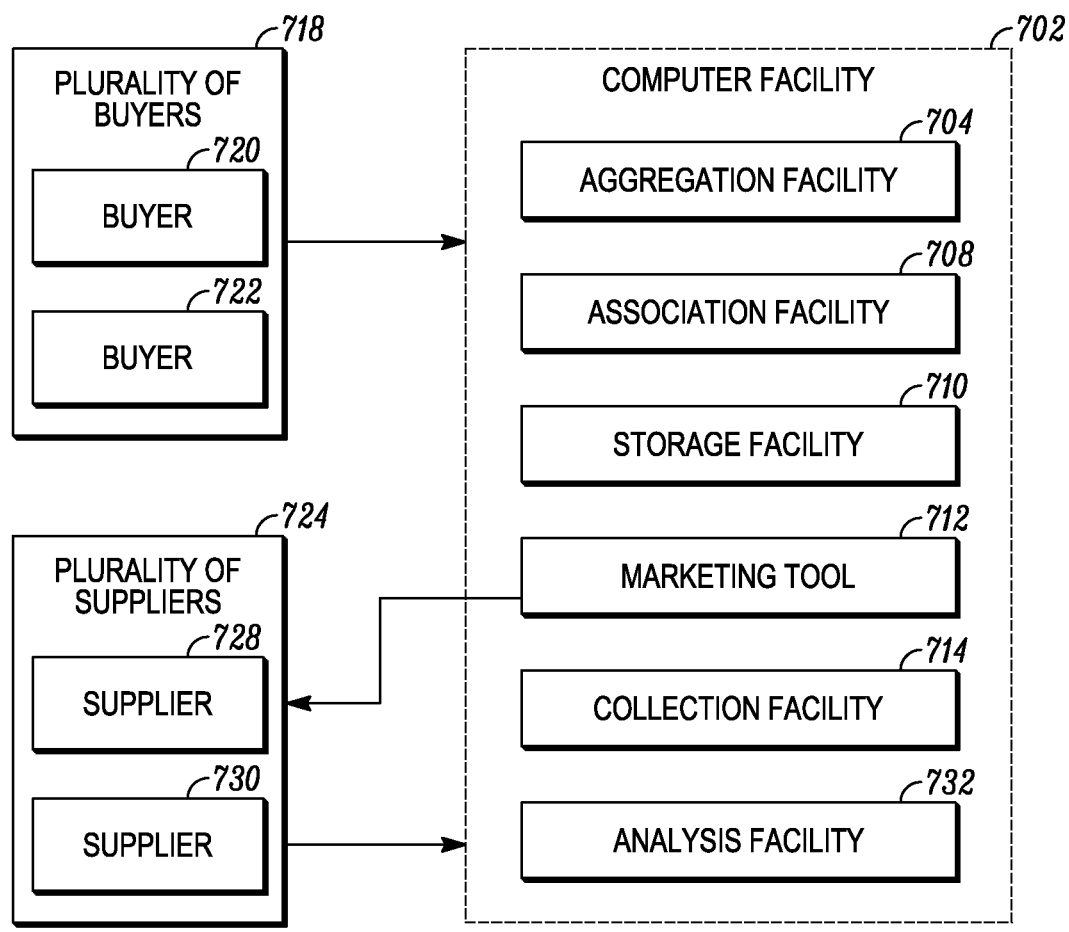
FIG. 7 depicts a marketing tool for a supplier
Figure 8:
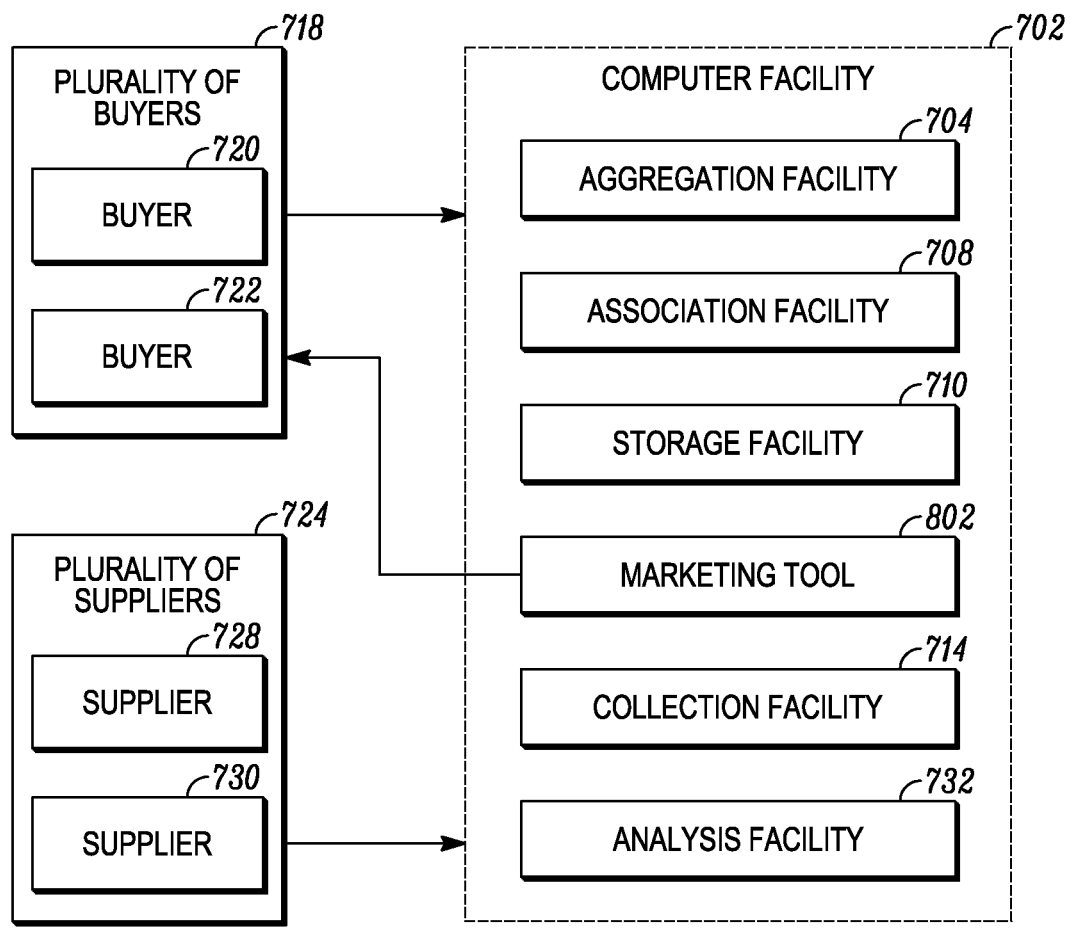
FIG. 8 depicts a marketing tool for a buyer

A marketing tool may be used by an operator of the platform to at least identify opportunities of marketing the products and services associated with the platform to suppliers, buyers, and others. The marketing tool can also be accessed by suppliers as shown in FIG. 7 and by buyers as depicted in FIG. 8. However, when used by the operator or owner of the platform or of an implementation of a portion of the platform, the marketing tool has significant capabilities. The marketing tool may work collaboratively with other elements of the platform, such as elements that perform aggregation, association, merging, storage, collection, analysis, user interface and the like. A marketing tool may be used to identify instances of potential scenarios (e.g. suppliers in financial distress) to offer entities that may be potentially impacted by the scenario instance (e.g. the supplier's shippers, buyers, suppliers of raw goods, and the like) with services and products available through the methods and systems described herein.

The marketing tool may also work cooperatively with a user interface to facilitate an operator entering parameters of marketing opportunity scenarios that the marketing tool can evaluate. The entered scenario parameters and attributes may be applied to an analysis of customs transaction data and marketing opportunities may be presented to the operator through the user interface.

As shown in FIG. 7, a marketing tool 712 may be provided for a supplier 728. The marketing tool 712 may be provided in a computer facility 702. As explained in the description for FIGS. 4, 5 and 6, the computer facility 702 may include a collection facility 714, a storage facility 710, an aggregation facility 704, and an association facility 708. The collection facility 714 may collect a plurality of public records of transactions among a plurality of buyers 718 and a plurality of suppliers 724. In an example, the collection facility 714 may collect the public records of transactions between buyer 720 and supplier 722. The storage facility 710 may store the plurality of public records of transactions among a plurality of buyers 718 and a plurality of suppliers 724. The aggregation facility 704 may aggregate the transactions. The association facility 708 may associate the transactions with various entities that may include, but may not be limited to companies, buyers, sellers, suppliers, distributors, factories, subsidiaries of a supplier and the like. An analysis facility 732 may analyze the aggregated transactions. The marketing tool 712 may suggest a marketing strategy for the supplier 728 based on analysis of transactional data from public records. In an example, the marketing tool 712 may suggest to the supplier 728 that it would be lucrative to sell 100 tons of silk fabric every week to the buyer 720 located in the United States of America. Those skilled in the art would appreciate that the marketing tool 712 may suggest marketing strategies to a plurality of suppliers 724 simultaneously.

As shown in FIG. 8, a marketing tool 802 for the buyer 720 may be provided. The marketing tool 802 may be provided in a computer facility 702. The marketing tool 802 may suggest a marketing strategy for the buyer 720 based on analysis of transactional data from public records. In an example, the marketing tool 802 may suggest to the buyer 720 that it would be lucrative to buy 50 tons of silk fabric on a monthly basis from the supplier 728 located in China. Those skilled in the art would appreciate that the marketing tool 802 may suggest marketing strategies to a plurality of buyers 718 simultaneously.

Processing customs transactions and other records may involve a multi-step method. Data from customs organizations, such as US Customs may be provided on a removable computer memory such as a CD, DVD, flash memory, memory stick, USB memory card, and any other type of removable or portable memory device. Alternatively the customs data may be acquired via a network, such as the Internet, a dialup connection, a virtual private network, a dedicated network, and the like. The data may also be converted from a proprietary format for further processing by the platform. Each customs organization, and within any customs organization for a particular country may have a different format or storage device for records. Conversion may be performed on the data so that the end result is independent of the physical format of delivery and the logical formatting of the information. In this way data in a substantially unified format may be processed by the methods and systems of supplier rating and the like that are herein disclosed. In an example, US customs data may be provided on a CD and may be in a COBOL format. The data on the CD may be retrieved and automatically loaded to a server. The server or another computing device may convert the data from the COBOL format to an XML format. The XML formatted data may be loaded to a database such as a Postgres database for further processing. In this example XML format represents a unified format for the customs data.

Processing the converted transaction data may include multiple steps of data analysis in which a confidence level may be applied. Confidence levels may be grouped into confidences bands that may help target each transaction toward one of merging (high confidence band), suggest human-aided merging (medium confidence band) and do not merge (low or lacking confidence band). Analysis of the transaction data may reveal important information about the entities involved in the transactions. In an example, a single entity may appear as a buyer in one transaction, a shipper in another and a supplier in a third. Ensuring that each transaction is properly associated with the entity as its intended function (buyer, shipper, and supplier) may be accomplished through various analysis and assessment techniques including, similarity assessment, filtering, classification, clustering, and the like.

Processing of customs data may also include text mining. Text mining may include searching for key words, terms, or phrases that are known, predetermined, or specified for the mining operation. An ontology of terms, such as 'gender dyeing' may be applied in text mining. In addition, synonyms of keywords may be mined. Text mining also facilitates populating reports with various data, such as time series data of shipments per month and weight of shipments per month.

Data may be further analyzed with a monitoring tool that may look for anomalies, such as peaks, and other statistical measures to identify potentially important events that are captured in the transactions. Analyzing data for peaks and the like may help with activating buyers, suppliers, shippers, and other entities for use in the platform. A statistical event, such as a spike in orders by a buyer that otherwise had little transaction history may trigger an indication that the buyer should be activated for use in ratings of buyers, suppliers, and the like. Alternatively, or in addition, an entity may be activated based on the transactions for the entity complying with criteria such as a shipment quantity threshold, and the like.

Merging data ensures that all records of transactions associated with an entity (buyer, supplier, or the like) are properly recorded against the correct entity. However, due to the large number of data sources, substantial variations in how an entity may be identified in records from the data sources, parent-subsidiary entity relationships, transaction system limitations (e.g. limiting the number of characters in an entity name), regional differences, dialect differences, use of short hand for entity information, various coding schemes used by buyers, suppliers, and the like proper merging of data is complex and difficult. Data may be received in tabular format with column headings indicative of an expected type of data to be found on each row. IN tabular format, data in each row under a column heading of "Company Name" is expected to include a company name. Data may also be received in record/field format in which each field of each record includes a field identifier and a value. The platform analyzes the data in these and may other disparate data formats to perform the merging functions described herein.

In a fundamental example, merging is taking two records for the same entity that each has entity information that varies substantially one from the other and ensuring that the records are properly recorded against the one entity rather than being assigned to two separate entities. A merger tool may provide robust, accurate, and efficient merging of data by resolving the variations, some of which are described above so that records for a single entity are merged, while ensuring that records for a different entity are kept separate from the single entity.

Within any given country, industry, region, or language there is no universal entity identifier that could be applied to the data records to uniquely identify which entity is associated with each transaction record. Also, with data records being provided by sources from many countries, in many industries, and across many languages the merging challenge is increased. A way to meet this challenge today is to perform processing of the text that is present in the records to determine which records should be merged under an entity. Various techniques of text association, filtering, character grouping, thesaurus lookup, machine learning, natural language processing, search-based comparison, classification, known entity matching, clustering, and the like may be applied to identify mergeable records. The complexity and challenge present in merging may require applying each technique in an intelligent way so that highly computation intensive processes such as classification are used appropriately.

One objective of merging is to take a set of input records and match them to entities that are already known to the platform, such as entities already included in an entity database or other database of the platform. When a match cannot be determined automatically with a sufficient confidence level, then information may be presented to an operator or user of the platform to make a final determination of the entity associated with the record(s).

The methods and techniques for identifying mergeable records may be programmed into a processing unit and run in a sequence that facilitates rapid and robust merging of records. Merging of records may be performed as a continuous process rather than a batch process so as new datasets or changes to an existing dataset are presented, updates to mergeable relationships may be determined. Also, because updates or new datasets may be presented at any time, and without any particular coordination among them, continuous processing that is not necessarily tied to any event or schedule is preferred. At least three types of processing may be performed on records for merging assessment: filtering, classification, and clustering. Each processing type will be described now.

Because classification and clustering may be very expensive in terms of compute/processing time, filtering is applied to distinguish candidate records for classification from records that are unlikely to be mergeable under a single entity. Filtering provides various techniques to help identify only the records that classification may have any chance of merging. Filtering for the purposes of merging may be considered a coarse sort of the records, capturing candidates for classification and passing through those records that appear to be far removed from the captured records. Filtering may be performed by a variety of filter-type algorithms. In one example filtering may be performed by search engine software, such as the open source lucene search engine. In another example of filtering, sometimes referred to as "kgram filtering", several small consecutive strings of characters are captured from each of two records and compared. Kgram filtering may be based on techniques of dynamic programming. In an application of kgram filtering, when a sufficient number of the character strings match between the records, the records may be identified as potential candidates for further processing such as classification and clustering. One benefit to kgram filtering is that it offers the filter designer many options, such as allowing overlapping character strings, defining the length of each character string, determining the quantity of matching strings required to mark the record(s) as classification candidates. In this way, an entity name or entity identifying information (that may include entity name, logo, phone number, address, and the like) need not be an exact match, but instead needs enough matching character strings to exceed a kgram filter threshold. In an example, a kgram filter may compare overlapping character strings (kgram filter group) of 10 characters and may require that at least 10 of the character strings must match (kgram filter threshold) for the record to be identified as a potential candidate for classification and clustering. Because records received and processed by the platform may have information within certain fields that may be incorrectly placed there (a personal name in an entity name field) filtering can be used to quickly separate out records that are incorrect.

Filtering is preferentially performed against the other records in any given data set, without specific consideration of existing entity profiles or known data. This results in determining potentially mergeable records within any given dataset. However, information about entities is known to the platform from all previously processed datasets and this information can be beneficially applied during filtering to improve confidence levels in the filter results. Entities may be known to the platform based on characteristics such as entity name, address, country, and the like. Filtering may employ the techniques described above to also determine potential matches between known entities and entities found in the dataset being processed. These potential matches with known entities may be graded or rated in such a way as to improve the confidence level of the relative matches found within the dataset.

Similarly, information from previously processed datasets may be beneficially applied to help identify elements in the dataset being processed. Data in the dataset being processed may be compared to data known to the platform (e.g. country names, freight forwarding services, addresses, product types, and the like) to produce a set of ratings of how well the data in the dataset being processed matches to the known data. The outcome of this matching may be combined with the known entity matching to improve likelihood of the potential matches within the dataset being processed.

Another merge technique is called classification. Classification may be performed on any records, although records that have been identified by filtering as candidates for classification may yield faster and more robust classification results. Because records with non-matching entity information may be records of a single entity, classification uses text, language, mathematical, and other analysis techniques to identify a likelihood that two records are from the same entity. Classification includes a variety of techniques including canonical adaptation, specific cleanups, multi field comparison (name, address, phone number, etc), edit distance algorithms, vector generation, machine learning, decision tree, and the like.

In canonical adaptation, entity information in records is adapted to eliminate differences that should not impact classification. Differences such as abbreviations of words (rd. for road, ave for avenue, CA for California, and the like) can be normalized in the records. Punctuation and other characters that may have minor impact on a classification may be removed or marked to be ignored during various classification and clustering techniques. In addition to canonical adaptation targeted cleanups may be applied to further normalize the data. Cleanups may help to resolve deficiencies in the records such as an incorrect country of origin, which is a common deficiency. Cleanups may be based on information about the domain of the records to further enhance entity identification and merging. Cleanups may be based on geographic or regional knowledge, market verticals, industry norms, and the like. In an example, within a market vertical, variations of textile suppliers names may be applied to quickly align the various names to a normalized or canonical entity name; thereby reducing the degree of complexity that further classification techniques will have to deal with. The result may include less complex mathematical computation. Cleanups maybe targeted at specific aspects of the records, such as entity names, city names, street names, phone numbers, and the like. Any number of these cleanups may be applied sequentially or in parallel to data records to improve mergability of the records.

To account for differences in data entry that may result in a very low classification score, classification techniques herein are applied to individual fields (entity name field, address field) as well as to combinations of fields (entity name+ address field) so that a record with an entity name in an address field can still be identified as mergeable with other records that have the address in the address field.

Data that has been cleaned or adapted as described above and elsewhere herein may be processed through edit distance metric algorithms such as Wagner-Fischer, Levenshtein, Jaro-Winkler, and the like. The result of which may be a complex vector of numbers that represent dimensions of similarity associated with the various classification techniques applied. The vectors of similarity may be based on other classification and text analysis techniques as may be know to those skilled in the art. All such classification and analysis techniques may be applied to the records by the platform and are included herein.

Machine learning and other artificial intelligence techniques may be applied to determine if similarity vectors of pairs of records identify records that can be merged under a common entity. Through the use of training vectors, and decision tree logic, record mergability may be further assessed and a measure of such mergability may be made available to clustering techniques. The result may include an identification of pair-wise matches among all of the classification candidate records.

Training vectors may be derived from transaction data. A set of transactions may be identified as a training set that may be useful in establishing prediction parameters for associating shipments with attributes such as a type of entity, type of supplier, type of product, product feature or attribute, type of material, and the like. A training set may also be useful for facilitating association of a shipment with an entity by enabling development of prediction parameters that may be used therefore. By identifying candidate relationships between shipments and attributes or entities, training sets of transaction records may reduce the computational load required for comprehensively filtering, classifying and clustering. In an example, a record may be presented to a processing facility such as an analysis facility J32. The processing facility may select prediction parameters based on one or more data fields in the record. Certain fields in the transaction record may be compared to a portion of the prediction parameters to predict an entity to associate to a transaction record.

Prediction of an attribute associated with a transaction or customs record or any other data record in various datasets may be useful for rolled up, aggregated, or otherwise cumulative transaction data. Because transaction records may be individual shipment records, aggregated transaction records, rolled up or summarized transaction data, and the like, predicting an attribute that may be associated with rolled up transactions may allow the platform to gain significant benefit from otherwise non-specific data. In an example, US customs records may record each shipment from China as an individual customs transaction record but the transactions may not identify the supplier, just the shipper and buyer. However, China may only provide a rolled up transaction that cumulates similar shipments over a period of time, such as a calendar month. The rolled-up transaction data from China may have some data elements that distinguish it partially, such as a product identifier, source region, shipper, supplier, and the like. The US customs transaction data for a calendar month may be used to identify prediction parameters that may be applied to the China transaction data to predict the supplier. When US customs training set data such as shipment quantity, shipper, and the like are applied to the China data, a supplier may be predicted for the rolled up China transaction data.

An objective of clustering is to cluster as many data records that should be merged under a common entity as possible. Clustering may result in all of the variations of one entity being identified as one entity. A technique for clustering that may be applied is referred to herein as p-percent clustering. In p-percent clustering, a pair match threshold is established and any record that matches at least the threshold percent of records in any given cluster will be added to the cluster. In this way, although pair-wise matching identifies all pairs of matched records, clustering allows records that do not all match each other to form a cluster. In an example, if a p-percent threshold is 25% then any record that pair-wise matches at least 25% of cluster members may be added to the cluster. In an embodiment, dynamic p-percent may allow dynamic adjustment of p-percent based on an aspect of the cluster, records, and the like. In an example, p-percent may be set low for a small cluster and may be increased for a large cluster. P-percent clustering ensures that records that have strong matches to some of the members of the cluster can be properly included in the cluster. P-percent offers significant advantages over single dimension (single link) clustering techniques.

Filtering, classification, and clustering are important and facilitate merging of intra data source records (e.g. new transactions for an existing company) as well as external data source records (e.g. US to China customs data records). These techniques are also applicable to determine potential matches of records in non-transaction datasets (such as financial reporting datasets, government records, industry records, company records, inventory records, market analysis records, and the like.) Also these techniques may be useful in classifying entities into industries or markets.

These and other merge techniques can be applied to determine matches between records in a new dataset and existing data, such as existing entities. Existing entities may be entities that are known to the platform from processing various data sets. Each entity known to the platform may be configured with an entity profile that may include or reference the various risk, opportunity, and other profiles described herein. The merging techniques described herein may result in a match likelihood score or confidence level for each record processed. If the match likelihood score is above a configurable threshold, the platform may automatically convert a potential match to a known match and allocate the data record to a particular known entity. IF the match likelihood score is lower than the threshold, then various manual assisted techniques, such as the suggested merger tool described herein or the user interfaces for configuring parameters to guide automatic merging may be employed to facilitate converting a potential match to a known match.

Because an entity profile is generally determined by at least an entity name and an entity address and it is common for an entity to be associated with more than one address across various datasets, techniques for determining which of the various addresses are to be associated with the entity as the primary address may be determined from the statistical mode of the records. Therefore, if an entity name is found in various datasets to have three different addresses, the address found in the greatest number of matched data records may be allocated as the primary address of the entity. However, the other addresses may also be allocated to the entity as tertiary addresses for the purposes of facilitating matching new data records (e.g. new datasets) to the entity.

Information about known entities may be weighted based on a confidence level of the entity. Information for entities for which the platform has processed large amounts of data may be weighted more heavily in a matching process because the large amounts of data may statistically improve the confidence in the information. As a result, data in a dataset being processed that potentially matches to heavily weighted data may more readily exceed an automatic match threshold.

As changes to datasets are processed, previously known matches may be brought into question and may be marked for review. The automated techniques described above may not always provide a match likelihood score above the configurable threshold for changed records. In such situations, manual assist techniques and match adjustment user interfaces may also be used to facilitate improvement or correction.

The platform may also incorporate business rules associated with various datasets. Business rules may impact the use of data records in a dataset. Business rules may limit, for example what information may be made available to the users of the platform, such as to preserve the confidentiality of entities or individuals in the dataset. In an example, while non-identifying information in a dataset (such as an industry classification of an entity) may be forwarded to users of the platform, the entity name may be required to be kept confidential. In another example, entity names may be used internally within the platform for matching and data analysis purposes as described herein but the entity names and any entity identifying information (e.g. address, phone, and the like) may be required to be kept confidential. Another example is that some fields of a restricted dataset may only be shown to an end user if it (or perhaps some distinct other fields) are corroborated via a different data source also merged to the entity. For example an entity can be presented as a certified entity along with the name and address and certain other bits of information if the entity is matched/ corroborated by entity name and address with the name and address of an entity from a different dataset. Although the match need not be exact, it must be sufficiently close to satisfy the match/corroborate business rule associated with the restricted dataset.

As each new entity is detected, it is assigned an ID. This ID is beneficially applied to link particular data records in the many different data sources so that at any point in time, the data that has been matched to the entity with a specific ID is known. Generally the association(s) between one or more IDs and a data record are stored in a database of pointers to records in the various datasets that may be organized by the ID. In this way, each record that contributes to each ID is traceable. Because the data provided in the data sources is not completely static, (e.g. an updated version of the data source is provided) updated versions of a data source must be analyzed to determine if the matches that existed before the update are still valid. Matching activities based on updates of any of the many data sources may impact an entity profile and therefore change one or more key parameters associated with an ID. This may result in some previous matches between records in an unchanged data set and the updated profiles being determined to be invalid and the invalid matches are reassigned to a different ID. Likewise changes to profiles (e.g. resulting from matching based on an updated dataset) may result two entity profiles being merged into one updated entity profile and therefore the merged entity now has two IDs associated with it. As a result, the records that are currently associated with either of the two existing IDs are combined under the updated entity profile. Within this framework of shifting entity profiles, updating records, and movement of record-entity associations, customers look for consistency in the resulting aggregated data and analytics. Therefore persistence of associations must be supported to provide consistency while maintaining accuracy across the data sets. Although IDs link records to entities, IDs may not be unique in relation to entities. It is possible (and common) for several ID's to point to one entity. This means that one entity can have several ID's. This happens when new information (or algorithmic improvements) allow a determination that all or portions of two formerly distinct entities are in fact the same entity. For example ID X points to entity A and ID Y points to entity B and information changes allow us to determine entity A and B are the same and may be called entity AB for simplicity of this example. ID X and ID Y will now both be associated with entity AB in perpetuity to support existing customers. In addition a new ID XY will also be assigned to entity AB to make facilitate tracking of new records that match to entity AB. If entity AB is later split into two separate entities (e.g. determined to consist of data from multiple entities) ID X, Y, and XY will be used to track the largest number of records that remain matched to one entity and new IDs will be assigned to the other records. An extension of the ID use may be to keep an audit trail of entity mergers and splits along with ID reassignments.

Persistence of relevant associations of data records to an existing ID is important for customer-level views. However, due to the dynamic nature of the data records and the matches of records with entities that result from new information that improves entity matching and overall match confidence levels, customer-level view persistence is handled contextually. Contextual persistence handling may allow accurate associations between records and entities while ensuring that changes to profiles that result in changes to the matches of records to those profiles maintains the greatest share of an existing customer view. Simply put, when records that are associated with one entity are split among two or more entities based on a change in the profile or in an understanding of the content of the records (match changes), the ID that was associates with all of the records maintains an association with the largest newly matched group of records and different IDs are associated with the other records. In an example, splitting a matched set of ten records based on a new understanding of the entity profile to which these ten records are matched (entity T) may result in the profile for entity T being split into two profiles: entity T profile and entity T1 profile. The ten records that were associated with profile T were associated through unique ID W. When the ten records are matched to the new profiles, six records are determined to be matched with entity T1. As a result, unique ID W is designated as now being associated with entity T1 rather than entity T because the majority of the existing matches that are associated with ID W now match entity T1. Consequently, the updated profile for entity T and all of its matches will be associated with a different ID.

In this way, although the platform can re-analyze any dataset and find different results based on the additional entity information that has been collected since the last time a dataset was analyzed, clients can be provided a consistency in analysis output over time even while an assessment of the underlying data changes.

Industry or vertical classification may be accomplished by using data associated with a shipping record and/or other data sources to determine which industry an entity (buyer, supplier) is associated with. As described above, machine-learning techniques such as decision trees can be used to classify individual data records.

The customs transaction data can be mined to automatically build training data for vertical classification. Standardized codes such as the Harmonic Tariff System (HTS) codes embedded in the free text commodity fields can be extracted and used to determine a vertical associated with a record. Along with the HTS code text in the commodity field maybe mined to train a vertical classifier facility. The vertical classifier facility can then be used to predict or determine a vertical classification of customs records. In an example, a commodity field of a record may be "HTS 6209180 Red cotton pants".—The extracted HTS code 6209180 may be determined to be associated with a garments industry vertical. The extracted label "red cotton pants" may be recognized as apparel in our training data. If "red cotton pants" is not recognized, then it can be added to the apparel training data. Generally only a small fraction of customs data has HTS codes; therefore training a classifier and applying the trained commodity entries to new records may facilitate classification of the remainder of the transaction record. Because the vertical classifier may be a self-learning facility, each new record processed by the classifier can enhance the vertical classifier ability to classify new records. In addition, hand-labeling of records may be used to improve the vertical classifier training data.

In embodiments, a name updater may provide tools to clean the name of a supplier or buyer, such as making commas, periods, capitalization of acronyms, fixing common misspellings, making common abbreviations, and the like consistent. This may be an automated process of cleaning up those names, as well as a manual interface to go through groups of names by glancing at them.

Figure 9:
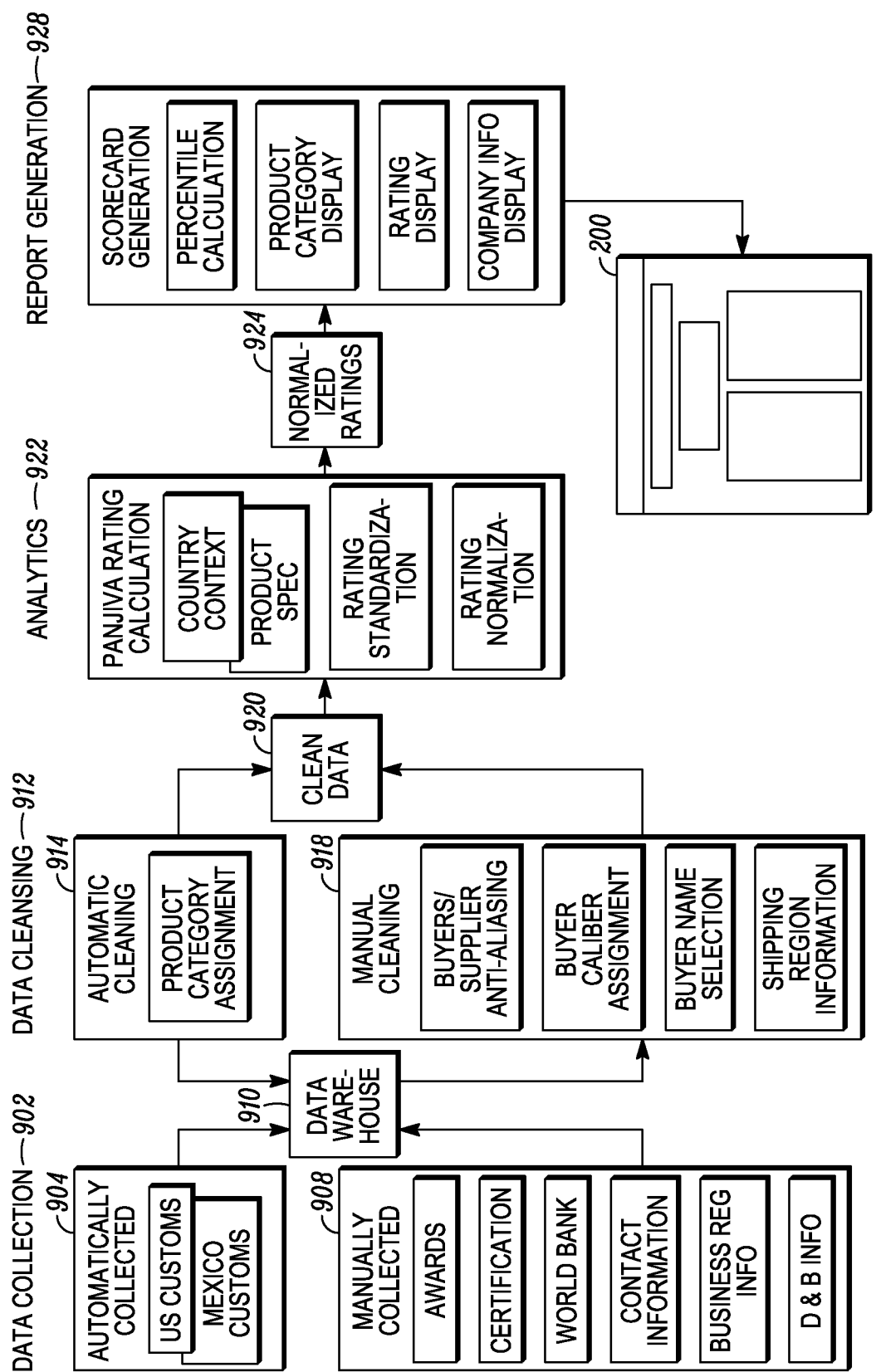
FIG. 9 depicts a flow diagram for an overall analysis methodology for rating suppliers.

FIG. 9 depicts a flow diagram for an overall analysis methodology for rating suppliers. Data may be collected 902, automatically 904 or manually 908 from a variety of sources, such as customs data from databases of United States customs transactions (or similar databases for other jurisdictions), sources of data regarding awards, certifications, and the like, databases of banking organizations, such as the World Bank, databases of contact information (such as yellow pages, white pages and other business databases), data sources with business registration information, such as containing information about formation of corporations, limited liability companies, partnerships and other entities, data sources with information about qualification to do business in various jurisdictions, data sources relating to business licenses and other licensing activities, and data sources relating to various substantive characteristics of a business, such as Dunn and Bradstreet data, data regarding corporate records, data with securities filings and similar information, data from securities analysts, and various other sources. Such data may be brought into a data warehouse 910, which may be a data mart or similar facility for handling data from disparate sources. Once brought into the warehouse 910, data may be cleansed 912 by a variety of automatic cleaning 914 or manual cleaning 918 processes, such as by automatically assigning a product category to data records associated with a supplier, based on pattern matching or similar techniques, such as machine learning techniques, as well as undertaking steps of anti-aliasing, assigning a caliber rating to the buyer (such as associated with a transactional record), selecting or declaring a name for a buyer (such as when a record has names for more than one party), and assigning a geographic region of shipping. Other data cleansing steps may be undertaken as would be understood by those with familiarity with data handling and manipulation. Once clean, clean data 920 may be delivered to an analytics facility 922 for analysis according to various methods described throughout this disclosure, including population of modules for calculating, based on data from the records derived from the data sources, the various ratings described herein, including the overall ratings 110 and various component ratings. The analytics facility 922 may determine a country context, a degree of product specialization, a measure of buyer loyalty, a buyer rating, or other rating. In the analytics facility ratings may be standardized, normalized or weighted, and an overall rating 110 may be calculated. Once normalized ratings 924 are generated by the analytics facility 922, ratings may be used to generate reports 928, such as an overall scorecard 200 with various constituent ratings as disclosed throughout this disclosure. Report generation 928 may also involve developing and presenting percentile calculations, product categories, ratings, and company information.

Weights may be applied to rating algorithms, data, and the like in the methods and systems disclosed herein. Weights may be applied in the process of determining ratings so that certain factors that affect a rating may have a greater impact on a rating than other factors. Weights may also be variable and may be based on a combination of factors. Weights may be applied based on a timeliness of data. Timeliness of data may be important to be weighted because, for instance, very new data may not yet be verified or old data may no longer represent a buyer-supplier relationship. Weighting of data may also be important because some data may be of suspect quality independent of age, data may not have a high degree of relevance to a rating, and many other data quality related factors. In this way, weights may be given in the rating process based on timeliness of data, size of transaction, quality of the transacting parties, prior rating of a transacting party or entity, relevance of the data. Weighting factors may be based on human-aided assessment of an entity, financial health of an entity, and the like.

An overall rating 110 of a supplier or buyer may be a combination of sub-ratings such as rating associated with amount of experience, certification dimensions, county context, business metrics, customer loyalty, and the like. An overall rating 110 and any sub-rating may be weighted, normalized, and curve fitted to ensure the rating is providing a consistent reliable measure of a supplier, buyer, and the like. Additionally, the weighting may be customer specified to enable a customer to identify portions of the ratings that are most important.

One sub-rating metric is customer loyalty. Determining a customer loyalty rating for a supplier is computationally intense and algorithmically rich because it measures how well a supplier is at keeping customers, or how well a buyer sticks with a supplier. In some industries, such as in apparel, it is quite common for buyers to change almost half of their suppliers every year. Understanding the factors that determine how this activity impacts customer loyalty is a key benefit of the present invention.

Customer loyalty may be determined by looking at individual buyer-supplier pairs. One technique to determine a customer loyalty rating for a supplier is to determine a customer loyalty rating for each buyer (customer) of that supplier and then combine the individual ratings. Factors that may impact customer loyalty include, a buyer buying pattern, buying frequency, number of purchases, time since first purchase, and the like. Each transaction can be analyzed to determine if the buyer is buying from a second supplier and if the purchase is for an item that was previously purchased from a first supplier. In this situation, customer loyalty of the first supplier is compromised. However, simply measuring transactions may not provide a quality measure of customer loyalty. Factors such as if the first supplier has stopped selling the item that the buyer is now buying from the second supplier are important to include.

Transaction data may often only be available as free text data (UPC and other codes may not be included in the records). Therefore the text processing, normalization, and canonical adaptation techniques described herein may be beneficially applied to determining a customer loyalty rating for a supplier. Certain aspects of buyer-supplier relationships may have greater importance than others so exponential weighting on some dimensions may be useful. In an example, a longer relationship of fewer transactions may be more important than a large number of transactions over a shorter duration. Factors included in a customer loyalty calculation include duration of relationship, count of orders/shipments, the weight of each order/shipment (determines size/value of shipment), and the like. In an example if a buyer buys the same item from two suppliers and consolidates orders to just one of the two suppliers, a customer loyalty rating of the other supplier may be significantly impacted because of the known cutoff in the supplier-buyer relationship.

For merging records, determining an overall rating 110, and other activities and results associated with the platform, determining parent-subsidiary relationships may be important. In addition to parent-subsidiary relationships, other relationships may be important in determining overall rating 110, customer loyalty rating, and the like. A buyer that switches from one subsidiary to another subsidiary under a single parent may have little impact on the parent rating, but may have significant impact on the subsidiary rating.

An aspect of the platform that facilitates determining parent-subsidiary relationships may use various sources of information such as business records from Dunn and Bradstreet, web news feeds, search engine results of business news sites, crawling of supplier web sites, press releases of suppliers, and the like. An acquisition of a subsidiary by a parent may be identified through one or more of these data sources and the parent-subsidiary relationship may be factored into overall rating, customer loyalty rating, merging, and the like. Parent-subsidiary relationships may also be determined based on predetermined heuristics such as same city—similar name, same buyer—similar name, and other heuristic combinations of customs data record elements. Parent-subsidiary relationships can be determined for suppliers and for buyers.

In an embodiment, details of a supplier may be summarized and coupled if the same supplier has several plants to generate an aggregate profile of the supplier. Likewise, if a single buyer buys for several locations it may be considered to be a single buyer and an aggregate profile for the buyer may be generated. For example, a supplier of "wooden furniture" with 5 different distribution locations may be considered as a single supplier. Over a period of time, trends between a supplier and a buyer may be captured and such trends may enable an analysis of buyer-supplier networks (supplier location and buyer location) to determine the relationships between various groups of buyers and suppliers. Depending upon the transactions made between a supplier and buyer for several locations a map of relationships among the locations of the suppliers and the locations of the buyers may be developed. In case a buyer and a supplier are constantly engaged with each other through various locations, supply and delivery points may be identified on maps, which may be helpful in developing a well managed relationship between both the entities. The relationship map among the various locations of the supplier and the buyer is pivotal for efficient management of a supply chain. The managers might be assisted by this map to manage the logistics that in turn may help in minimizing the freight costs, time of delivery, etc. The mapping of various buyer-supplier locations on the map may also help in building a partnership between a buyer and a supplier, which may increase a firm's competitiveness. Moreover, this mapping may also play an important role in reducing the cycle time; specifically, the "order-to-delivery lead time", which is the time, elapsed between the placement of order by the buyer and the delivery of products by the supplier. For example, a supplier of electronic components providing a buyer with various products at different locations may be able to map the various factories producing those components. Accordingly, he may be able to plan a strategy for managing the supply of those components to the point of delivery in accordance with the distance from the various factories. This may help the electronic component supplier to deliver the components within less time and at a better cost. These maps may also help a buyer to find other suppliers that may be near one of the buyer's locations. The other suppliers may be able to serve the needs of the buyer while also being more cost effective. Further, the relationship map may be used by the geographic search functionality, as described above, to track/search various locations of the suppliers and the buyers. For example, by using the geographic searching functionality, the buyer may further minimize the cost of purchase by searching for a supplier who is nearest to the point of delivery or may be a competitor of the current supplier in the vicinity.

Information derived from the location specific data described above may be valuable to a supplier or buyer so this information may be made available for a fee (e.g. a subscription fee, a one-time-use fee, and the like). A supplier may pay a fee to reduce shipment and/or inventory handling costs. A buyer may pay a fee to receive information that might reduce purchase or shipping related costs.

Using such relationship maps, a cohort relationship dataset may be developed which may enable statistical study of relationships between supplier locations and a buyer locations. If a supplier ships the same product from a few different locations and a particular supplier location of that product is rated more highly than other locations, a buyer may use the information in business dealings with the supplier.

FIG. 10 depicts fields that are derived from customs data associated with supply transactions. The records depicted in FIG. 10 may comprise a portion of a buyer record of customs data 1000. Note that information that may be associated with a buyer's identity may reside in various fields. FIG. 10 further illustrates fields from customs records 1002. A buyer record of customs data 1000 may include, without limitation, fields such as shipper 1004A, consignee 1004B, notify_party 1004C, also_notify 1004D, weight 1004E, quantity 1004F, BL number 1004G, country 1004H, data 1004I, commodity 1004J, and HS code 1004K. Certain fields may facilitate identification of possible buyers based on information contained one or more fields; these fields may be referred to as buyer identity candidate fields 1008. In an example, one way of identifying a buyer may be by using the consignee 1004B. In another example, notify_party 1004C may be used to identify the buyer. In yet another example, also_notify 1004D may be used to identify the buyer. The buyer identity candidate fields 1008 may be combined in various ways to facilitate identifying a buyer.

Referring to FIG. 11 depicts a plurality of customs records with details that are relevant to buyer and supplier identification and for merging customs records while avoiding duplication in counting the same transaction as a result of it being characterized in different records. Records 1102 and 1104 record the same Shipper 1004A "Shanghai Bada Textile", Consignee 1004B "No Fear Inc.", and HS Code 1004K "621143". However the date 1004I is different for each record indicating that while the records may be associated with the same buyer and supplier they are not duplicate entries. Record 1108 records the same shipper 1004A as records 1102 and 1104. It also records a buyer that may be the same as the buyer of records 1102 and 1104 through the data in the also_notify 1004D field "No Fear". Therefore, it may be appropriate to conclude that the buyer and seller of record 1108 is the same as those in records 1102 and 1104. However, because the HS code 1004K "621149" is not the same, record 1108 is not a duplicate of 1102 or 1104. Record 1110 records a potential buyer in consignee 1004B "No Fear" that may be the same as the buyer in records 1102, 1104, and 1108. However, because the shipper 1004A "Guangzhou Textile Co" may be identified as a different supplier than the shipper in records 1108, 1104, and 1108, it may be readily determined that record 1110 is not only not a duplicate of 1102, 1104, and 1108, but it also identifies a different supplier-buyer relationship.

Figure 12:
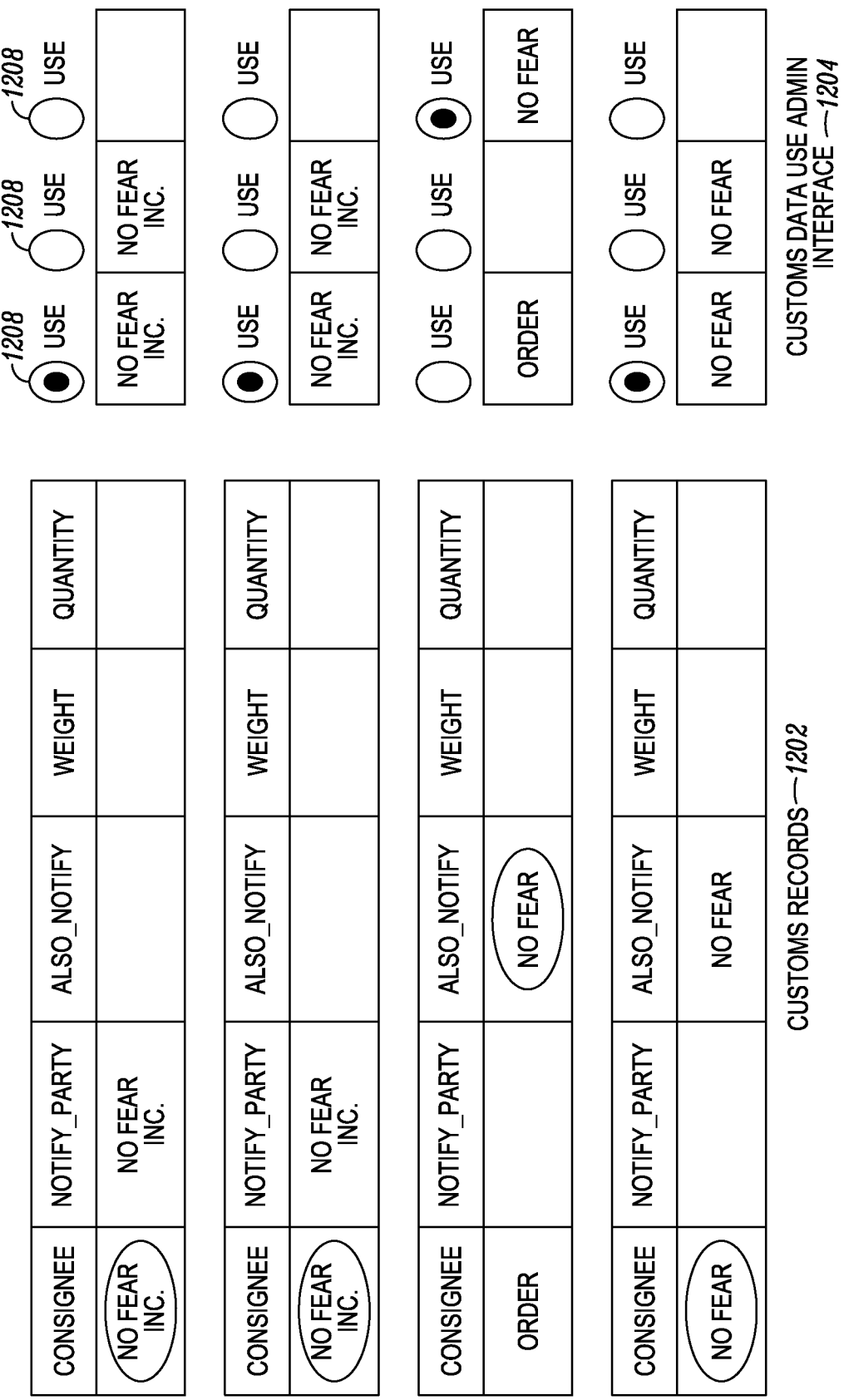
FIG. 12 depicts a user interface for identifying a buyer from one or more of a plurality of customs data fields.

Referring to FIG. 12, a customs data user interface 1204 that may facilitate selecting among a plurality of potential buyer names that are provided in customs records 1202. The interface 1204 may include one or more buyer name use buttons 1208 or some other type of selection means for selecting which field in each of the customs records 1202 represents a buyer name. As described in reference to FIG. 10, buyer identity candidate fields 1008 may include consignee 1004B, the notify_party 1004C, and the also_notify 1004D fields. The buyer name use buttons 1208 may be associated with each field in the buyer identity candidate fields 1008 so that an operator of the platform may signal which buyer identity data item associated with each customs record 1202 should be used for merging, de-duplication, and other actions within the platform. The customs data user interface 1204 is only exemplary and other arrangements of buttons, data fields, and the like, as well as various presentations of the data before and after selection are possible and herein included.

A name chooser tool, such as the one described above and depicted in FIG. 12 may assist with identifying a buyer name or supplier name in a record. The tool may allow a user to manually identify a buyer, seller, shipper, and the like for each transaction records. As described herein, there may be automated processes to deal with entity identification in transaction records. Automated or manual processes use key words like "logistics," "trading company," and "shipping company" to distinguish shippers from buyers or suppliers.

The user data interface 1204 may include a toolbar that may be customized according to a user's need. This customized toolbar may provide a personalized experience to each user. For example, the user may introduce new check buttons for products which help in filtering the results in accordance with the products provided by various suppliers. Similarly, the user may introduce various buttons to customize a search. The user may also use various elements from the list of favorites marked by the user during his previous searches. Elements present in the list may be grabbed and dragged to the screen by the user such that these elements may be used during the subsequent searches. Similarly, suggestions may also be made for similar suppliers and a real time match may also be found for them.

In an embodiment, a tool may be provided that allows data to be viewed as a table or to be exported to another application such as MS Excel. A table view may display specific details of a particular company or a combination of companies (e.g. buyers and suppliers). The table view may facilitate viewing information pertaining to a company such as various attributes including without limitation, a supplier's shipment history, the types of materials typically shipped, a supplier's customers, a supplier's expertise, what materials and how much a buyer purchases, buyer and shipper reliability, similarity between buyers, similarity between suppliers, shipments that match a particular term, and the like. The data table view may be viewed or exported conveniently by manual clicking a link command icon in a user interface.

Relationships among companies may be viewed in the table view based on a filter of company specific attributes, (e.g. for a given product). For example, filtering of companies may be done on the basis of the number of shipments matching a product, such as "hammers." This filtering may allow presentation in a table view a number of companies that share the same number of shipments and receipts of "hammers" over a defined period of time, thereby showing a supplier or suppliers and a buyer or buyers who have transacted "Hammers". The companies in the results of this initial filtering may be further compared by providing a compare button (e.g. in a user interface that supports the table view) which may be clicked to compare a selected subset of results. Alternatively dragging one or more of the entities in the results list to a comparison region or icon of a data view user interface may activate the comparison. A toolbar may be provided such that after clicking the compare button the toolbar folds up. For example, a user may select elements for comparison, such as a group of entities and a term (e.g. "Hammers"), and a compare function may provide a tabular view of the comparison of suppliers that meet the selected comparison criteria, in accordance with the above description.

The methods and systems described herein may include user interfaces that may include support for various languages and may further include a multi-language user communication system. A multi-language user communication system may, for example use location information to present information to the user in the user's native language, even if the information was entered in a different language. In addition the look and feel of the user interface presented to a user may differ based on user current location, user home location, user language preference, and the like. The language and design elements may be changed depending on these and other aspects of a user's location.

The multi-language user communication system may provide a translation facility that may allow a supplier and a buyer without a common language to communicate. Translation services may be real-time or may be delayed for processing. The translation may be automatically generated, or may be manually provided through the use of interpreters. A different level of service, with a different degree of accuracy guarantee may be provided on a fee basis. (I included this elsewhere) The multi-language user communication system may provide a method for communicating with a shipping company in a user's native language.

Figure 13:
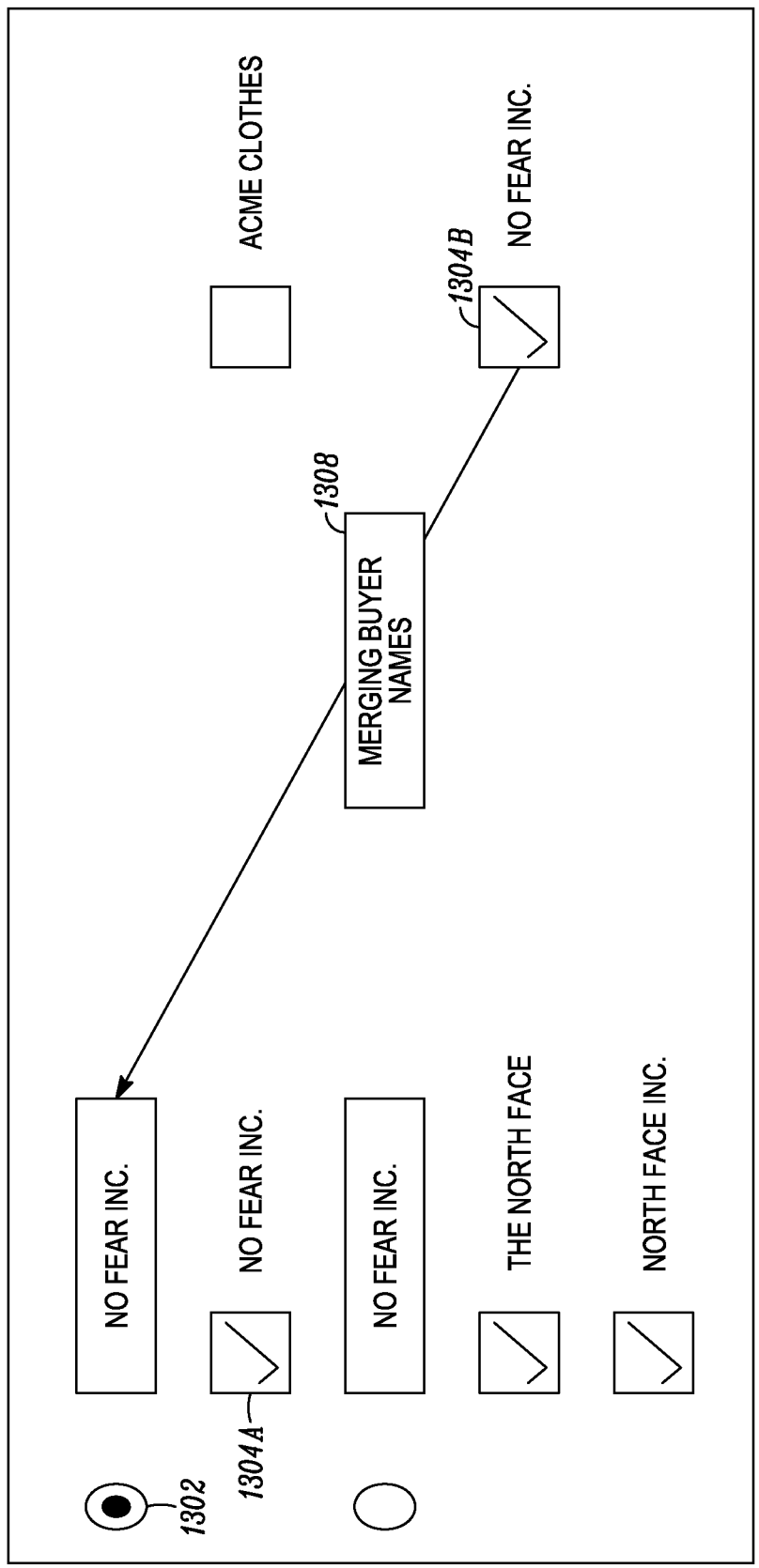
FIG. 13 depicts mapping variations of buyer names to a primary buyer.

Referring to FIG. 13, a GUI 1300 depicting configuring merging parameters to guide automatic merging of variations in buyer name is shown. An option button 1302 allows selection of the consignee 1004B. In addition, the variation to the consignee 1004B may be listed below the option button along with check box 1304A enabling selection of one or more variations to the consignee names 1004B. Another set of check boxes 1304B listing the different variations to the consignee names 1004B may be provided on the right side of the GUI. Selection of the option button 1302, the check box 1304A and the check box 1304B may facilitate merging of supplier names on initialization. In an example, the option button corresponding to No Fear Inc. may be selected along with the check box showing No Fear Inc. Subsequently, the variation in the names of the buyer can be merged.

Figure 14:
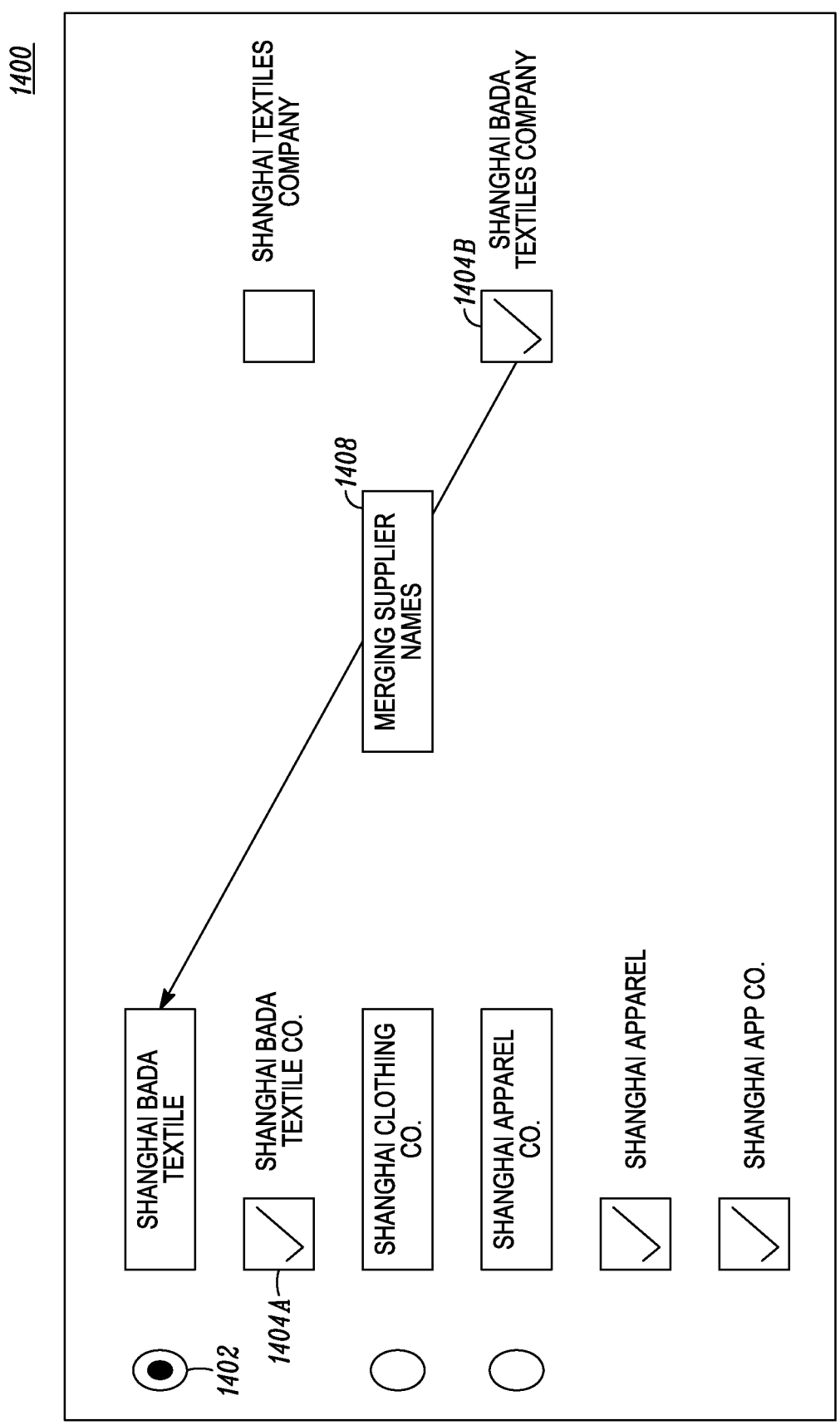
FIG. 14 depicts mapping variations of buyer names to a primary seller.

Referring to FIG. 14, a GUI 1400 depicting configuring merging parameters to guide automatic merging of variations in supplier name is shown. An option button 1402 allows selection of the consignee 1004B. In addition, the variation to the consignee 1004B may be listed below the option button along with check boxes 1404A enabling selection of one or more variations to the consignee names 1004B. Another set of check boxes 1404B listing the different variations to the consignee names 1004B may be provided on the right side of the GUI. Selection of the option button 1402, the check box 1404A and the check box 1404B may facilitate merging of supplier names on initialization. In an example, the option button corresponding to Shanghai Bada Textile may be selected along with the check box showing Shanghai Bada Textile Co. Subsequently, the variation in the names of the buyer can be merged.

FIG. 15 depicts identifying factors relevant to assessing buyer loyalty from transaction records. After a series of transactions 1502, 1504, 1508 with one supplier, a subsequent transaction 1510 indicates that the buyer may have switched to another supplier for a similar product. Thus, an initial loyalty period represented by transaction 1502, 1504, and 1508 can be calculated, the duration of which may be the time between the first order 1502 and the last order 1508 of a product from the supplier. A switch to another supplier may terminate the loyalty period. Also the switch itself may be considered one indicator of the quality of the suppliers (in particular suggesting higher quality for the new supplier and lower quality for the old supplier). In an embodiment, a negative factor may be attributed in rating the former supplier as a result of the switch, which may balance, or even outweigh, the positive factor associated with the previous loyalty period.

FIG. 16 depicts using transaction data that may be indicative of a supplier's degree of specialization. Customs data 1602 may include an HS Code field 1004K that may provide an indication of supplier specialization by looking at the range of values in the HS Code field 1004K for transactions records associated with a specific supplier. A larger number of categories may suggest less specialization, while a smaller number of categories suggest more specialization.

FIG. 17 depicts steps for obtaining data indicative of a supplier's degree of experience. A number of units shipped, a number of orders, and a duration over which products are shipped may be factors in determining an experience rating. Data from individual customs transaction records 1702 may be aggregated and processed to determine experience factors. In an example from FIG. 17, a duration factor of expertise may be calculated by determining the number of days between the first shipment (Jan. 2, 2005) and the last or current shipment (Mar. 8, 2005). Expertise may be in terms of how much of each product type a supplier has shipped, such that users may better determine what suppliers have their greatest experience, their least experience, and the like.

FIG. 18 depicts customs data record fields 1802 that may affect a supplier's rating based on the quality of the buyers served by the supplier. A buyer may be identified in the customs data record fields 1802 through the consignee 1004B field, the also_notify 1004D field, or a combination thereof. A caliber of the identified buyer may be determined manually, such as by a facilitator, or by an algorithm based on various attributes, such as size of business, number of employees, presence on a stock market, profitability, knowledge of brand among customers, surveys or ratings by third parties, awards, certifications, or a range of other measures. The caliber may be stored by the platform in association with other information about the buyer. Alternatively, the caliber may be calculated from stored and retrieved information as described above. The platform may calculate the caliber, a portion of the caliber, or may be provided with the caliber through an interface, such as a network interface.

FIG. 19 depicts a portion of a summary report 1900 showing top suppliers including rating 1904 of the supplier, name of the supplier 1908, supplier's location 1910 and reference details 1912. The summary may be for an industry or product category, such as women's apparel (e.g. blouses, skirts, dresses and the like). In one embodiment, a company may give an overall rating 110 within a given category of suppliers for one of the products, i.e., women's blouses. Further, the top suppliers of this category (such as the top 50 suppliers) may be listed even though less than 50 suppliers are shown in the embodiment of FIG. 19. The report 1900 may include a greater or lesser number of top suppliers. Also the report 1900 may include an executive summary portion that provides guidance using the summary. The ratings 1904 may be accorded to the suppliers based on a plurality of factors such as timely supply, quality, pricing of the product and the like. Each rating 1904 may be scaled on a normalized scale, such as a one hundred point scale, with particular ratings depicted graphically, such as in a bar graph, to make it easier to see the relative performance of the supplier in that category of rating. The ratings 1904 may also be depicted as qualitative labels such as "Excellent", "Good", "Fair", and the like. The supplier information, in context of the overall rating, may be provided in one or more sections of the detailed report.

FIG. 20 depicts a report 2000 showing standout suppliers (e.g. for a particular product), including suppliers with the highest customer loyalty and suppliers with the deepest experience in shipping to the buyer's jurisdiction. The stand-out supplier report 2000 may include a table 2002A of top suppliers with the highest customer loyalty, and a separate table of most experienced shippers 2002B. Each table 2002A and 2002B may include a plurality of columns related to the supplier's information; in an example, loyalty rating 2004A, experience rating, 2004B supplier name 2008, location 2010, and details 2012 of the supplier. In the present illustration, table 2002A may include the top five suppliers that have the best customer loyalty. Table 2002B may list the top suppliers with the most experience in shipping to the U.S. In the present illustration, a list is provided for top four suppliers that may have the maximum experience in shipping with their corresponding customers in the United States.

Figure 21:
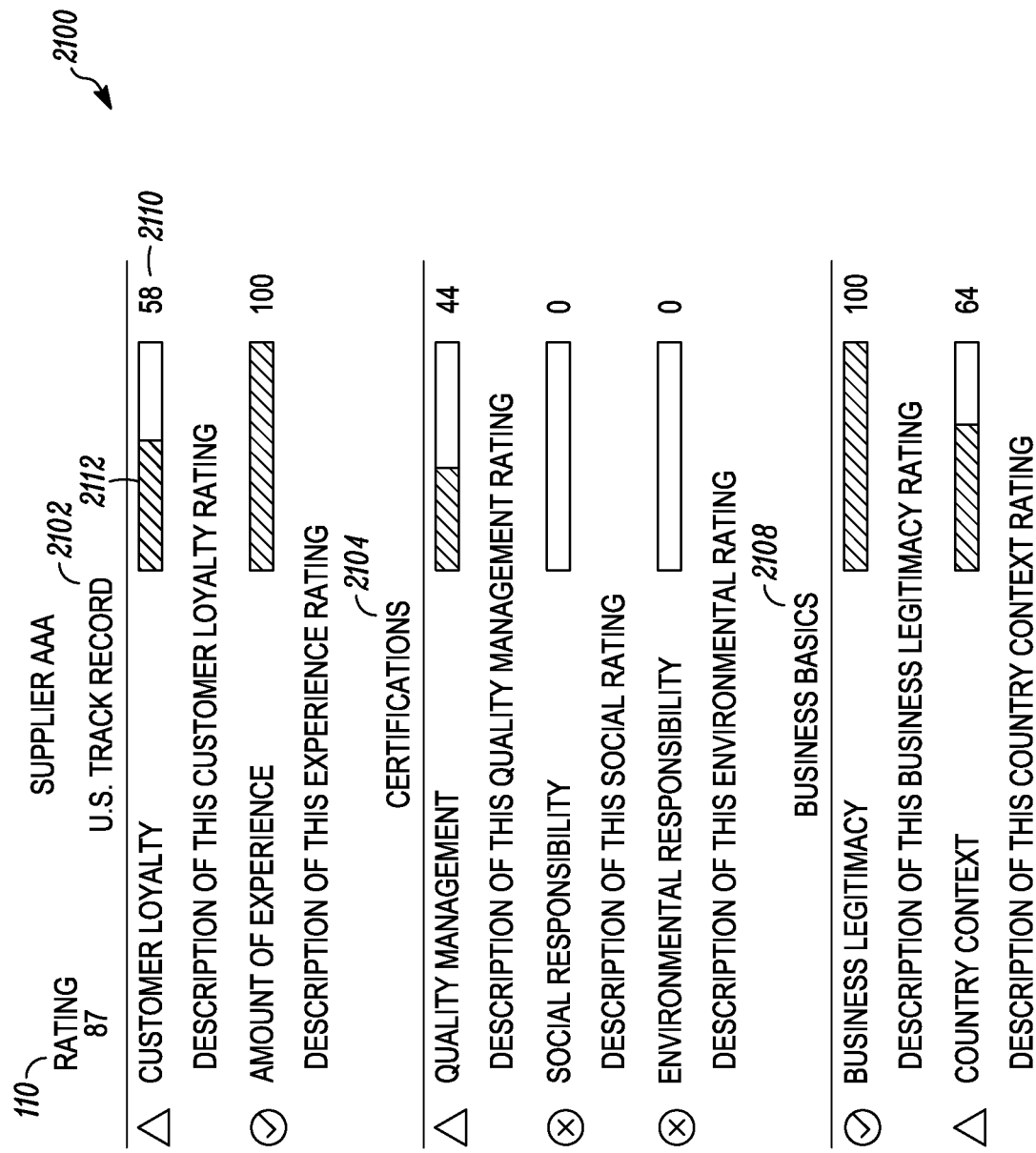
FIG. 21 shows a detailed report with ratings of a supplier overall and according to various dimensions of quality.

FIG. 21 shows an exemplary detailed report 2100 that breaks down the overall rating 110 according to various dimensions of quality. In the example detailed report 2100, dimensions of quality may be grouped into performance aspects 2102 such as track record that may include customer loyalty, amount of experience and the like; certifications 2104 that may include quality management, social responsibility, and environmental responsibility; and business basics 2108 that may include business legitimacy and country context. Each rating may be scaled on a normalized scale, such as a one hundred point scale 2110, with particular ratings depicted graphically, such as in a bar graph 2112, to make it easier to compare the supplier performance in each dimension to each other dimension. Ratings may alternatively be depicted as qualitative labels such as "Excellent", "Good", "Fair", and the like.

Figure 22A:
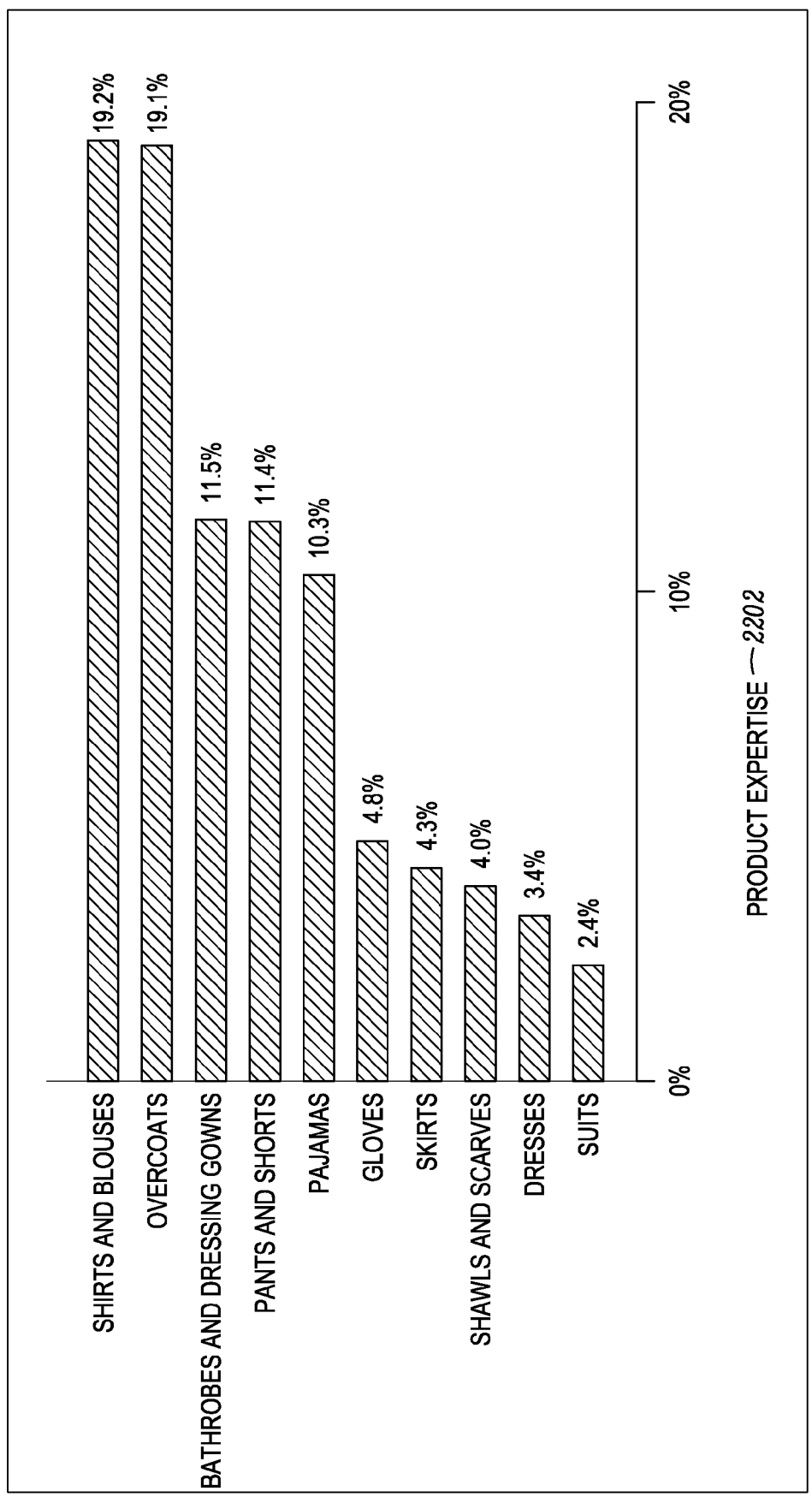

FIGS. 22A and 22B show a breakdown of supplier transaction experience for a selected time period, which may allow prospective buyers to draw inferences as to what areas of experience are deepest for the supplier. The breakdown may include product expertise 2202 of the supplier, technical expertise 2208 of the supplier, and material expertise 2204 of the supplier. The product expertise 2202 may further include the percentage distribution for a number of products; in an example, shirts and blouses, gloves, skirts, and the like. The technical expertise 2208 may include the percentage distribution of the technology applied and used by the supplier; in an example, non knitting and knitting of the material. The material expertise 2204 may include the percentage distribution of the material used for the synthesis of a plurality of products; in an example, silk, cotton, etc.

Figure 23:
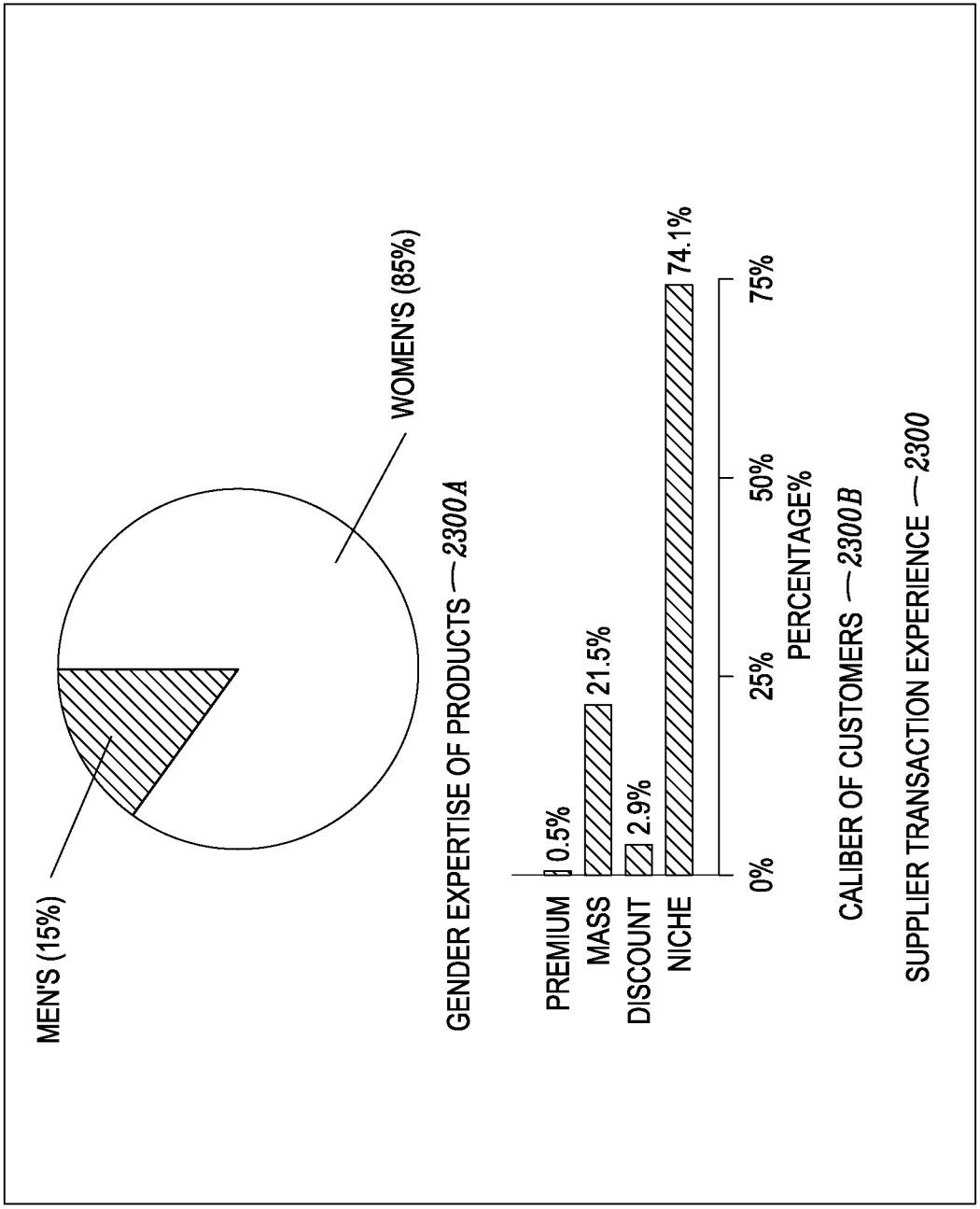
FIG. 23 shows a breakdown of supplier transaction experience according to selected factors.

FIG. 23 shows a report 2300 presenting a breakdown of supplier transaction experience according to selected factors, including a gender chart 2300A, and a customer caliber chart 2300B. These charts may be based on a variety of supply factors including product, material, technique, shipment history, estimated minimum shipment size, average shipment size, and the like. Report 2300 may allow the buyer to assess whether and to what extent the supplier is likely to have expertise applicable to the buyer's position in the marketplace.

Figure 24:
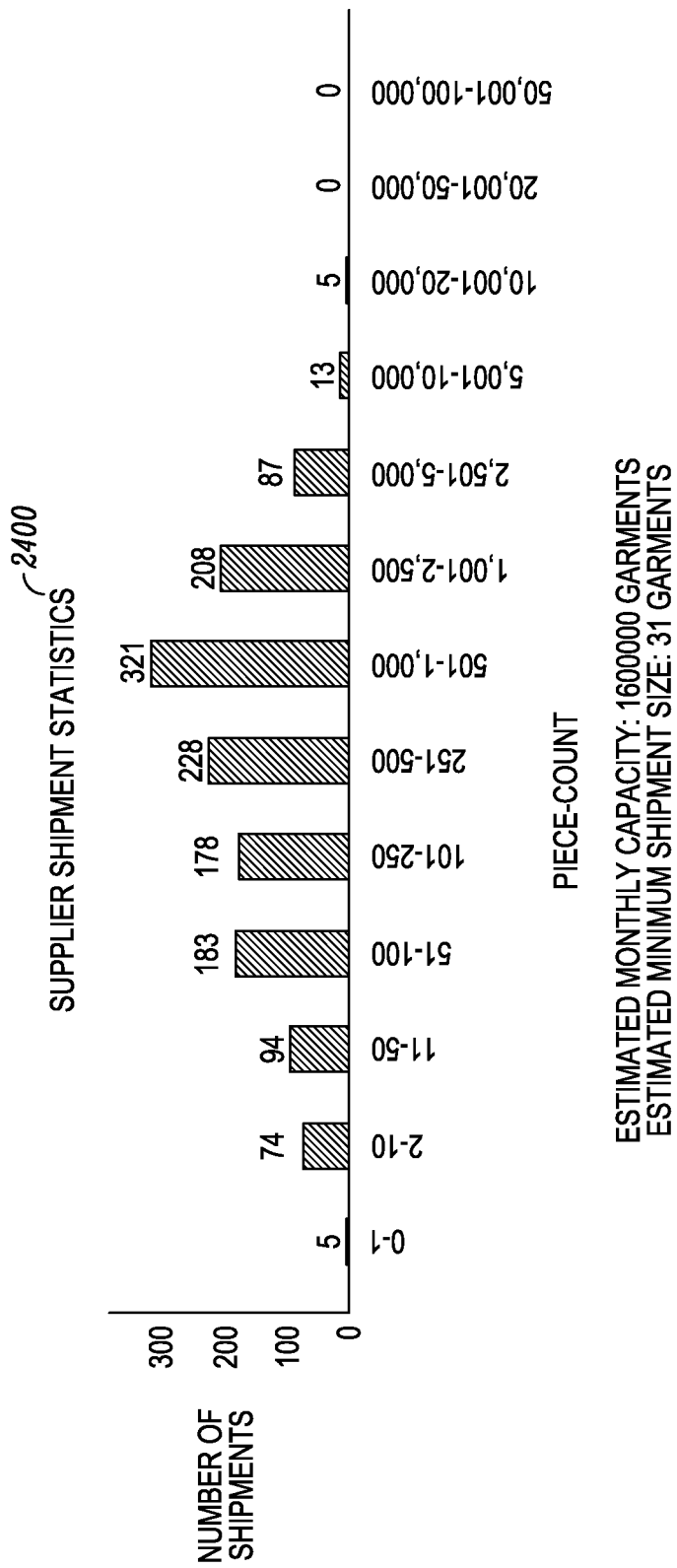
FIG. 24 shows a breakdown of shipment history broken down by piece count.
Figure 25A:
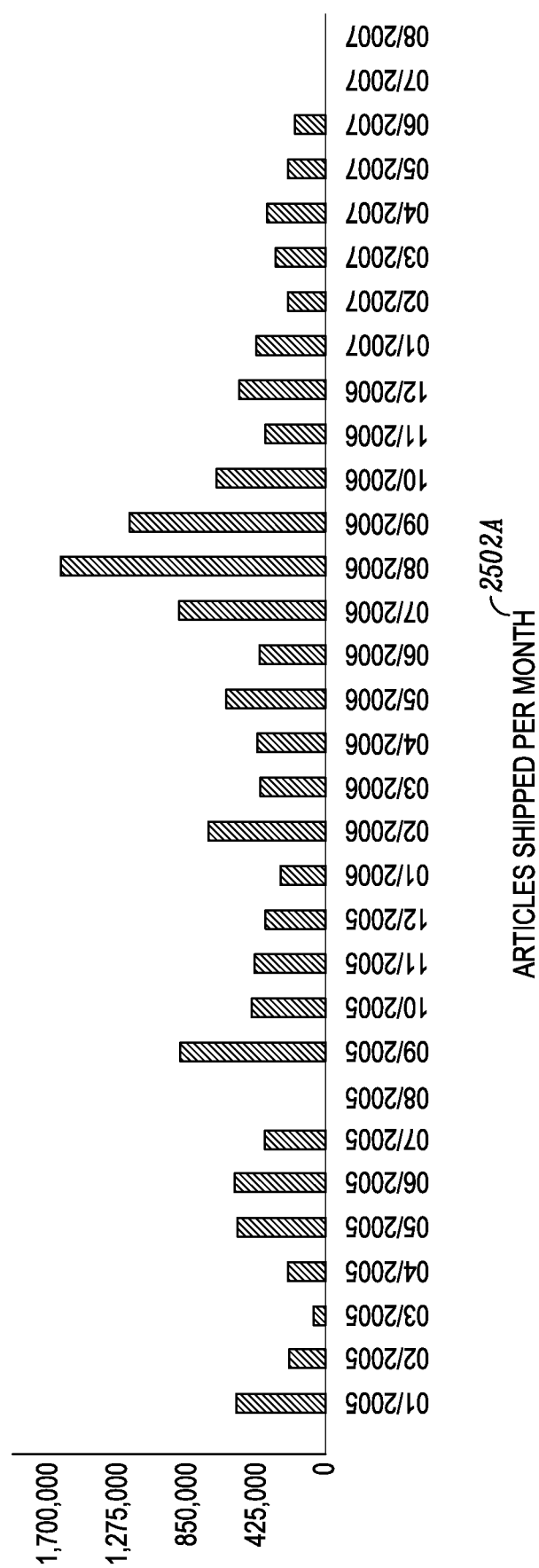
FIGS. 25A and 25B show a breakdown of shipment history by month.
Figure 25B:
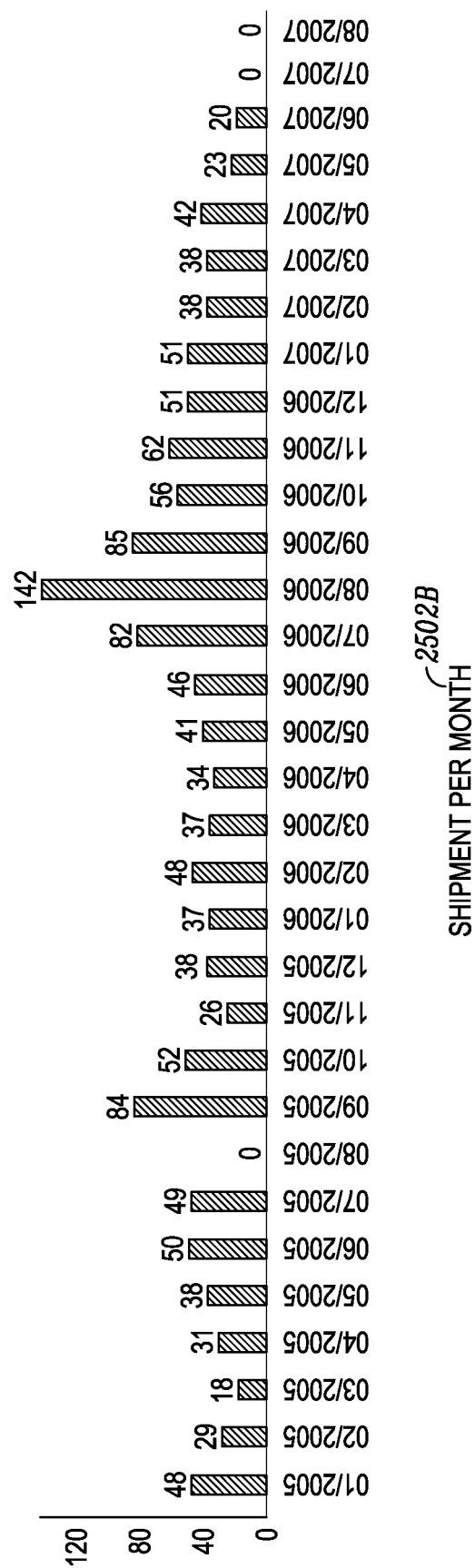

FIG. 24, FIG. 25A and FIG. 25B show a breakdown of supplier shipment history, where shipment history may be broken down by piece count, by month, by month to a certain country, and the like. FIG. 24 depicts a breakdown of shipment history as a piece-count chart 2400. FIGS. 25A and 25B break down shipment history into a monthly article chart 2502A and a monthly shipment count chart 2502B. In embodiments, the product may include shipment history graphs that show trends and volumes of shipments (quantified in terms of shipping containers) made over some period of time. Embodiments may also show the number of articles, garments, pieces, or, generally, entities, of the shipped product shipped over time based on algorithms that take into account the weight of the container and the assumed weight of each individual entities inside the container. Embodiments may also include a characterization of how large a supplier's shipments tend to be in terms of number of entities per shipping container. Such a characterization may allow a further characterization of whether a supplier may be able to fulfill small orders, if they will be willing to fulfill large orders, and the like. Embodiments may also include estimates of a supplier's monthly capacity and their smallest shipment size.

Figure 26:
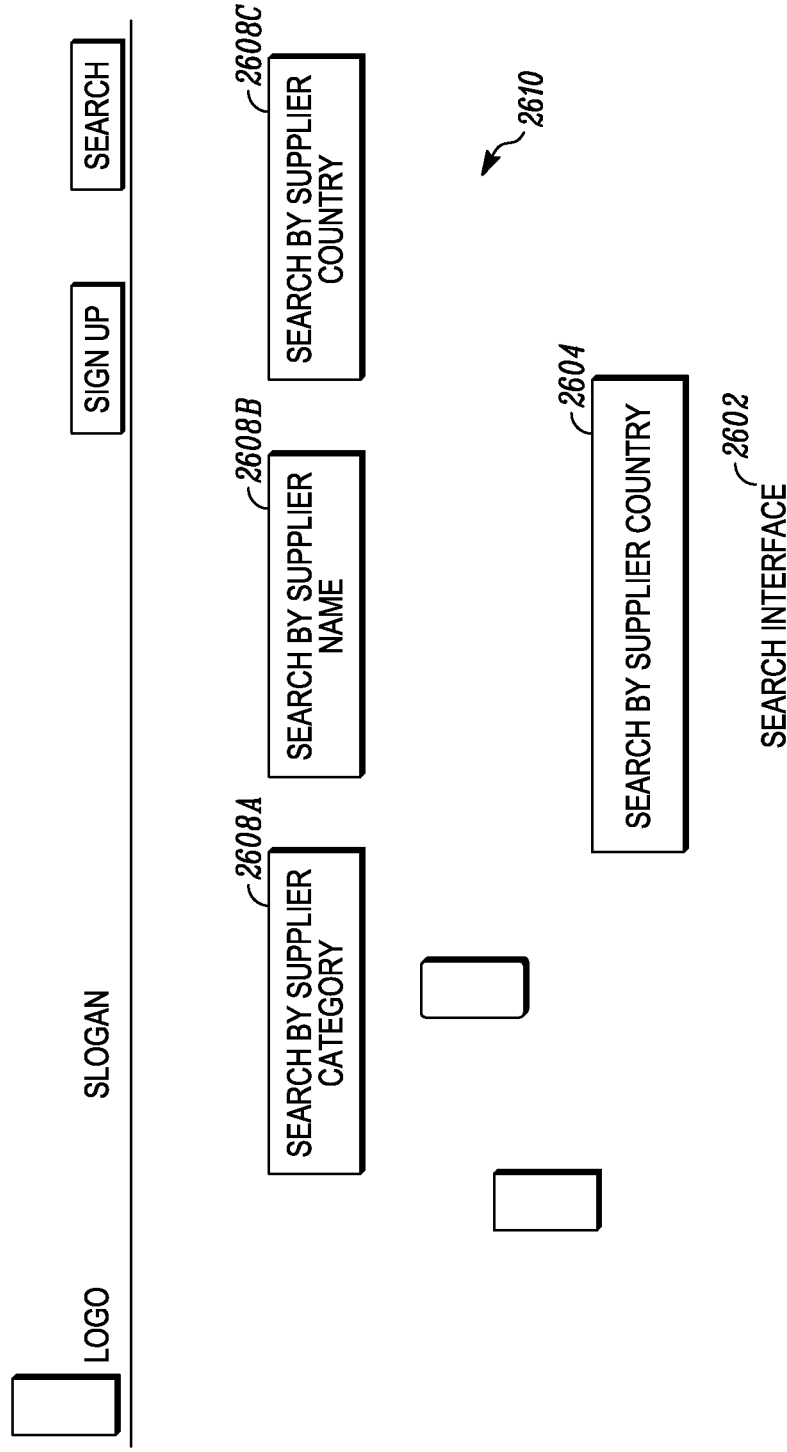
FIG. 26 shows a search window for searching by country.

FIG. 26 shows a user interface through which users may search for suppliers. The supplier search interface 2602 may allow a user to search for suppliers based on category 2608A, name 2608B, and country 2608C. In FIG. 26, a user has selected to search for a supplier based on the supplier's country 2608C. A user may enter text in the text entry box 2610 that may be useful in determining a country and then the user may select search control 2604 to search for suppliers within a country that may be determined from the text input into box 2610.

Figure 27:
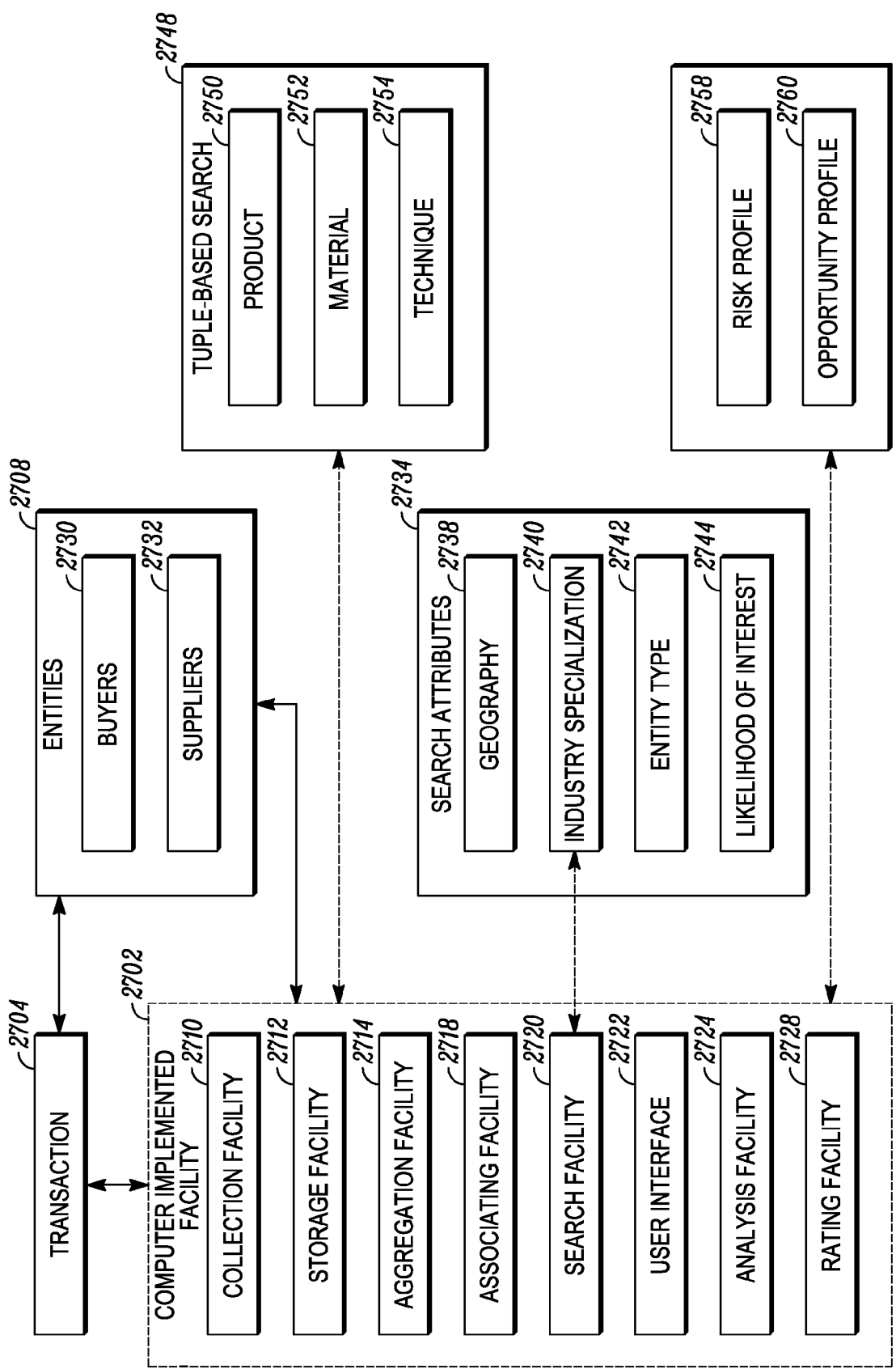
FIG. 27 depicts an aggregation search user interface.

Referring to FIG. 27, the search may also be conducted to obtain information regarding the various entities 2708 such as suppliers 2732 and buyers 2730. The computer implemented facility 2702 may collect and store a plurality of public records of transactions 2704 among a plurality of buyers 2730 and suppliers 2732. The transactions 2704 may be aggregated and associated with the entities 2708 (suppliers and/or buyers). A user interface 2722 may be provided that may facilitate a user who may be searching for at least one of the entities 2708 and the information associated with the at least one of the entities 2708 from the aggregated transactions data. The user may be any person interested in retrieving the above information; the user may also be a supplier, a buyer, a third party, and the like. The examples of user interface 2722 may include a Graphical User Interface, Web-based User Interface, Touch Interface, and some other types of user interfaces.

In an embodiment, the user interface 2722 may facilitate a tuple-based search 2748. The tuple-based search 2748 relates to a capability of searching for entities 2708 related to a specific parameter. Such parameter may relate to a product 2750, a material 2752, and/or a technique 2754. In an example, a supplier S1 may like to conduct a search for buyers available in the United States for 'Aluminum based packaging sheets formed by extrusion.'

In accordance with an embodiment of the present invention, the search results obtained from the above described searches for the entities 2708 may also be ranked. In an embodiment, the ranking may be based on a supplier rating.

In an embodiment, the rating may be based on the context of a party, the business legitimacy of a party, an assessment based on the trading environment of a country, macroeconomic information, industry awards, industry certifications, amount of experience, number of shipments, duration of experience, size of transactions, extent of domestic experience, extent of international experience, caliber of customers, customer loyalty, degree of specialization, specialization in product categories, specialization in manufacturing techniques, specialization in materials, specialization in gender, feedback from customers, feedback from buyers, feedback on product quality, feedback on customer service, feedback on timeliness of delivery, feedback on language skills, feedback on sample making ability, respect for intellectual property, quality management, social responsibility, environmental responsibility, standards of compliance, certifications, certifications with respect to specific vendor standards, risk profile 2758, opportunity profile 2760, and some other types of factors and parameters.

Referring to the above example again, upon searching, a supplier 2732 may obtain a list of buyers 2730, which may be interested in buying 'Aluminum based packaging sheets formed by extrusion'. In addition, the supplier may like to ascertain the best buyers. For this purpose, the supplier 2732 may also obtain a ranking of the buyers 2730 based on selected parameters such as feedback reports, risk associated with each buyer, geographical location, and some other type of parameter. The rating may be in the form of a value, integer, percentage, and some other forms of ratings. Based on this rating, a ranking may be provided to each of the buyers 2730. This ranking may in turn facilitate the supplier 2732 in making the judgment regarding the appropriate buyer. Risk may be related to counterfeiting, capacity, subcontracting, political factor, geographic factor, weather factor, geology factor, financial risk, probability of non-performance of a contract, probability of termination of a contract, intellectual property, targeted delivery date, transactional customs data for a party other than the supplier and/or buyer, likelihood that a buyer will move to an alternative supplier, non-payment and some other types of risk factors.

An opportunity profile 2760 may be an assessment of the potential for new business opportunities determined from customs transaction data. By analyzing transactions in customs data, buyers and suppliers can identify potential business opportunities such as to establish a new relationship, reduce costs, increase availability, and the like. While companies guard much of their internal information related to costs and profit, the transaction information available in public customs records can provide great insight into ongoing buy and sell activity. In an example of opportunity profile 2760 assessment, a buyer may decide there is an opportunity to push a supplier harder to reduce a price. The buyer may be able to determine that the supplier has made fewer sales (e.g. as evidenced by lower shipment quantities in customs transaction records) over time. One potential reason for this is that a competitor of the supplier is offering a lower price. Therefore the supplier may need to reduce price to remain competitive. Likewise the supplier can review the same records and determine that the competitor is selling at a lower price under certain conditions, so the supplier can device a counter pricing strategy accordingly. In another example, a supplier may spot an opportunity to sell additional types of products to an existing buyer by examining the transactions of the buyer. The supplier may determine that the buyer is purchasing a type of product from a competitor that the supplier also offers but is not currently selling to the buyer. The supplier could provide the buyer with the opportunity to potentially improve the buyer costs by ordering the product from the supplier rather than the competitor. Factors such as combined volume pricing, reduced accounting overhead, lower shipping costs and the like may be key benefits that the supplier can use to entice the buyer.

Likewise the platform or an operator of the platform may use the customs transactional data to identify and suggest opportunities to buyers and/or suppliers. The transactional data may be analyzed for factors that indicate the potential for an opportunity and the opportunity may be prepared as an offer to one or more of buyers, suppliers, and the like. Opportunities may include availability of pricing leverage for a buyer with respect to a supplier; consolidation of orders with a supplier, pricing leverage for a supplier with respect to a buyer, increasing a share of a buyer's total spending for a supplier, and the like.

A risk profile 2758 may be determined based on analysis of customs transaction data. A risk profile for a supplier or a buyer may be based on customs transaction data for the supplier, the buyer, or a third party. A risk profile that may be determined from customs transactional data may include risk related to counterfeiting, capacity overload, subcontracting, political factors, geographic factors, weather, geology, finances, probability of non-performance to a contract, probability of termination of a contract, intellectual property, achieving a targeted delivery date, non-payment, selecting an alternate supplier, order cancellation, order push-out, and the like. A risk profile that may be derived from customs transaction data may be a basis for determining terms and conditions of insurance, and the like.

The above description disclosed that the search interface may be utilized for searching entities 2708 based on the aggregated transactional data. In an embodiment, the suppliers 2732 may also be searched based on the region of interest (geography) 2738, industry specialization 2740, customers (entity types) 2742, and the interest displayed in forming relationship (likelihood of interest) 2744. This may be explained in detail in conjunction with FIG. 27.

Referring to FIG. 27 again, the computer implemented facility 2702 may collect and store the public transaction records 2704 and associate these transactions with the entities 2708. A search facility 2720 may search for an entity based on a particular search attribute 2734. The search attribute 2734 may be a type of entity 2742, geographic region 2738, industry specialization 2740, and likelihood of interest in a transaction with the user or the search 2744.

In embodiments, the search facility 2720 may be adapted to be used by a buyer for searching a supplier. Alternately, the search facility may also be adapted to be used by a supplier for searching a buyer.

In an example, a buyer 2730 may like to search for suppliers (in US) of 'automotive machine parts' that may be willing to do business with a small offshore firm outside United States. Therefore, in the above scenario the likelihood of interest that the suppliers may display may be based on the location and size of the firm.

In embodiments, methods and systems disclosed herein may include an interface by which buyers may search for suppliers, as disclosed above. The search interface may allow buyers to query a database of supplier information organized in a hierarchy according to product categories, in order to find suppliers who provide products in a selected category. A buyer may then select particular suppliers and obtain an online profile or report, as described throughout this disclosure, as to attributes of a particular supplier. In embodiments, the search interface allows the buyer to search by product category, material used to make the product, or technique used to make the product, among other attributes. Filtering tools may be provided in the interface to allow the buyer to sort data by product type, material, technique, caliber of customer, or other attributes, to expand or group data, to drill down into particular categories or sub-categories, and the like.

In embodiments, the database of supplier information includes an ontology of product categories, which may include a tree of categories and sub-categories of all types of products found in various data sources, such as customs records databases.

In embodiments, filters may be enabled, allowing a buyer to search along dimensions of the data. In an example, if a buyer wishes to search for suppliers who work with a particular material, a filtering algorithm may take the union of all materials used by suppliers and present those materials as filters by which a set of suppliers may be selected by buyers for further analysis. The filters may be presented in a graph or tree structure, so that a user may check a box to expand or contract a particular portion of the tree, thereby allowing filtering by sub-category down to the leaf node in a tree. In embodiments, data are represented in tuples and results for a particular filter are ordered, such as by overall rating of the supplier. Results for a particular filter may also be ordered by other features, such as most specialized and the like.

Filters may include construction techniques, dyeing, washing and embellishing techniques, gender of the product, company type, country of supplier, and the like. When data are represented in tuples, all products a supplier has made may be represented by material, sub-material, and technique (e.g., cotton—poplin—knitted sweater). In an example, when a search is conducted for a cotton poplin sweater, the suppliers who have made cotton poplin sweaters can be retrieved (not the union of ones who have made cotton or poplin sweaters in this example). The tuple concept applies to children of each concept in a hierarchy, so if the user selects cotton, the user will receive results for cotton and all children of cotton in the materials hierarchy.

In embodiments, the search interface may include a non-tuple-based search mode in which suppliers would be suggested as possible matches for the user's query that would be the union of the search terms. In an example, if a supplier has worked with silk, and has produced pants, the system predicts that this supplier could make silk pants.

In embodiments, a user interface may include paid or sponsored links in addition to search results derived from the rating platform described herein.

In embodiments, methods and systems disclosed herein may include private and public versions of reports, where a searcher can get to a public profile by an Internet site but requires some additional relationship (possibly involving payment) in order to drill down to receive more information, such as a complete profile of a supplier.

In embodiments, various icons, filters, sliders or other techniques may be provided in a user interface to allow a user to explore information about a supplier. In embodiments, a user can click for "details," thereby pulling up a ranking a supplier has for a given dimension, with information about the data source and a reminder of the purpose of that dimension. In embodiments, icons may show if a score is high, medium or low, thereby bucketing suppliers into general categories. In embodiments, filters or sliders may allow users to refine results, such as to show suppliers only if the product in question represents at least a minimum percentage of that supplier's product mix.

In an embodiment, the user interface 2722 may facilitate a search based on a geographic radius such that a plurality of entities 2708 may be searched based upon the related address of a given entity (e.g., a buyer or a supplier) or area around a given address (e.g., area around Michigan). In an example, a buyer may like to conduct a search for suppliers available near a supplier which is in the San Francisco area in the United States. The result of this search may include all the suppliers in the given area within a predefined distance (e.g., 5 Kms) from the searched supplier who may supply a specific product that may also be supplied by the searched supplier. The search region/distance factor may be based on various aspects, such as driving distance, jurisdiction, county, state, and it may also be submitted by the user as a parameter of the search. The search results may also be ranked (e.g. based on a supplier rating).

In another embodiment, a buyer 2730 may obtain a list of suppliers 2732 which are in the vicinity of a supplier which may be providing 'wooden furniture'. In addition, the buyer may like to receive certain details of all the suppliers listed in the search result. For this purpose, a more summarized view of the profile of the suppliers may be provided directly in the search result. In an embodiment, the rating may be an icon, integer, and the like. Based on this, a rank may be associated with each of the suppliers 2732. This ranking may in turn facilitate well informed decision making for the buyer 2730 regarding the appropriate supplier. Risk may be related to political factor in a particular area, geographic factor, weather factor, geology factor, targeted delivery date, and some other types of risk factors.

Supplier and buyer search may be further enhanced to take advantage of the profile characteristics described above as well as other characteristics including those derived from additional data sources, such as public operational data, financial metrics, social responsibility certifications, black list data, user generated feedback, and the like. Company search may include searching for suppliers from a particular market or markets that serve a particular market or markets ("U.S. or European buyers of furniture from Indonesia). Search may include searching for suppliers from a particular market or markets who source from a particular market or markets ("Vietnamese furniture suppliers who buy wood from china"). Alternatively, searching may include searching for buyers from a particular market or markets that buy from a particular market or markets ("furniture suppliers from Indonesia that serve the U.S. or Canada"). Additionally, natural language processing based search may facilitate automatically determining whether a user is looking for a set of buyers or a set of suppliers or for a particular company.

As described herein, user interface may be provided which may include a search box. Natural language (e.g., English) may be entered in the search for searching various entities. Natural language keyword or keywords entered in the search box may automatically be detected. Search aspects, such as whether the user is searching for buyers, suppliers, and the like may also be detected while the user is entering the data in the search box, even without pressing a search icon or button. Such automated detection may be done depending upon the time of the day, user's location, user's company/domain, and the keywords. In an aspect, filtering may be performed by a variety of filter-type algorithms. Filtering may be done on the basis of regions/countries. For example regions or/and countries may be captured from each of two records and compared, when the regions match between the records, the records may be identified as potential candidates for further processing such as classification and clustering.

In embodiments, an interface may be provided for rating a supplier, such as on dimensions including an overall rating, product quality, customer service, timeliness, English language capability, sample-making ability, respect for intellectual property, and the like. Buyer ratings may be averaged or otherwise normalized and reported as part of a supplier's overall rating 110. In embodiments, transactional data may be used to ensure that a transaction occurred (to keep ratings unpolluted). If a buyer rating is good, this can give a significant boost to an overall rating 110.

In embodiments, buyers could specify which dimensions are most important to them, and the overall rating 110 could be customized and weighted according to the buyer's preferences.

In embodiments, suppliers may be suggested to buyers based on the types of qualities the buyer seems to appreciate, and the types of products the buyer has produced in the past.

Figure 28:
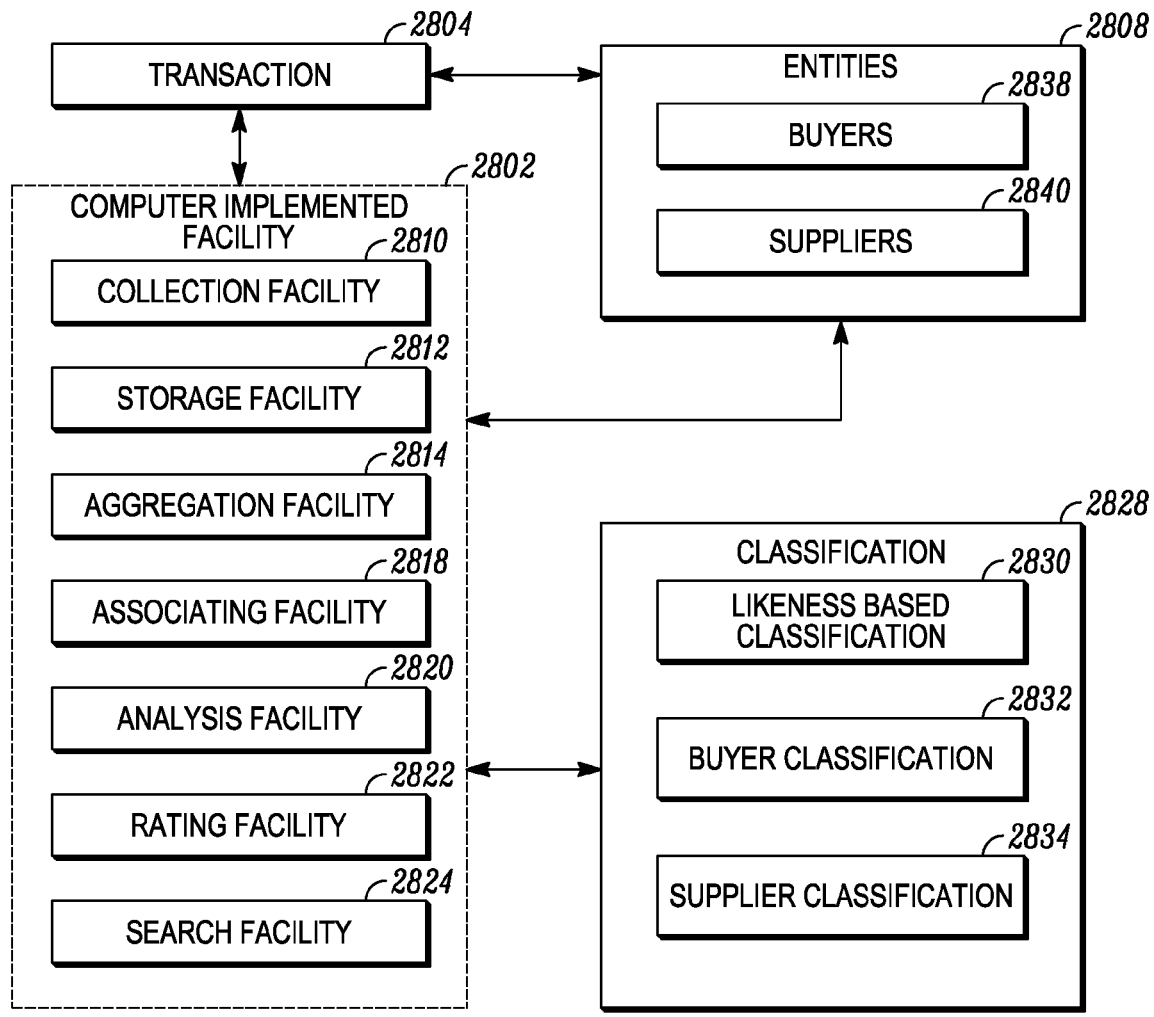
FIG. 28 depicts using public transactions for merging records.

The capability to identify and classify various buyers and suppliers as 'friends' or the like may also be facilitated by using public transaction records 2804, as shown in FIG. 28. The examples of public records may be government registration records, evidences of business legitimacy, custom records, data sheets and reports for work order, audit records, bank records and some other types of public records depicting various transactions. This may in turn help both the buyers and the suppliers to identify similar buyers and suppliers, and in turn help them make decisions regarding collaborations, competition, and some other types of strategic positioning.

Referring to FIG. 28, a computer implemented facility 2802 may be used to collect and store public records of transactions 2804. The public records may be government registration records, evidences of business legitimacy, custom records, data sheets and reports for work order, audit records, bank records and some other types of public records depicting various transactions. The transaction records 2804 may be associated with various entities (such as corporations, items, buyers, suppliers, third parties, etc.) and may generate information that may be aggregated transaction information (transactions associated with said entities). An analysis may be performed for classification 2828 of entities 2808. The classification 2828 may be a likeness based classification 2830. The likeness based classification 2830 may indicate that the suppliers, buyers and the third parties may be classified according to the type, or degree of likeness, types of qualities appreciated, past experience or some other characterization parameter. It may be noted that the classification may be conducted to classify at least one of a supplier and a buyer according to any one of the characterization parameters.

In embodiments, a buyer may identify like (similar) buyers. Similarly, a supplier may identify similar suppliers.

In other embodiments, a supplier may identify buyers like those of the supplier. A buyer may also identify suppliers like those of the buyer.

In embodiments, a buyer may identify suppliers of a specified type. Further a supplier may identify buyers of a specified type.

In embodiments, a buyer may identify suppliers most likely to prefer a particular buyer. Similarly, a supplier may identify buyers that would prefer a specific supplier.

In embodiments, the public records of transactions 2804 may also be used for classification of buyers 2838. This has been explained in conjunction with FIG. 28. The public records of transactions 2804 stored in the computer implemented facility 2802 may store transaction records 2804 relating to various suppliers 2840 and buyers 2838. The information associated with the public records of transactions 2804 in relation to various entities 2808 may be further analyzed. Based on the analysis, buyer classification 2832 may be performed to classify various entities identified in the transactions into buyers' category. It may be appreciated that the above described process and the system may also be used for classification of various entities into suppliers' category (supplier classification 2834).

In embodiments, an interface may include a capability for buyers to network, chat or otherwise interact with each other with respect to suppliers. Such a network may include a capability of identifying other buyers as "friends" or the like, thereby allowing sharing of information only among trusted parties. In such a case, information about suppliers for particular buyers might be automatically populated, simplifying the sharing of information about experiences with particular suppliers used by a network of buyers.

In embodiments, analyses could be used to assess and/or identify credit worthiness of suppliers or buyers.

In embodiments, ratings could be embedded into other media such as other websites, emails, print media, and the like. Such embeddings could be a result of calls to an Application Programming Interface (API), or other methods.

In embodiments, ratings may be grouped into buckets, such as "excellent," "good," "fair," "poor," and "not trade worthy." Various methods may be used to group suppliers into such buckets. In an example, "excellent" ratings may be given to suppliers who have business legitimacy and are in the top quartile in both loyalty and experience, "good" ratings may be given to suppliers who have business legitimacy and are in the top half in both loyalty and experience, "fair" ratings may be given to suppliers who have business legitimacy and are in the top half in either loyalty or experience, "poor" ratings may be given to other suppliers who have business legitimacy, and "not trade worthy" ratings may be given to suppliers who do not have indicia of business legitimacy.

In embodiments, methods and systems disclosed herein may assist suppliers in generating leads among buyers for opportunities to supply products. Information about how to improve ratings may be used to assist suppliers in generating high quality leads.

The methods and systems of the platform may facilitate identifying a supplier of an item type that is disclosed in a transaction record even if the supplier is not a party to the transaction. Identifying a supplier of an item, or a type of item may benefit buyers, suppliers, and the like by identifying potential new relationships between buyers and suppliers. A buyer may use the resulting supplier identification and other information in transaction records, such as declared customs value, to compare a current supplier cost with a different supplier cost for the same item. A buyer or a potential buyer may use at least transaction cost and delivery information to identify suppliers from which the buyer may request a quote for supplying the item. Suppliers may identify buyers of products that the supplier also provides. This may lead to efficient marketing and sales activity for the supplier because the supplier would know that buyer has a significant interest in the item being purchased. By examining other information in the transaction, such as buyer behavior, transaction history and the like, the supplier may identify an offer profile of the buyer and present a very well targeted offer to the buyer.

Figure 29:
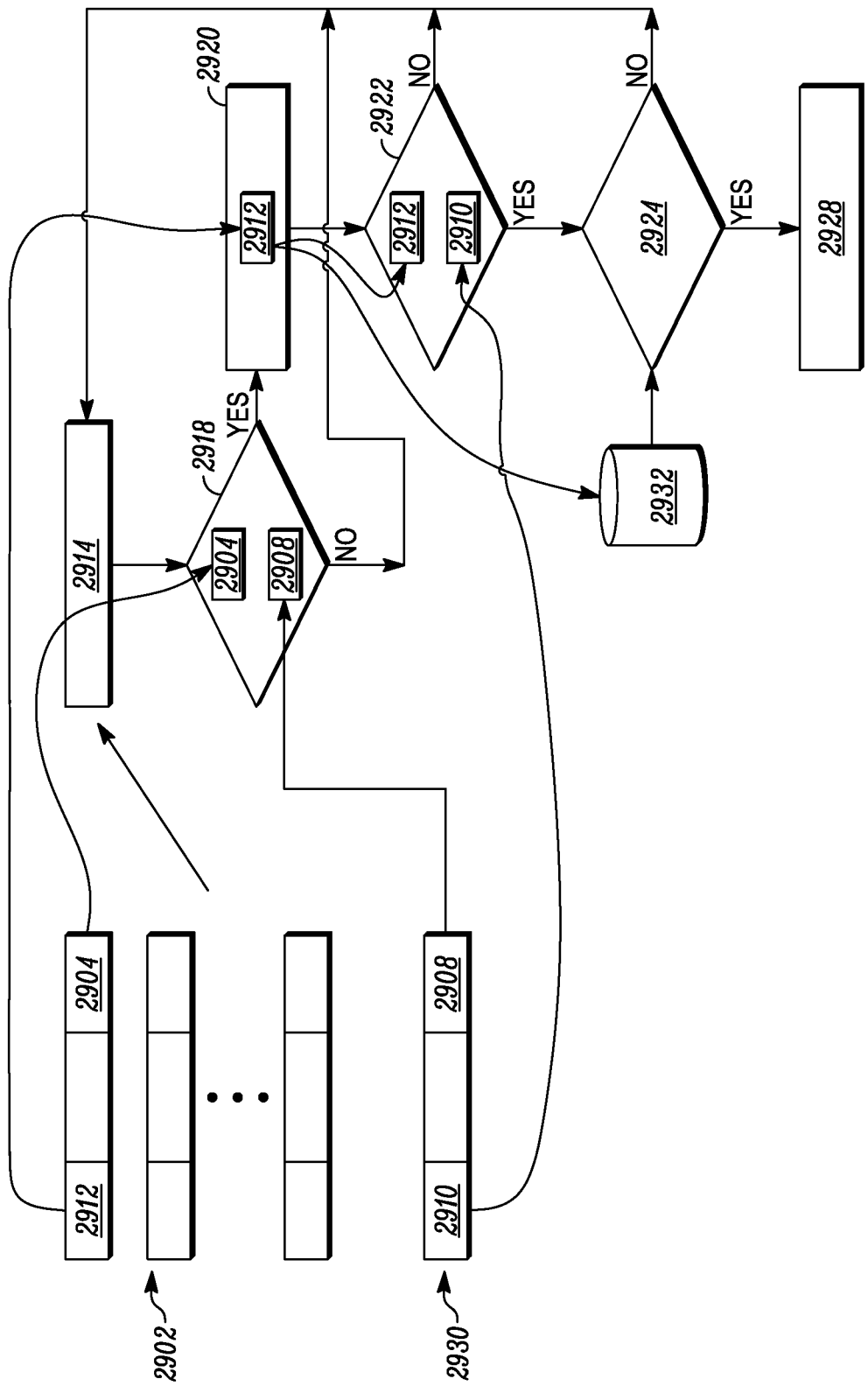
FIG. 29 depicts classification of buyers from public records.

FIG. 29 depicts a process for gaining these advantages from the methods and systems herein. The process depicted supports identifying a supplier of an item in a first transaction record by comparing the item in the first record to a second record. When a match is found, the supplier identified in the second record may be determined to supply the item. After other conditions are met, such as country preference, supplier restrictions, and the like the supplier can be reported. The process can be repeated for any number of second transactions. The process could be performed in a similar way for determining a buyer of an item. In particular, a plurality of transaction records 2902 may be collected and presented to the process 2914. A reference record 2930 that includes a reference product identifier 2908 or even just a product identifier 2908 can also be an input to the process. After retrieving one of the pluralities of transaction records 2902 through the retrieval step 2914, the product identifier 2904 of the retrieved transaction record is compared in step 2918 to the reference identifier 2908. If there is a sufficient match between the two product identifiers 2904 and 2908, the supplier identity 2912 is captured from the retrieved transaction record in step 2920. If the supplier in the retrieved transaction record 2912 is determined in step 2922 to be different than the reference supplier 2910, additional conditions, such as the supplier location and the like may be evaluated in step 2924 by looking at the retrieved transaction record and other data 2932 associated with supplier 2912 that may be available to the platform. If the other conditions are not met in step 2924, additional transaction records may be retrieved in step 2914. The process may be repeated any number of times based on various parameters that can be used to control the process, such as a number of potential suppliers to identify, a number of records to retrieve, a number of transaction records that are available, and the like. In the embodiment of FIG. 29, elements 2912 and 2910 could represent a buyer instead of a supplier. Also in step 2922, a desirable outcome may be a match between 2912 and 2910. These and other variations in the process of FIG. 29 that facilitate matching buyers or suppliers with an item or product type are included herein.

In accordance with an embodiment of the present invention, the information from the aggregated transactions may also be utilized for supplier assessment. Supplier assessment may involve determining if a specific buyer has ceased business operations with a supplier. Such a determination may be based on a cycle time between shipments which may be based on historical shipment data derived from transaction records. A calculation of cycle time of shipments for an item from a supplier to a buyer may indicate an approximate date of a next shipment. If a transaction record reflecting the next shipment does not show up in the transaction records within some period of time beyond the indicated next shipment date, the methods and systems may indicate that the buyer may have stopped business operations with the supplier. The nature of the stoppage may be further determined if transaction records indicate that the buyer has begun receiving shipments of the item from a different supplier. Cycle time calculations may also be used to evaluate a supplier's delivery performance. Significant increases in cycle time may indicate delay of shipment by the supplier. An assessment of supplier-buyer transaction status may also include factoring in buyer inventory. Buyer inventory may be factored in as a prediction or estimate of inventory.

In an embodiment of the present invention, methods and systems may be provided for rating an entity based on rolled up customs data. Rolled up customs data may include aggregated, cumulative, summary, or similar methods of combining a series of transactions into roll-up data. Rolled-up data may include a total of shipments over a period of time for a buyer-seller-product association. Rolled-up data may include total shipments over a period of time for product-shipper association. Any and all types of consolidation of transaction data that may be based on a time interval, a frequency, a region, an industry, a product, a supplier, a buyer, a shipper, a source region, an exchange rate, and the like are herein included. In an example, rolled-up transaction data may include a supplier's total output in each product category over a calendar month. In another example a country may report a total export of a product during a week. In both cases critical transaction information that may be missing may be estimated or predicted in order to develop otherwise useful information from the rolled-up information. The computer implemented facility 2902 may collect and store the rolled-up public records of transactions 2904 and aggregate them to form aggregated transactions.

In an embodiment, the transaction records may relate to the shipment transactions.

Further, the aggregated transaction records may be associated with a particular supplier. This associated information may be analyzed to determine and convey the rating for the supplier.

It may be appreciated that this procedure may be conducted periodically (In an example, every three months). In another embodiment, the change in rating of a specific supplier may be presented as an alert.

In an example, the embodiments described above may be utilized by a company dealing in an improved form of pesticide that may wish to determine the ratings of a specific supplier of raw materials situated in a different country. Therefore, the aggregated and associated shipment transaction information (regarding the shipment time, schedule, price and delivery) for the supplier may be used to determine its rating among a plurality of similar suppliers. Subsequently, this rating may be instrumental in helping the above company make supply related business decisions.

Figure 30:
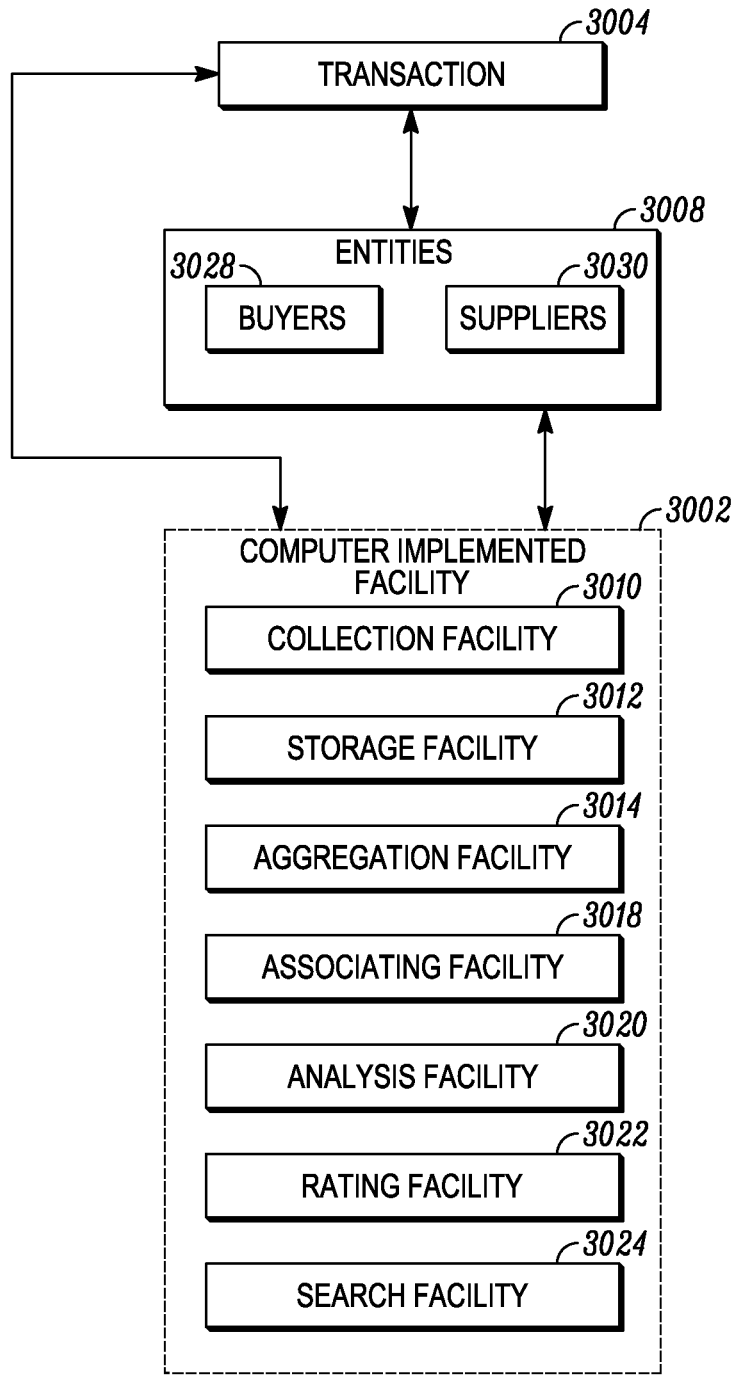
FIG. 30 depicts predicting minimum order requirements.

The public records of transactions may also be utilized for predicting minimum order requirements for a factory. Referring to FIG. 30, the computer implemented facility 3002 may collect a plurality of public transaction records 3004. The collection step may be performed by a collection facility 3010. The collected records may be stored by a storage facility 3012. Upon collection and storage the plurality of public transaction records 3004 may be aggregated by the aggregation facility 3014 and associated with various entities 3008.

In an embodiment, the entity may be a factory.

In another embodiment, the entity may be a supplier.

In yet another embodiment, the entity may also be a subsidiary of a supplier.

In an example, information regarding the public transaction records 3004 such as transaction receipts for a candle supplier selling a batch of factory-made candlesticks from a candle manufacturer may be aggregated and associated by the computer implemented facility 3002. The analysis facility 3020 may perform detailed analysis of this information to generate various types of results. In an embodiment, the analysis facility 3020 may predict the minimum order requirement for an entity, based on the analysis of the transactions. As described in the above example, the analysis facility 3020 may predict the number of batches that the candle manufacturer may need to sell in order to cross the minimum profit mark. In another example, the analysis facility 3020 may predict the minimum number of candle-stick batches that may need to be supplied to a third party in order to fulfill the required terms laid down in a mutual contract. In yet another scenario, the analysis facility 3020 may also facilitate predicting the minimum order requirements that a subsidiary of a supplier may need to supply among the batch of suppliers.

In embodiments, methods and systems are disclosed herein for using disparate data sources, including transactional records, such as from customs transactions, as a basis for rating suppliers of products. In embodiments, transactional data from actual transactions are used to generate experience ratings, specialization ratings, customer loyalty ratings, or other ratings.

In embodiments, a rating system is provided in which buyers rate suppliers of products, wherein transactional data, such as from customs records, are used to verify the legitimacy of the feedback, such as to verify that a rated transaction actually occurred.

In embodiments, methods and systems allow buyers to search for suppliers, including with filters based on product category, material or techniques offered or used by the suppliers, and to retrieve ratings information about the suppliers, including ratings derived from transactional data (such as customs data) or ratings derived from other buyers.

In embodiments, a platform for enabling searches for suppliers and ratings of suppliers may include various tools, such as tools for merging records, merging supplier names, and the like.

In embodiments, methods and systems disclosed herein may include a quote tool by which buyers may identify suppliers and then generate a request for a quote from selected suppliers.

In embodiments, algorithms may be used for determining a pricing leverage metric, such as based on transactional data, such as customs records. In an example, a supplier's pricing leverage may depend on the percentage of a supplier's shipments that are going to a single buyer, the proximity to a recent switch in supplier by one or more buyers, a supplier's overall score, a supplier's customer loyalty score, a supplier's experience in an area, and global factors, such as overall demand for a product offered by a supplier. Thus, an interface may allow buyers to assess pricing leverage based on calculations using one or more of these factors, normalized or weighted to provide an overall estimate or score as to pricing leverage of a supplier.

In embodiments, access to the database may be restricted by the capacity of a supplier, and the ability of a supplier to ship small quantities. For instance, large buyers may need access to the entire database, while smaller buyers may need special access to suppliers that specialize in smaller orders.

A user interface may include various alerts, such as an alert for when a new supplier satisfies a search criterion of a buyer.

In an embodiment, alerts may be generated in order to notify the user in case any pre-set condition becomes true or any new information is added with respect to a product or supplier etc. i.e., an alert may be generated in case new data is added with respect to a buyer in which the user may be interested. In case new data is added with respect to a company, the company may be marked or red flagged to indicate that certain change has been made with regard to it. For example, a buyer B1 who buys "Beddings" from suppliers namely S1, S2 and S3 now starts buying from supplier S4, the company B1 may be red flagged and an alert may be generated to notify supplier S1 that a new supplier is also supplying to B1. According, S1 may make a new bid or change his strategy towards B1. In an aspect, various types of alerts may be generated depending upon the need of the user. Another example may be cited wherein an alert is generated when there are new results to a search. For example, an alert may be set in case a new supplier or another shipment of hammers is added to Ikea China. In this case the user shall receive an alert when another supplier/another shipment of hammers is added to the profile of Ikea China. Moreover, in case the user has already seen an alert another alert shall not be sent in this regard.

Alerts may also be set for tracking a particular company, for example an alert may be set for a buyer B1 in case a new supplier starts supplying to the same an alert may be sent. This may help with competitive intelligence for a company both as a buyer as well as a supplier as it may help a company to know more about various other organizations. This information may be useful for decision makers of the company. For example, a buyer may track his supplier and may be notified in case the supplier starts supplying to a competitor which may be breach their contractual agreement. Another example may be cited wherein an alert may be generated in case a new supplier starts supplying in a particular region. In addition, data alerts may be set for companies that undergo a drastic change in a particular characteristic relating to it. For example, an alert may be set if a particular buyer starts buying less than a fixed quantity of products.

Alerts may be set on data present in various databases and not limited to customs database, and alerts may also be set for data stored in a 'Red Flag Database' which may trigger a negative alert. Alerts based on different databases may be helpful in generating and noting a trend related to a particular supplier, buyer, product etc. For example, macro trends may be noted by tacking a product from analyzing the shipping data. Market share of various countries or any change in the market share may also be known which may help suppliers to target buyers.

Furthermore, IP alerts may also be set notifying the user in case a buyer/supplier starts importing/exporting a product which may be protected by a patent of the user.

In an embodiment, alerts may be generated by analyzing data related to a particular entity and which is stored in a database such as customs records, shipper records etc. An alert may be of help to managers of various companies who may take actions depending upon the alert generated. For example, consignee data may be analyzed to generate alerts when a supplier serves a new buyer. In another example, shipper data may be used to generate alerts when a company orders goods from a new country and/or region.

A supplier of a particular commodity may be alerted when new suppliers start supplying in a particular region. For example, a "furniture" supplier to south-east Asia may be notified when a new furniture supplier starts supplying in Vietnam. Likewise, a supplier may also be notified in case a new buyer of a particular product starts buying in/from a particular region which may help the supplier to target the new buyer.

Furthermore, in case a search gives new results due to any changes in the stored data, an alert may be generated. For example, when a buyer's or supplier's risk metric changes the various users may be notified, this may help a user to take action. In an aspect, an alert may be generated requesting feedback from a buyer about a supplier when a shipment from said supplier is received.

Methods and systems disclosed herein may include methods for syndicating data, such as delivering overall scores, category ratings (e.g., "excellent," "good," "fair," or "poor") or the like, to third parties, such as for presentation in connection with other business data, such as data presented to securities analysts, data presented to buyers for other purposes, and the like. Users will be able to provide subjective ratings of suppliers on such third party presentations using an API.

In embodiments, methods and systems disclosed herein may include collaborative filtering techniques, such as to allow buyers to see information relevant to other buyers who share characteristics with the buyer (such as conducting similar searches, using similar suppliers, or having similar transaction records). Collaborative filtering may also allow suppliers to access information relevant to other suppliers with similar characteristics, such as ratings for suppliers to supply the same types of products, to the same types of buyers, and the like.

In embodiments, a buyer scorecard 200 may be provided that shows summary data for a supply chain of various suppliers, such as to indicate how the buyer's suppliers collectively compare to suppliers of other buyers, such as competitors of the buyer.

In embodiments, a supplier comparison tool may be used to compare suppliers on various attributes.

In embodiments, buyers may be rated on behalf of suppliers, such as based on loyalty to suppliers.

In embodiments, ratings of suppliers or buyers as described throughout this disclosure may be used for third parties, such as, in embodiments, financial analysts. In an example, an analyst could evaluate the quality of a company's supply chain based on collective supplier ratings. Similarly, an insurance company could use data about suppliers of a buyer to assess supply chain risk, such as for analyzing risk associated with insurance associated with activities of suppliers.

In embodiments, buyers may supply data to the platform described herein in order to assist with developing ratings, but that data may be maintained as proprietary to the buyer, such as to keep ratings generated based on that data private to the buyer.

In embodiments, information about suppliers may be syndicated to desk software tools, such as tools used by purchasing managers and buying staff within buyer organizations. Thus, reports or ratings may be fed so that they appear within the interface of one or more other desktop or web-based tools used by such users.

In embodiments, methods and systems disclosed herein may include filtering tools for sorting data retrieved from customs records according to an industry hierarchy, such as a hierarchy of products, materials and techniques.

In embodiments, a search interface may allow for a search based on supplier capability, such as based on information retrieved from transactional data, such as customs records.

In embodiments, a data analytics platform may be provided for analyzing supplier capabilities, such as based at least in part on transactional data about supplier activities, such as transactional data from customs records.

In embodiments, a rating system may be based on a combination of customs data and other data, such as data based on an internal database of transactions made by an agent on behalf of buyers transacting with suppliers.

In embodiments, a platform may include a transactional facility, such as for allowing buyers to transact with suppliers that have been identified by the search and ratings facilities described herein. Such transactional facility may include modules related to ordering, pricing, payment, fulfillment, and the like.

Figure 31:
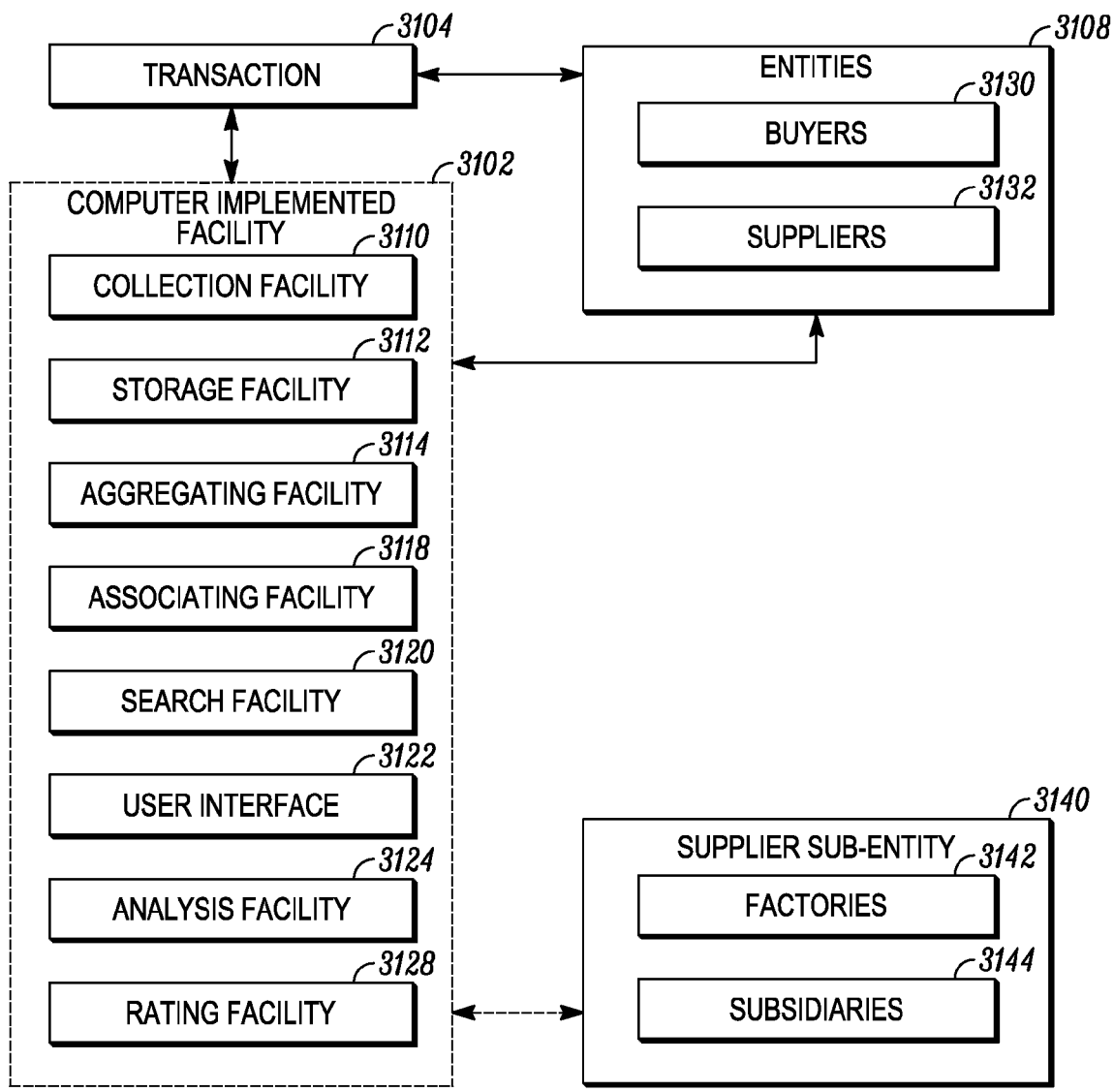
FIG. 31 depicts rating a sub-entity of a supplier.

Referring to FIG. 31, in accordance with the methods and systems described herein, the public records of transactions 3104 may be utilized for rating a sub-entity of a supplier 3108. The computer implemented facility 3102 may collect and store the public transaction records 3104 among the plurality of buyers 3130 and suppliers 3132. Upon aggregating and associating the transactions 3104 with the entities 3108 (such as buyers and suppliers), an analysis may be performed regarding the sub-entities of the suppliers 3132. Examples of sub-entities 3140 may include a factory, a group of factories 3142, subsidiaries 3144, and some other types of entities.

In an example, the aggregated transactions information may reveal a .list of twenty entities doing business in an uptown market. A searcher may utilize the methods and systems disclosed herein to determine a list of seven entities that may be sub-entities for a specific supplier S1. In accordance with the embodiments of the present invention, these seven entities may be rated based on the transactional data. The seven entities (say 2 factories, 3 subsidiaries, and 2 sales divisions) may be rated based on the timeliness of the delivery, feedback from the buyers, and so on.

In an embodiment, the analysis facility 3124 may determine the sub-entities 3140 for a supplier from the group of entities. The determination of sub-entities may be based on the analysis of the public transaction records 3104. In an embodiment, the public transaction records 3104 may be customs transaction records.

In another embodiment, the sub-entities 3140 of the supplier may be rated based on the analysis of the aggregated transactions and other information and parameters as explained throughout the disclosure.

Methods and systems of the present invention, may allow a client to make financial investment decisions based on data that is aggregated from a wide variety of different sources, such as customs data, international trade data, suppliers, buyers, intermediaries, agents, partner country data, domestic production data, world commodity prices, shipping data, import data, export data, credit-based data (e.g. Dun Bradstreet), certification data, various industry and tracking indices, regulatory data, watchdog agency data, industry self regulating data, securities trading data, tax records, and the like.

Financial investments may include assessing and managing risk; therefore the aggregated data may be used to determine various risks associated with a financial decision. Risks may be related to a capacity to execute a large order, subcontracting arrangements or terms, socio-economic environment of a country, regulatory risk, tax risk, political risk, currency fluctuation, non-performance of a contract, an uncertainty related to termination of the contract, achieving target delivery dates, intellectual property, and compliance of regulatory environment prevalent in the country where the transaction is likely to take place, trade routes, and the like. Risk assessments for various financial decisions may include assessing entities to be considered for doing business, amount of payment to be paid in advance to a supplier, amount of insurance to purchase, and the like.

The aggregate data may include information that allows organization of the data based on industry affiliation as may be determined from analysis of the data. In an example, organization based on various industries such as apparel/retail industry, electronics industry, and the like is possible. Further by determining industry affiliations of the data from the various data sources, a user may select an entity name such as "BANANA REPUBLIC", "GAP", "OLD NAVY", and the like and, based on the industry affiliations of the selected name found in the data, the platform may aggregate and provide analysis of the one or more industry affiliations associated with the selected name. In this example, "apparel" may be one of the industries affiliated with "GAP" so data from the various data sources that includes references to the "apparel" industry may be processed.

In addition, the client may be allowed to identify and aggregate data based on different locations, subsidiaries, affiliations, and other legal relationships of an organization. For example, the client may wish to compare sales of an organization 'X' in various locations. By combining data from the various data sources, and matching data in the combined sources based on entity identifiers in the data, the sales for the organization may be determined based on states, countries, regions, other locations, and the like. By identifying the various locations of the organization, in addition to determining the sales attributed to the individual locations, the client may also build an aggregate profile for the organization based on the individual location data.

The platform may support determining a profile for each entity matched in the data sources. The platform may also support the creation and maintenance of meta-profiles that may include any combination of individual entity profiles, an industry profile, a geographic region profile, and the like. In this way, the data can be processed based on the profile or meta-profile being selected for analysis.

While data sources may provide information that can be matched to entities, some data sources may not include specific entity identifiers. Industry standards data sources, such as indices (e.g. shipping cost data) may be applicable to activities such as shipping but may not directly include entity data. The platform may determine appropriate relationships between this 'entity-less' data and specific entities by comparing certain data aspects of the data that can be associated with a specific entity. In an example, a company that is identified in customs data as receiving products that were shipped from via sea freight may be associated with a shipping index (e.g. Baltic Dry Index) for purposes of predicting shipping costs and the like for the company. By comparing freight costs for two companies that both ship via sea freight, it may be possible to establish a relative ranking in shipping/cost performance of different organizations that may be useful in financial decision making.

By analyzing shipment data, sales data, public financial records of entities, and the like, the platform may predict financial performance factors for an entity, such as an estimate of inventory that may be based on financial statement of the organization, past deliveries, and the like. Data sources that may be used for such a prediction may include government registration records, custom records, earning reports, data sheets and some other types of public records depicting various transactions of an organization. Such predictions may also help estimate a company's potential change in earnings in the future.

By combining product shipment related information (e.g. as may be determined from customs transaction records) with other company and industry sales and financial data, growth of a new product may be tracked and predictions of the future sales of the product or financial performance of entities associated with the supply chain of the new product may be estimated.

The information from non-transaction data sources may help in establishing a supplier or buyer rating. In an example, if a supplier is flagged with a fraudulent charge such as money laundering, and the like, the overall score of the supplier may be lowered. Also, such a change in rating may be communicated to a buyer, partner, banker, and the like of the supplier to facilitate managing risk associated with doing business with the supplier. Similarly, when matching public financial reporting data to a buyer's entity profile negatively impacts a rating of a buyer, suppliers who may extend credit to the buyer may desire to be notified for purposes of making financial decisions regarding the buyer.

Further, customs records may include details about a bank and/or shipping organization that is participating in the customs transaction (international shipment). Therefore, financial risk may be determined for these third parties associated with a customs transaction (not just the buyers and sellers). In addition, based on this data it may be possible to predict levels of risk for any of the parties participating in customs transactions based on risk profiles of any of the other parties. If a bank that is identified in customs records is in default, then ratings for the suppliers of the goods in the transaction may be negatively impacted based on the risk of the bank not following through on a loan obligation of the transaction.

When data from a variety of data sources are matched to entities, it may be possible to compare the performance of two or more different organizations. For example, data relating to total earnings of the organizations, latest products of the organizations, and the like may obtained from publicly available financial databases. In embodiments, the financial data may be utilized for comparing the performance of the two organizations. To this aspect, the coverage ratios, liquidity ratios, and other financial ratio may be compared. Similarly, the computer implemented facility may compare the intangible assets to obtain an estimate on the performance of the two organizations. When evaluating products launched by the organizations, factors such as the number of samples of the new product brought into market, sales of the new product, backlog of the new product, lead time of the new product, and the like may be compared for assessing the performance of the two organizations.

Data from the data sources may be assigned a weight, such as a confidence factor when being used for making financial related decisions. The weight may be based on the size or number of the transactions carried out by organizations. Weights may be based on the confidence of data associated with the suppliers/buyers with whom the organizations are transacting, and the like. In this way, the analysis of entities may be based on the weights associated with data matched to the entities.

As described earlier, data may be analyzed for industries, marketplaces, regions, businesses, groups of businesses, lists of businesses, types of businesses (e.g. domestic or multinational), and the like. This analysis may be called macro level analysis because it may be independent of any specific entity while using information matched to entities that are included in the macro level. Macro level analysis may facilitate detecting trends which may, for example help identify hot locations for purchase of specific products or services. For example, macro level analysis may identify a trend that indicates a specific location may be a hot spot for manufacturing electric engines. Because the macro level analysis may include data from traditional transaction-type data and non-transaction data, the analysis may be inherently validated because of the use of various independent data sources. Tools may be provided that may facilitate integration of macro-level data with the entity-specific data to forecast entity performance.

In an embodiment, data may be aggregated from a variety of sources, including, without limitation, customs data associated with actual import/export transactions, private or semi-private data (e.g. shipper or logistics provider data), macro-data (e.g. a variety of parameters that are associated with economic and political situation of a country), and the like. It may be particularly helpful to utilize the range of data sources to provide business profile (e.g. rank and risk profiles) for an industry, a region, a country, a business district, and the like.

In addition to macro-data impacting supplier and/or buyer ratings, macro-data may also be used or generated for a region that may facilitate providing a rating (e.g. business risk, credit risk, etc) for the region. Macro-type data may include, without limitation, a country context of a party, whether a party is registered with government authorities, an assessment of a trading environment in a country, macroeconomic information, currency fluctuation, and the like. The rank and risk profiles for an industry, a region, a country, a business district, and the like may be related to factors such as political, geographic, climatic, geological, financial risks, intellectual property, and the like. In an example, the macro-data factors that may impact risk for an industry, a region, a country, a business district, and the like may include variables such as GNI per capita, currency volatility, cost to export, political stability, and the like. A macro-data user interface may allow selection of parameters (e.g. GNI per capita and cost to export) to generate a country context value that could be applied to calculate a rating for a region, country, and the like. Furthermore, determination of regional rating may depend partially or completely on some or all of the macro data selected from some or all the groups, as described herein and elsewhere.

In embodiments, a rating for the risk of doing business in a country is provided which may be based on macro data aggregated from transactional customs data, customs data related to transactions of the buyer with a third party, or some other parameter. In addition, ratings may also be based on two or more macro type data factors from a group including but not limited to the country context of a party, whether a party is registered with government authorities, an assessment of a trading environment in a country, macroeconomic information, public recognition of a party, number of shipments, duration of experience, size of transactions, extent of international experience, caliber of customers, customer loyalty, specialization in product categories, specialization in manufacturing techniques, specialization in materials, specialization in gender, feedback on language skills, feedback on sample making ability, respect for intellectual property, quality management, social responsibility, environmental responsibility, and the like.

The multi-sourced data trend analysis may facilitate making investment decisions. In an example, investors interested in trading the stock of a shipping company or market segment may utilize information derived from the trend analysis to help guide investment decisions. In the example, shipping organizations involved in transportation of oil may benefit from an increase in global demand for oil. Trends derived from customs transaction records for oil importation may indicate or substantiate a suspected increase in revenues for companies transporting oil. Trends about movement of various products may point at increased business businesses opportunity in these products. Trends analysis about the movement of products and commodities may aid in forecasting price movements and demand of these products and services, which may reflect on the potential value of the entities participating in the supply of these products or services.

The platform may include a free-text extraction tool that may identify relevant portions of textual data, such as press releases. The relevant text may correspond to a particular product or organization. In an example textual data may be extracted and then the extracted data may be applied in an analysis of the customs transaction and other data to identify trends corresponding to a particular product or organization.

The platform may facilitate bringing together trends of an organization across various categories. For example, the trends of an organization relative to the world, relative to a region, relative to a segment, and the like may be combined for conveniently analyzing the trends of a particular organization. These trends may facilitate decipher the performance of products of an organization in a specified region. Likewise, trends may facilitate identification of regions of increasing or declining demand. The product demand may be ascertained from the shipping area and international trade data sources.

Further, the trends in a particular region obtained for a product may have significance to currencies of countries in that region. Positive or negative growth trends of the product may depend upon currency of a country. For example, a product with small volumes shipping into a country may not be influenced by the currency fluctuation significantly but large trade volume associated with that product may be significantly impacted based on the valuation of currency of that country. Likewise, import data of products may be influenced with the currency of a country. For example, data related to a product may be combined with historical currency prices of a country for finding positive impact of the import on the current valuation of currency or negative growth trends of the product. In addition, the data related to the product may be combined with public forecasts of finance ministers about a country's exports may be useful in predicting trends of trading in that country.

Because trade transaction records (e.g. customs records) allow for entities to remain anonymous so that there is no identifying information for an entity participating in a customs transaction, it may be necessary to separate out organizations that may have decided to "opt out" from having their names included in customs records. To this aspect, the platform may detect the presence of "opt out" entities and may provide analysis related to the same. For example, the rating of a supplier who ships to "opt out" buyers" may be adjusted based on the ratio of "opt-out" buyers to "opt-in" buyers. Analysis of entities that do business with "opt-out" organizations may be compensated by analyzing just the non opt-out records and excluding the "opt-out" records from the analysis or rating. In another implementation, opt-out data may be compensated by interpolating the available data for these opt-out organizations. Even when entities "opt-out" of customs records, other information, such as product codes, may be sufficient to identify other buyers or shippers who also buy or sell similar products. In this way, the platform may provide analysis of a entity's competitors even when the competitors have "opted-out" in customs transaction records.

The platform may detect the presence of a new entity in a market place even when the entity or an entity that the new entity is doing business with is an "opt-out" entity. If an "opt-out" entity has been receiving products from one supplier and new customs records indicate that the one supplier is now delivering fewer products while a new supplier is delivering the balance of the products, it may be possible to detect that the opt-out company has introduced a new supplier. Based on any industry affiliation or based on product references in the customs records, other buyers of similar products may be notified of the new supplier. Similarly, when a known buyer starts receiving products from a supplier that they have not previously used, even if the supplier is an opt-out entity, it is possible for the platform to detect the supplier change/addition and may provide relevant information or alerts to competitors of the known buyer.

In another scenario, the platform may use data related to a supply chain for assessing sustainability of an organization in a market. The supply chain related data may include data related to the goods shipped by the organizations, distances traveled for shipment, source of shipments, and the like. Supply chain data may be used to establish an environmental protection or "greenness" rating of organizations. Organizations with high cost transportation in their supply chain may be rated low on "greenness" due to the amount of carbon output required in the supply chain. Furthermore, the "greenness" assessments may facilitate establishing a new greenness index for organizations.

The analysis of entities described herein, including various risk ratings and the like, may be beneficial in securities trading activities. Securities trading may be based on assessments and predictions of future business value and the ratings and assessments described herein may contribute to an estimate of future business valuations. Traders may look to the ratings of individual entities when considering how to trade the securities of the individual entities. Fund managers may look to the ratings of industries, regions, and the like to make decisions about which equities to add or remove when adjusting the fund's allocation of assets. By knowing an estimate of risks associated with an entity, a securities trader may adjust a hedging strategy accordingly. Trends associated with products that may be provided by the platform may factor into a derivatives securities trading plan. Indexed equities may be traded based on an assessment of risk profile of the key entities represented by the index. When analyzing a transaction, such as a merger or acquisition, the risk profile of the potential acquisition target may be valuable to an acquiring entity to determine valuation of the target. By providing comparisons of entities, the platform may facilitate recommending transactions (such as recommending companies to acquire). The ratings, trends, macro level assessment, predictions, and the like that are possible with the platform may benefit analysis of all types of trading strategies including: buy/hold/sell decisions, risk allocation/pooling, hedging, credit-default swaps, portfolio insurance, asset allocation, program trading, thresholds/limits, and the like. Because the ratings, trends, and other assessment may be executed at all levels of business (e.g. division, company, sector, geography, index, macro-level, and the like) investment decisions that relate to any of these levels (e.g. sector financial analysis) may benefit from the use of the platform.

The methods and systems described herein may include using a computer implemented facility to provide a marketplace system for accessing information and resources of suppliers and buyers. The marketplace system may contain one or more supplier or buyer profiles associated with a supplier or a buyer. A user may engage the marketplace system to locate a buyer or supplier whose profile satisfies a certain criteria.

A supplier or buyer profile may initially contain basic public information. The basic public information may be of the type generally available about the supplier or the buyer, such as company name, address, phone number, website address, and the like. A supplier or a buyer may claim, or take ownership of its profile within the marketplace. The marketplace system may provide a method for a supplier or a buyer to create an account within the system, which would identify the supplier's or buyer's profile. A registration fee may be associated with registering, or claiming a profile. A supplier or a buyer may be offered options for supplementing its claimed profile with additional information. As an example, and not a limitation, the additional information may be of the type collected by the marketplace system from customs data, shipper data, and other publicly or privately available data sources. As another example, the additional information may be generated by the supplier or the buyer and uploaded to the system.

A supplier or a buyer may be presented with a plurality of options relating to managing and administering data associated with their profiles in the marketplace. A supplier or a buyer may pay a fee and take control of a profile and the information provided, opt-out of the marketplace system by removing the profile, leave the profile as generated by the marketplace system, pay a fee to have the marketplace facilitators manage the profile, select certain types of data to be allowed to be associated with the profile, combinations thereof, and the like. Further in the embodiment, suppliers or buyers may be presented with one or more privacy options. These privacy options may allow them to decide how certain information is shared through the marketplace system. A supplier or a buyer may decide to allow access to public information about the company once it is validated or approved by them. They may alternatively allow certain private data to be made available to subscribers of the marketplace. The information may be available for a fee to be paid by the user accessing the data. A condition of making this information available may require that a portion of that fee being shared with the supplier or the buyer. To encourage suppliers or buyers to actively manage or subscribe to profile management services, the marketplace may include a disclosure rating system associated with the amount and type of information a supplier or a buyer chooses to disclose. Such a disclosure rating may be used to rank the supplier or the buyer among its peers.

To establish and maintain high quality profile data, the marketplace system may provide a verification facility. The verification facility may use a plurality of records of transactions among a plurality of buyers and a plurality of suppliers to verify information that a supplier or a buyer provides to be associated with its profile. As an example, and not a limitation, the marketplace system verification facility could help a user to verify a supplier's claims about manufacturing throughput by comparing them with shipping quantities for similar items. The marketplace may require a fee from a supplier to display an indication that its profile has been verified by the marketplace. Similarly, a buyer using the marketplace may be charged a fee for accessing the verification facility or for obtaining the verified status of a supplier.

To further enhance marketplace data quality, the verification facility may perform an accuracy check of a profile for accuracy, using publicly and privately available information. The accuracy check may be performed automatically, and in real time, and a profile may be updated immediately to reflect validated changes, such as changes associated with shipping delays, price fluctuations, and the like. Such real-time features of the marketplace data quality system may enable other marketplace aspects such as bidding systems and trading systems that rely on accurate and timely data.

The marketplace system may also include a self-disclosure integrity scale or rating. A self-disclosure integrity scale may compare the information provided by the supplier or buyer associated with their profile information with previously recorded shipper information about them. As an example, and not a limitation, a supplier claiming shipping times of less than a week for its products that is not supported by transaction history extracted from shipper information would receive a low self-disclosure integrity scale rating. Another example may be cited wherein a buyer's transaction history extracted from shipper information may be used to verify a buyer's ability to perform in a transaction. A buyer rating system may be provided, based on timely payment for shipments, rate of returns, quantity of shipments, types of products shipped, and the like.

Further in the embodiment, a formula may be used to reward accuracy by allowing higher visibility for suppliers and buyers with a higher self-disclosure integrity scale rating. Since higher visibility may potentially lead to more business, a supplier or buyer may thus be encouraged to maintain high self-disclosure integrity in its profile.

The marketplace system may also provide a facility for a reliability or performance rating. The reliability or performance rating may be based on transaction history extracted from shipper information. As an example, and not a limitation, a supplier with a history of timely shipment may receive a high reliability rating. A formula may be used to reward reliability and performance by allowing higher visibility for suppliers or buyers with a higher reliability or performance rating.

In addition to providing data services, the marketplace system may provide a prospecting facility. The prospecting facility may utilize shipper information to predict delays and disruptions in future transactions. As an example, and not a limitation, a delayed shipment of parts to a manufacturer may result in that manufacturer being unable to ship its product in a timely fashion. The prospecting facility may recognize the delayed parts shipment and alert the supplier's customers of the upcoming delay. As another example, the prospecting facility may alert the manufacturer of the impending delay and present options for purchasing parts from other parts suppliers who are capable of delivering replacement parts within a needed timeframe. The prospecting facility may use a shipper's internal information, such as increased hiring patterns in certain areas at certain times to predict shipping delays before they occur. The marketplace system may then rate suppliers based on their proximity to a potential shipping disturbance and provide a buyer with a list of suppliers less likely to be affected by it.

In addition to information services and prospecting services, the marketplace system may provide a bidding facility. A plurality of buyers may bid for the services of a supplier; likewise a plurality of suppliers may bid to fulfill a buyer's order. The bidding facility may contain an order posting system, where a buyer would post information relevant to an order, such as item type, specification, quantity, price, and required delivery date. A buyer's rating may be used to prioritize its order in the order posting system. A plurality of supplier may then bid to fulfill the order. The bidding facility may present the bids to a buyer with the supplier's identifying information obscured, but with its honesty, reliability, and performance rating provided. Such a presentation may allow more price competition among suppliers of varying size and having differing name recognition.

A supplier may use the bidding facility to provide information about its ability to deliver a particular item, type of item, or the like. The supplier may provide an item specification or description, an available quantity, location, speed with which it can be shipped, price, and the like. A plurality of buyers may bid to purchase from the supplier. The bidding facility may provide the bids to the supplier with the buyer's identifying information obscured, but with its honesty, reliability, and performance rating provided.

To facilitate enhanced use of the marketplace for suppliers, buyers, service providers, and the like, the marketplace system may provide an advertising facility. A plurality of suppliers and/or buyers may be listed according to various aspects such as self-disclosure integrity, reliability, performance rating, and other aspects of rating as described herein. Through the advertising facility, a supplier (e.g. with a low rating) may pay a fee to have a sponsored listing appear alongside higher ranked competitors. The marketplace system may normally exclude suppliers from certain types of searches (e.g. searches that are fee to a buyer), unless the supplier opts in to be included in such searches by paying a fee if and when a search is performed that results in the supplier being listed. Generally, a supplier may optionally pay a fee to have its preferred or branded information displayed when it is included in the results of a search. Advertising in the marketplace system and elsewhere may be enhanced through the use of private data (e.g. shipper information) by allowing an advertiser to supplement traditional advertising techniques based on shipment information. As an example, and not a limitation, when a shipment to a buyer is delayed, and the buyer is looking at similar items within the marketplace system, a plurality of supplier may be notified that the buyer may need replacement goods (e.g. the buyer may post the need on the marketplace and the suppliers may respond to that post). A supplier may then present a special offer to the buyer for a purchase of items that would replace the delayed shipment. The special offer may be presented in real-time, such as through a banner advertisement, or a targeted search result, and the like.

In addition to allowing a supplier to manage and augment information that may be associated with a supplier profile, a supplier may further augment how its profile is used in the marketplace (e.g. to make itself more appealing to a buyer). The marketplace system may assess a charge-per-click fee every time the supplier's profile is clicked by a buyer, or every time a buyer makes a purchase after clicking the profile, and the like.

The methods and systems described herein may include identification of potential customers within an organization based on a specific criterion. Individuals within a corporation that is a buyer, supplier, shipper, service provider, third-party, or otherwise identifiable in the records of the systems may be targeted to facilitate offering volume discounts, promotional codes, recruiting offers, targeted offers, and the like. In an example of a individual targeting within marketplace system as described herein, by recruiting more individuals from within an organization that is already a member of the marketplace system, the volume of transactions placed through the marketplace for existing customers may be increased, thereby increasing the marketplace's relevance, revenue, profitability, visibility, and the like.

To facilitate reaching out to additional contacts within known companies, an existing user's business name may be used to search for potential additional contacts within that user's business. Alternatively, information about individuals (e.g. contact information, addresses, names, and the like) that may be included in the public, customs, private, or semi-private data may be harvested to facilitate contacting such individuals to promote the features and benefits of the methods and systems described herein.

In addition, information derived from an on-line interaction with a user, such as the user's IP address, browser-related information, and the like that may facilitate identifying an aspect of the user may be used to offer up to the browser through which the user is conducting the on-line interaction content that is targeted to the user, such as a customized landing web page, offers, and the like. The information derived from the on-line interaction may be compared to other available information, such as public customs records, private and semi-private data (e.g. shipper data), and the like to look for indications that the derived information is associated with one or more records associated with the public, private, or semi-private data. There are several techniques described herein for determining information about parties of a transaction from public transaction records (e.g. customs data). The information determined about parties from the public, private, and/or semiprivate data may be used to help identify aspects of the user conducting the on-line interaction. Information that may be provided by subscribers to the on-line platform described herein may also be used to help align information about entities (e.g. buyers, sellers, shippers, logistics providers, and the like) captured in the public, private, and semi-private records with on-line interaction information that may be used to identify aspects of a user. Subscribers may provide email addresses, physical addresses, company names, phone numbers, IP addresses, and the like actively or passively that may be used directly or in combination with information determined about parties from the captured transaction records to help identify an aspect of a user in an on-line interaction.

When an aspect of the user in an on-line interaction is determined to be associated with a known entity as described herein, the platform may facilitate targeting content to the user. In an example, if an email address provided by a user engaged in an on-line interaction with the platform can be determined to be associated with a buyer entity that is known to the platform (e.g. from public customs transaction records) then the user may be presented with a web page that includes artifacts associated with the known buyer entity. In the example, if the on-line user's email address is john_smith@panjiva.com, and the transaction records (or other records accessible to the platform) indicate that Panjiva is a buyer entity that purchases widgets, then the user who has identified himself as john_smith@panjiva.com may be presented with a web page that includes widget-specific content. The content may include suppliers of widgets, other buyers of widgets in the area, widget transaction summaries, advertisements for widget repair service, widget inventory service, widget marketing service, and the like. Similarly, because John_smith@panjiva.com has been identified as a new on-line user of the platform and there are other users from the buyer Panjiva already registered with the platform, john_smith@panjiva.com may be presented with an offer that is consistent with new members of an existing subscriber buyer entity.

In another example, a user's web browser may transmit an IP address in standard electronic communication between a browser and a server that is hosting the on-line platform as described herein. The IP address may be analyzed and it may be determined that the computer that the user is using in the on-line interaction is within the range of IP addresses that have been determined to belong to buyer entity Panjiva. In this way, without the user taking any action to identify himself or his place of business, the platform may detect a relationship between the user's IP address and the Panjiva buyer entity. In these examples, an association is made between an on-line user and a buyer entity. There are other examples that may allow determination of an aspect of an on-line user based on information derived from the on-line interaction and information provided by other users of the platform even if those users are not associated with an entity for which transaction records exist.

The methods and systems described herein may include use of shipment and customs declaration data that comes from a private or semi-private source on an aggregated basis to protect privacy/confidentiality of parties while providing information about suppliers and information about buyers. Aggregating data within and across a plurality of data sources including public sources, such as customs declaration data, and private sources, such as shipper or logistics provider data may facilitate and/or improve providing information about suppliers and buyers while enabling substantial protection of privacy and/or confidentiality of parties by removing information that may be used to identify a particular party or parties in transactions. Private sources of data, such as shipper data may include private and confidential information about clients and customers of the shipper that may be removed, masked, or encrypted to prevent the data from being used to identify third parties. Alternatively, aggregating non-private and non-confidential data based on various aspects, such as dates, quantities, jurisdictions, schedules (e.g. next day before 10 AM delivery, next day delivery, two day, three day, standard, Saturday delivery, same day courier), choice of conveyance (e.g. air, land, sea), charges (e.g. per shipment, per item), payment terms (on account (e.g. credit account, debit account), prepay, COD, post bill, and the like), and many other dimensions of aggregation may facilitate providing information and analysis about any of these dimensions and/or combinations thereof using the methods and systems described herein and elsewhere.

Aggregation across public and private data may facilitate supplementing the public data with logistics and delivery related information that can substantially enhance the public data. In an example, customs data may identify a supplier, customs agent or facilitator, buyer or recipient of a customs controlled shipment, and various details about the customs controlled shipment. Supplementing this with private or semi-private data (e.g. details from a logistics provider handling the shipment for the supplier) may enable detailed analysis about costs, timing, schedule changes, and the like. The supplemental data may indicate that a shipment passed through customs with no unexpected delays, yet the buyer refused to accept the shipment because an incoming inspection process caused the lot to be rejected. Without this supplemental data, it may be difficult to determine this aspect of supplier quality from public records alone.

Private or semi-private data may also be used to facilitate validating public data. Public data may include various entry errors and lack of information that, while not necessarily causing significant problems in a customs transaction, may cause challenges to validating the information and properly determining details about the transaction (e.g. a supplier may be identified on a customs declaration as the logistics provider for the source supplier). By combining private or semi-private data (e.g. shipper data), an original source supplier associated with the customs declaration may be determined. Such obfuscation may be intentional or unintentional, however without the private data, the original source supplier may not be known. Further details may be helpfully determined from private or semi-private aggregated data as well. In an example, a customs declaration may identify the general type of material or a count of containers being shipped and a customs value, yet the actual number of items may be missing. Private data may enhance these values by providing details about the destination (i.e. recipient), and the like.

Likewise, public data may help to validate aggregated private data. IF private data is aggregated to remove details about individual shipments, customs data, which includes details about individual shipments, may be used to validate the private data. Customs data may cover a large number of shippers, whereas private data may be limited to one or a few shippers. By combining private and public data sources, the aggregated private data can be vetted against the public data to ensure that the private data is not in conflict with the public data. If such conflict is found, techniques for resolving the conflict may be employed including audits, and the like. Improperly aggregated private data may be invalidated by comparing it to public records, such as customs records.

Private or semi-private data may be aggregated separately from customs data to provide unique views of activity and trends at a regional level. Such aggregated data may be used to identify shipment related activity for a country, state, county, city, port, geographic region, preferred shipping route, carrier, and the like. Aggregated data may also be useful for identifying trends related to shipments or patterns of shipments for such regions and the like. Private data may include historical data that may be used to facilitate providing a prediction or projection of region-based shipping in the near term and longer term time frames. In an example, historical data may include shipments from a region in light of macro-economic data. As new macro-economic data and/or new regional shipping data is aggregated, upcoming shipment activity for a region may be predicted based on the new data. If the new data indicates an improvement in macro-economics, then shipments for the region may be predicted to increase.

Macro-economic data may also be used with private, public, and semi-private data to help identify relationships between these data sources that may help identify potential impact on multiple suppliers that operate in a region. If macro-economic data support private shipper data that indicates a decrease in activity for a region, then one can predict that suppliers, shippers, logistics providers, carriers, and the like that operate in that region may be similarly affected negatively. This information may be helpful in determining opportunities for buyers and suppliers, such as lower prices, availability of shipping resources, production capability availability, and the like. These and many other types of region-based assessments may be done based on aggregated private data.

The methods and systems described herein may include various methods of handling shipment related data, such as data ingestion, filtering, normalization, de-duplication, data quality, and the like. Here we discuss some of these techniques and approaches for handling shipment-related data from private and semi-private sources.

Normalization of data may facilitate marrying private shipping data with public shipping data (e.g. customs declaration and execution records, and the like). Normalization may include normalizing data within a private data set (e.g. across the various data sources handled by a shipper or logistics provider). Normalization within and among the various private and public data sets may include addressing differences in formats, fields, codes, and the like. Logistics and/or shipper data may be somewhat more consistent than public data and/or data from various sources. However, independent of the consistency of a data source, it may be possible to establish a normalization profile for a private data source, or to establish normalization profiles for various portions of a private data source. These profiles may facilitate use of the private data with the public data.

It is generally expected that conflicts among data from multiple data sources will need to be addressed. Conflict rules may be established (e.g. based on a normalization profile, customer preference, historic quality determination of a data source, and the like) that allow the conflicts to be resolved. Conflicts may be resolved in favor of private data, public data, or may be based on a triangulation across the two or more data sets. Such techniques may provide important benefits to quickly and accurately resolving conflicts. In addition, early detection and determination of a proper conflict resolution approach for a given instance of a dataset may substantially improve response time in real-time based data assessment methods that may provide a user with dynamic ad-hoc assessment of the data sets.

Conflict rules may be based on granularity. Customs or public data may be more granular than aggregated private shipping records. A description in a private shipper record may be "clothing" while custom data may describe the composition of the clothing (e.g. 60% Merino wool, 30% cotton, 10% rayon, and the like including colors, styles, etc. Such richness in the data may be valuable for a variety of businesses. Data sets can be assessed based on a dimension of richness as well. Richer datasets generally may be taken from public data sources (e.g. customs declaration data) than from private data sources which may not need such details to properly complete a shipping activity. This may in part be based on the need for the strict legal enforcement of cross-border transfers that public data must support and private data does not require.

Triangulation may be performed for any variety of data elements, yet numeric values (e.g. weight and value) lends itself towards triangulation. Because a declared value for customs impacts an import tax or duty that may have to be paid by the importer, these may generally be considered to be below the actual market or wholesale value of the contents being imported. Whereas, value that is identified to a private carrier (e.g. for insurance purposes) may provide a more accurate or at least a value that is equal to or greater than the cost of replacing the contents. Such numbers may be triangulated to identify a more likely value. In this way, private data may be more reliable. Weight is a similar dimension that may be suitable for triangulation. Weights may be estimated for customs purposes, whereas shippers base transportation costs (e.g. fuel) on actual weight. Therefore, private data (e.g. shipper data) may be more accurate and/or reliable.

Private data, particularly destination data, may be particularly well vetted because a shipper or other logistics provider who is responsible for proper delivery and billing will most assuredly have accurate addresses for shipment destinations. Therefore, private data that is reliable and accurate for destinations, may be used to enhance the public data relating to buyers because, for example, destination addresses may be linkable to a particular buyer through the private data billing information and the like. Private data may facilitate overcoming limitations of detecting valid data from handwritten forms filled out by non-native language users, and the like.

The methods and systems described herein may utilize private data such as shipper's data to analyze trends in shipping for a particular supplier, buyer, etc. The shipper's data may provide details such as the buyer and the supplier locations and any specific changes in the transactions between these locations. For example, from shipper's data, it may be possible to track an increase in supply of "electronic components" from a supplier. This might be useful to understand the growth of the supplier and its market reach. Accordingly, the supplier might be offered details of buyers in the area where the supplier is already supplying. Similarly, indications of business trends, such as rapid growth, may be used to automatically predict needs based on a detected trend and the methods and systems described herein may automatically attempt to fulfill those predicted needs. In an example of attempting to fulfill predicted needs based on business trend indications, if it is determined that a particular supplier has increased its manufacturing capacity threefold in the last three months (e.g. the private shipper data may include a new pricing structure for substantially increased shipments that are expected from the supplier), then it may be predicted that the supplier may welcome some potential buyers to order products based on the additional capacity. Likewise, buyers of the products that are similar to those that may be provided by the increased capacity may be notified of the potential increased availability of products.

Private data, such as shipping records, may be rich sources of data for providing analysis about companies, regions, marketplaces, pricing, and the like. Natural language processing may be useful in extracting relevant terms from a set of shipping records that may facilitate capturing the rich data values. In an example natural language processing may be used to determine which products a company receives most frequently. That information may be represented as a tag cloud which may be further analyzed to identify information (e.g. shipments) that are trending positive and those that are trending negative. Such analysis may help with identifying areas of growth and new business opportunities that may extend beyond the individual buyers and/or shipper data. Existing and new supplier profiles may be enhanced by using the information gathered with natural language processing from a set of shipping records (e.g. private shipper records) and the trend information derived there from (e.g. analyzing the tag clouds). In addition to any public data records (e.g. customs transaction records) that may exist on a supplier, the private shipper records may facilitate capturing domestic shipping transactions, transactions that appear in public records as occurring between third-parties, and the like and associate them with a supplier thereby improving supplier profiles, ratings, risk profiles, and the like. Relevant terms that may be extracted using natural language processing may include products, shipment dates, fees, payment terms, consignees, logistics partners, and the like that may or may not be known from public transaction records. These additional terms derived from private or semi-private shipper records may facilitate rating suppliers who do not have public transaction records (e.g. domestic only suppliers), suppliers who use a third party for all shipments recorded in public records, and the like. The trending analysis of the terms found using natural language processing may enable adjusting a rating profile of a supplier. In an example, if a supplier's payment to a private shipper is trending out (longer time for the shipper to receive payment), the supplier's financial risk rating may be increased. In another example, if a supplier's public records of shipments into the U.S.A. indicate a substantial increase in shipments followed by a substantial reduction in shipments (likely indicating a slowdown in business), yet that same supplier's private shipper records show domestic U.S.A. shipments are remaining constant, then one may conclude the supplier has built up a domestic inventory to satisfy domestic customers.

Consignee data from private, semi private (e.g. shipper), or public (e.g. customs) data sources may be used to develop a heat map of markets (e.g. for specific countries or regions). Such a heat map analysis and visualization may show the markets for a given supplier—may show the countries, regions, states, even neighborhoods that represent the markets for a supplier. Such a heat map may be used to determine which markets are served most frequently by a supplier. By determining information about suppliers, such as markets most frequently served, it may be possible to enhance a supplier profile to incorporate information related to those markets. In an example, if a heat map for supplier Ikea indicates that a supplier most frequently serves a market which may be experiencing substantial political or economic change, a profile of that supplier may be adjusted accordingly.

Normalization may also be useful in understanding a supplier's markets and better tune a market heat map. One aspect of normalization may be to use global market data to help normalize a supplier data. In an example, if a supplier ships one-half (50%) of its shipments to Zimbabwe and industry data indicates that this is, in comparison, relatively much greater than other suppliers, one can estimate a market analysis for the products being supplied by the supplier to Zimbabwe.

Private shipper and private consignee data may be useful for characterizing a supplier. These may include using consignee data and date of shipment data to develop a sense of which countries or regions are becoming a more prominent part of a supplier's customer base. Similarly using the number of shipments and other measures of shipment rates may be useful in characterizing a supplier as one of growing, shrinking or remaining stable. By triangulating with other data (e.g. credit data), it may be further possible to identify characteristics of a supplier. If credit data indicates that the supplier is taking longer to pay, then there may be a financial risk to buyers who prepay or make advance payments for custom orders. Machine learning is another technique that may be applied to shipment data that may help determine which components of the various data sources that provide data for a supplier are the most representative of leading indicators for the supplier (e.g. an indication of (or lack of) company stability).

Consignee data may also be useful for trending analysis to determine which countries may be increasing export activity. Further analysis may help indicate which products and/or markets within the region may be growing faster than others (and which supplier may be benefiting most from the growth) by comparing trends for various product categories being exported out of a region.

Supplier-to-consignee data may be useful in identifying key country-to-country relationships and groupings. By analyzing these simple data sources, one can determine if a particular combination of countries (e.g. China and Ireland) may be growing or shrinking and why. By determining that product shipments of denim clothing from China to Southern Ireland is increasing, one may be able to envision a change in denim marketplace occurring in Ireland.

Historical data and data over time may be useful in creating a model of capacity, such as capacity over time or for a particular time frame (e.g. seasonal capacity, holiday capacity, etc).

By connecting shipments over time into a supply chain (wood from china is shipped to a factory and the factory ships furniture to a wholesaler in the U.S. who ships to retailers in Canada), it may be possible to have a deep analysis of a supplier sources of raw materials that may help in ranking and risk assessment of the suppliers. This type of connection of supplier with suppliers with retailers with buyers may enable providing a directed graph of connections between all buyers and all suppliers. Such directed graph data may be useful in performing various analyses using any of a variety of graph analysis tools and algorithms. Analysis may include determining how connectivity changes over time in a region; how deep a supply chain tends to be; how deep a risk may propagate through a supply chain from a buyer; and the like.

Supplier risk assessment may be enhanced with a metric that is related to a company's trajectory of imports, exports, payable, and the like as well as the risks faced by the supplier's suppliers. Data regarding payables may be useful in such an analysis and risk assessment. Machine-based learning may also be useful in this analysis.

Data related to shipments may include shipment weight. By comparing recent shipment weight data from a supplier for certain shipments to typical shipment weights from that supplier may be a leading indicator that the supplier is shipping sample lots or prototypes, which may indicate that the supplier is active in product development.

By looking at value of goods based on insurance or declared value, one may develop inferences about cost and pricing information for particular products mapping products (e.g. description) and quantity onto an ontology with the declared value for insurance purposes, may facilitate generating a model which takes that into account with other companies' similar statistics. The model may be established for how much a company sells a product for. Such a model could be done at the country, company, region level. This data, which is provided by suppliers to protect the value of a shipment, may be used to determine what buyers are paying for products. If the insurance value data for recurring shipments appears to be going up, then one could determine that a buyer (e.g. retailer GAP) is likely being charged more for products by suppliers so earnings are going to be lower than expected this quarter. Although this example is for a particular buyer, it could easily be applied at a macro level to product categories, regions, and the like.

Private and public shipment related data may be useful in identifying trends in trade flows. Trends may be determined for a given product. Product focused trends may include which countries are trending positive as exporters; which are trending negative as exporters; which countries are trending positive as importers; which are trending negative as importers; which trade routes (a buyer country/supplier country pair) are trending positive, and which are trending negative; which destination ports are hot, which departure ports are hot, and which port trade lanes (a departure port/destination port pair) are hot; and other trends may be gleaned from shipment data.

Other data sources include satellite data of shipping routes to help determine which routes ships are actually traversing. By mapping the trade route data, one may determine various trends and may visualize information about a product or shipment (e.g. visualize timing of arrival) and the like. Information such as lateness of shipment may be a top level metric that may be further analyzed to determine a source of shipment lateness. A shipment may be late due to lateness of transfer to the shipper (indicating a supplier issue) or may be due to lateness of delivery (indicating a shipper issue). Such data may also help in analyzing sphere-to-sphere trade flows to help identify differences in various zones of the world. This may be useful in optimizing which ports a supplier or buyer should be targeting based on capacity, cost, proximity, and the like.

The data extracted from shipping records may provide details such as preferences for particular shippers, certain pricing patterns, certain timing of shipments etc. Natural language processing of shippers data may be used to determine the products a buyer generally receives and the frequency of such deliveries. That information may be represented as a graph which may be analyzed to identify the general trends of requirements of a buyer. Such analysis may help with identifying areas of growth and new business opportunities. Existing and new buyer profiles may be enhanced by using the information gathered with natural language processing from a set of shipping records (e.g. private shipper records) and the trend information derived there from (e.g. analyzing the tag clouds). In addition to any public data records (e.g. customs transaction records) that may exist on a buyer, the private shipper records may facilitate capturing domestic shipping transactions, transactions that appear in public records as occurring between third-parties, and the like and associate them with a buyer thereby improving buyer profiles, ratings, risk profiles, and the like. Relevant terms that may be extracted using natural language processing may include products, shipment dates, fees, payment terms, consignees, logistics partners, and the like that may or may not be known from public transaction records. These additional terms derived from private or semi-private shipper records may facilitate rating buyers who do not have public transaction records (e.g. domestic only buyers), buyers who use a third party for all shipments recorded in public records, and the like. The trending analysis of the terms found using natural language processing may enable adjusting a rating profile of a buyer. In an example, if a buyer's payment to a private shipper is trending out (longer time for the shipper to receive payment), the buyer's financial risk rating may be increased.

Consignee data may be used to develop a heat map of markets (e.g. for specific countries or regions). Such a heat map analysis and visualization may show new markets for a buyer to buy, show the countries, regions, states, even neighborhoods which may provide products at shorter time period and required quantities may be ordered. Such a heat map may be used to determine which markets are accessed most frequently by a buyer. By determining information about buyers, such as markets most frequently accessed, it may be possible to enhance a buyer profile to incorporate information related to those markets. In an example, if a heat map for buyer Panjiva indicates that Panjiva most frequently accesses a market which may be experiencing substantial political or economic change, a profile of that buyer may be adjusted accordingly.

Normalization may also be useful in understanding the buying landscape to help buyers relate market analysis to a buyer's business plans. In an example, if a buyer from Germany receives one-half (50%) of its "electronic components" shipments from suppliers in India and industry data indicates that this is, in comparison, relatively much greater than other German buyers, the India sourced German market for "electronic components may be estimated based on buyer data.

Consignee data may also be useful for trending analysis to determine which countries may be increasing import activity. Further analysis may help indicate which products and/or markets within the region may be growing faster than others and which buyer(s) may be leading the growth) by comparing trends for various product categories being imported into a region.

Shipper and consignee data may be also useful for characterizing a buyer. Buyer characterization may include using consignee data and date of shipment data to develop a sense of which countries or regions are becoming a more prominent part of a buyer's supply base. Similarly using the number of shipments and other measures of shipment rates may be useful in characterizing a buyer as one of growing, shrinking or remaining stable. By triangulating with other data (e.g. private shipper credit data), it may be further possible to identify characteristics of a buyer. If credit data indicates that the buyer is taking longer to pay, then there may be a financial risk to suppliers who extend credit to a buyer. Machine learning is another technique that may be applied to shipment data that may help determine which components of the various data sources that provide data for a buyer are the most representative of leading indicators for the buyer stability (or lack thereof).

Historical data and data over time may be useful in creating a model of buyer demand, such as demand over time or for a particular time frame (e.g. seasonal demand, holiday buyer demand, etc).

By connecting shipments over time into a supply chain (electronic component from India is shipped to a factory in Germany and the factory ships consumer electronic items to a wholesaler in the U.S.), it may be possible to have a deep analysis of sources of raw materials that may help in ranking and risk assessment of the intermediate buyers in the supply chain. This type of connection of buyers who become suppliers to retailers may enable providing a directed graph of connections between all buyers, all suppliers and any involved third party. Such directed graph data may be useful in performing various analyses using any of a variety of graph analysis tools and algorithms. Analysis may include determining how a buyer's connectivity in various supply chains changes over time in a region; how deep a supply chain tends to extend from a particular buyer in the supply chain back to raw materials; how deep a buyer's risk may propagate through a supply chain; and the like.

Buyer risk assessment may be enhanced with a metric that is related to a company's trajectory of imports, local receipts, and the like as well as the risks faced by the buyer's buyers (e.g. retailers). Data regarding payables may be useful in such an analysis and risk assessment.

In addition to using publicly available information, such as customs data, names and corporate structures, directory services, publicly traded company data, the third-party private or semi-private information such as shipper information may also be utilized to facilitate identification and analyses of relationships between companies as they may exist in public records. This shipper information may show that two separate suppliers recorded in the public records may share an account with a shipper, use the same billing address, and the like.

With the enhancements potentially available using private or semi-private data, a relationship matrix of suppliers and buyers may be provided. As an example, and not a limitation, a relationship matrix may include a graphical representation of relationship proximity, with the relative distance between suppliers in the graphical representation corresponding to the degree of closeness of corporate relationship. As an example of relationship validation, two suppliers that appear separately in public data that share a common shipper account are highly likely to be closely related businesses. In this matrix view, icons or other representations of suppliers and/or buyers with relationships that may have been validated or appear to be more likely to be close based on private data may appear differently than the icons of suppliers and/or buyers whose relationships have not been enhanced by private data.

In an embodiment, the shipper data may be used to identify if two suppliers share a single user account and supply the same product to a single buyer. This may in turn reflect that the suppliers may have two different branches of a single company. Shipper data may also be used to identify any trends of transactions between various subsidiaries of a buyer and supplier, and forecast deliveries.

In another embodiment, the shipper's data may be analyzed to depict any name, similarities, and trading relationships to identify companies likely to have a corporate relationship.

Private data from shippers and logistics providers, for example, may include general forecasts of business based on shipping patterns that may include seasonal forecasts, regional forecasts, infrastructure changes (adding/removing infrastructure such as intermediate shipment points/offices), information about the carriers that shippers and/or logistics providers use to move freight, head count changes or plans, credit a shipper or logistics provider may extend to a supplier or importer, collections on owed amounts, delivery pick-up pushback data (may be an indication of companies being bad a meeting deadlines), and the like. Private and semi-private data may also be useful in profiling shippers, carriers, logistics providers, and the like.

The shipper's data may also be utilized to note the efficiency of a supplier. For example, the extent to which delivery pick-ups are pushed back may be noticed which indicates that the supplier has not been able to meet deadlines in the past. Further, shipper data may also provide details regarding the duration of a delay at the supplier's end.

The shipper's data may also be used to note and analyze the logistics insurance on any given shipment which may in turn be utilized to approximate the value of the whole shipment. This data may also be utilized to forecast the value of shipments and also the revenue generated by the supplier.

The shipper's data may also be utilized to develop a profile of shippers themselves and to evaluate the price, risk, and reliability of a shipper.

Planned increases in shipper head count or infrastructure expansion in certain regions may be leading indicators that business transactions in the region are likely to grow in the general timeframe associated with the planned expansions. This may be important for other businesses considering opening or expanding operations or sales activity in the region because it may lend creditability to the expected improvement of business activity that requires shipping services. Likewise, seasonal swings in shipper head count may be used to identify opportunities for customers of the shipper to receive additional services made possible by the increased head count. Services like local inventory management, return services, and the like may be made available at lower costs with improved regional service.

Shippers and logistics providers may also subcontract work out to freight carriers, customs service providers, courier services, and the like. Private and semi-private data, such as shipper data, may be used to facilitate rating these supply chain participants as well. A poorly rated freight carrier subcontractor may indicate that a risk of delayed shipments or problems with shipments that rely on that subcontractor may be greater than with others. This may impact a supplier risk if the supplier's shipments are generally handled by the poorly rated subcontractor. Such information may be useful to buyers, and to the supplier(s). It may be informative to a supplier who is considering opening or expanding operations in a region that is served by the subcontracting carrier.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law. All documents referenced herein are hereby incorporated by reference.

What is claimed is:
1. A method, comprising:
  using a computer implemented facility to collect and store a plurality of public transactional records for a plurality of buyers and a plurality of suppliers;
  using a computer implemented facility to aggregate and store non-public shipping records from at least one ship- per, wherein at least one of the shipping records references an entity identifier for at least one of the plurality of buyers and suppliers;

selecting a portion of the plurality of public transactional records associated with an entity identifier based on similarity of data in the public transactional records with the at least one shipping record entity identifier;

merging the records of the selected portion of the plurality of public transactional records into a common entity record set;

aggregating the transactional records for the common entity record sets; and rating the common entity based on analysis of the aggregated transactional records.

2. The method of claim 1, wherein using a computer implemented facility to aggregate and store non-public shipping records includes processing the non-public shipping records with natural language processing to detect the entity identifier.

3. The method of claim 1, wherein selecting a portion of the plurality of public transactional records comprises natural language processing of data in the public transactional records to identify candidate records for associating with the entity identifier.

4. A method, comprising:
using a computer implemented facility to collect and store a plurality of public transactional records for a plurality of buyers in a plurality of suppliers:

using a computer implemented facility to aggregate and store non-public shipping records from at least one shipper, wherein at least one of the shipping records references an entity for at least one of the plurality of buyers and suppliers;

selecting a portion of the plurality of public transactional records associated with an entity identifier based on similarity of data in the public transactional records with the at least one shipping record entity identifier;

merging the records of the selected portion of the plurality of public transactional records into a common entity record set;

aggregating the transactional records for the common entity record sets; and rating a sub-entity of the common entity based on analysis of the aggregated transactional records.

5. The method of claim 4, wherein the sub-entity is a factory.

6. The method of claim 4, wherein the sub-entity is a collection of factories.

7. The method of claim 4, wherein the sub-entity is a subsidiary.

8. The method of claim 4, wherein the sub-entity is determined based on analysis of the public transactional records.

9. The method of claim 4, wherein the public transactional records are records of customs transactions.

* * * * *

UNITED STATES PATENT AND TRADEMARK OFFICE
CERTIFICATE OF CORRECTION

PATENT NO. : 8,626,618 B2  
APPLICATION NO. : 13/343354  
DATED : January 7, 2014  
INVENTOR(S) : James Ryan Psota and Joshua Green Page 1 of 1

It is certified that error appears in the above-identified patent and that said Letters Patent is hereby corrected as shown below:

On the title page

Item (63) Related U.S. Application Data, "Continuation-in-part of application No. 12/271,593, filed on Nov. 14, 2008, now Pat. No. 8,473,354, and a continuation-in-part of application No. 13/343,354, filed on Jan. 4, 2012." should read -- Continuation-in-part of application No. 12/271,593, filed on Nov. 14, 2008, now Pat. No. 8,473,354, and a continuation-in-part of application No. 13/004,368, filed on Jan. 11, 2011, now Pat. No. 8,423,425. --

Signed and Sealed this
Fourth Day of March, 2014

Michelle K. Lee
*Deputy Director of the United States Patent and Trademark Office*